United States Patent
Singer

(10) Patent No.: US 11,046,159 B2
(45) Date of Patent: *Jun. 29, 2021

(54) SKELETON FOR TRUCK BED AND CONVERTIBLE TOP

(71) Applicant: Nicholas J. Singer, Irvine, CA (US)

(72) Inventor: Nicholas J. Singer, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/583,102

(22) Filed: Sep. 25, 2019

(65) Prior Publication Data
US 2020/0031211 A1 Jan. 30, 2020

Related U.S. Application Data

(63) Continuation-in-part of application No. 16/040,416, filed on Jul. 19, 2018, now Pat. No. 10,538,152, which is a continuation-in-part of application No. 15/916,976, filed on Mar. 9, 2018, now Pat. No. 10,252,679, which is a continuation-in-part of application No. 15/336,702, filed on Oct. 27, 2016, now Pat. No. 9,956,857.

(51) Int. Cl.
| | |
|---|---|
| *B60J 7/04* | (2006.01) |
| *B60J 10/00* | (2016.01) |
| *B60J 7/14* | (2006.01) |
| *B60R 9/058* | (2006.01) |
| *B60R 9/045* | (2006.01) |
| *B60J 7/11* | (2006.01) |
| *B60J 7/19* | (2006.01) |

(52) U.S. Cl.
CPC ............... *B60J 7/141* (2013.01); *B60J 10/45* (2016.02); *B60J 7/11* (2013.01); *B60J 7/198* (2013.01); *B60R 9/045* (2013.01); *B60R 9/058* (2013.01)

(58) Field of Classification Search
CPC ..... B60J 7/141; B60J 10/45; B60J 7/11; B60J 7/198; B60R 9/058; B60R 9/045
USPC ................................................ 296/100.09
See application file for complete search history.

(56) References Cited

U.S. PATENT DOCUMENTS

| | | | |
|---|---|---|---|
| 3,837,700 A | 9/1974 | Van Slyke | |
| 4,496,184 A | 1/1985 | Byrd | |
| 4,630,858 A | 12/1986 | Bez | |
| 4,932,717 A * | 6/1990 | Swann | B60J 7/041 |
| | | | 224/309 |
| 5,031,949 A | 7/1991 | Sorimachi | |
| 5,494,327 A | 2/1996 | Derecktor | |
| 6,305,740 B1 | 10/2001 | Staser | |
| 6,439,646 B1 | 8/2002 | Cornelius | |
| 6,505,878 B1 | 1/2003 | Mascolo | |

(Continued)

OTHER PUBLICATIONS

Agri-Cover, Inc., Access Original Slantback Roll-Up Cover Installation Instructions (manual), Feb. 2018.

(Continued)

*Primary Examiner* — Joseph D. Pape
*Assistant Examiner* — Dana D Ivey
(74) *Attorney, Agent, or Firm* — Klein, O'Neill & Singh, LLP

(57) ABSTRACT

A truck bed accessory frame is disclosed therein which allows for reconfiguration between an opened position and a closed position. In the open position, objects taller than the frame can loaded onto the truck bed. In the closed position, objects placed in the truck bed can be protected from the environmental elements (e.g. rain and UV rays from the sun).

10 Claims, 69 Drawing Sheets

(56) References Cited

U.S. PATENT DOCUMENTS

| | | | |
|---|---|---|---|
| 6,641,201 | B1 | 11/2003 | Pietryga |
| 7,914,064 | B2 | 3/2011 | Joab |
| 8,256,824 | B2 | 9/2012 | Williamson |
| 8,348,328 | B2 | 1/2013 | Walser |
| 8,376,684 | B2 | 2/2013 | Juarez-Ortega |
| 8,511,736 | B2 | 8/2013 | Williamson |
| 8,733,604 | B2 | 5/2014 | Murray |
| 8,991,889 | B1 | 3/2015 | Levi |
| 8,998,047 | B2 | 4/2015 | Demers |
| 9,834,076 | B2 * | 12/2017 | Rohr .................. B60J 7/1607 |
| 9,956,857 | B1 | 5/2018 | Singer |
| 10,059,273 | B1 | 8/2018 | Mercurio |
| 2003/0201288 | A1 | 10/2003 | Ford |
| 2007/0119886 | A1 | 5/2007 | Jablonski |
| 2008/0116711 | A1 | 5/2008 | Thacker |
| 2009/0145940 | A1 | 6/2009 | Bukowiec |
| 2012/0080901 | A1 | 4/2012 | Izydorek |
| 2012/0181313 | A1 | 7/2012 | Sautter |
| 2012/0273536 | A1 | 11/2012 | Campbell |

OTHER PUBLICATIONS

American Tonneau Company, Tri-Fold Tonneau Installation Guide (manual), at least as early as Oct. 2012.

Diamondbackcovers, Damondback 270 Installation Guide (manual), Feb. 2018.

Diamondbackcovers, Damondback HD SE Installation Guide (manual), Jan. 2018.

Jackrabbit, Standard Installation Instructions (manual), Jun. 2011.

Non-Final Office Action on co-pending U.S. Appl. No. 15/916,976 dated Jun. 18, 2018.

Non-Final Office Action on co-pending U.S. Appl. No. 16/040,416 dated Oct. 1, 2018.

Notice of Allowance on co-pending U.S. Appl. No. 15/916,976 dated Nov. 29, 2018.

Rugged Cover, Hard Tri-Fold Tonneau Installation Instructions (brochure), Jul. 24, 2013.

Undercover, Inc., Ridgelander Installation Guide (manual), Oct. 2016.

Undercover, Tonneau Installation Guide (manual), Apr. 2005.

* cited by examiner

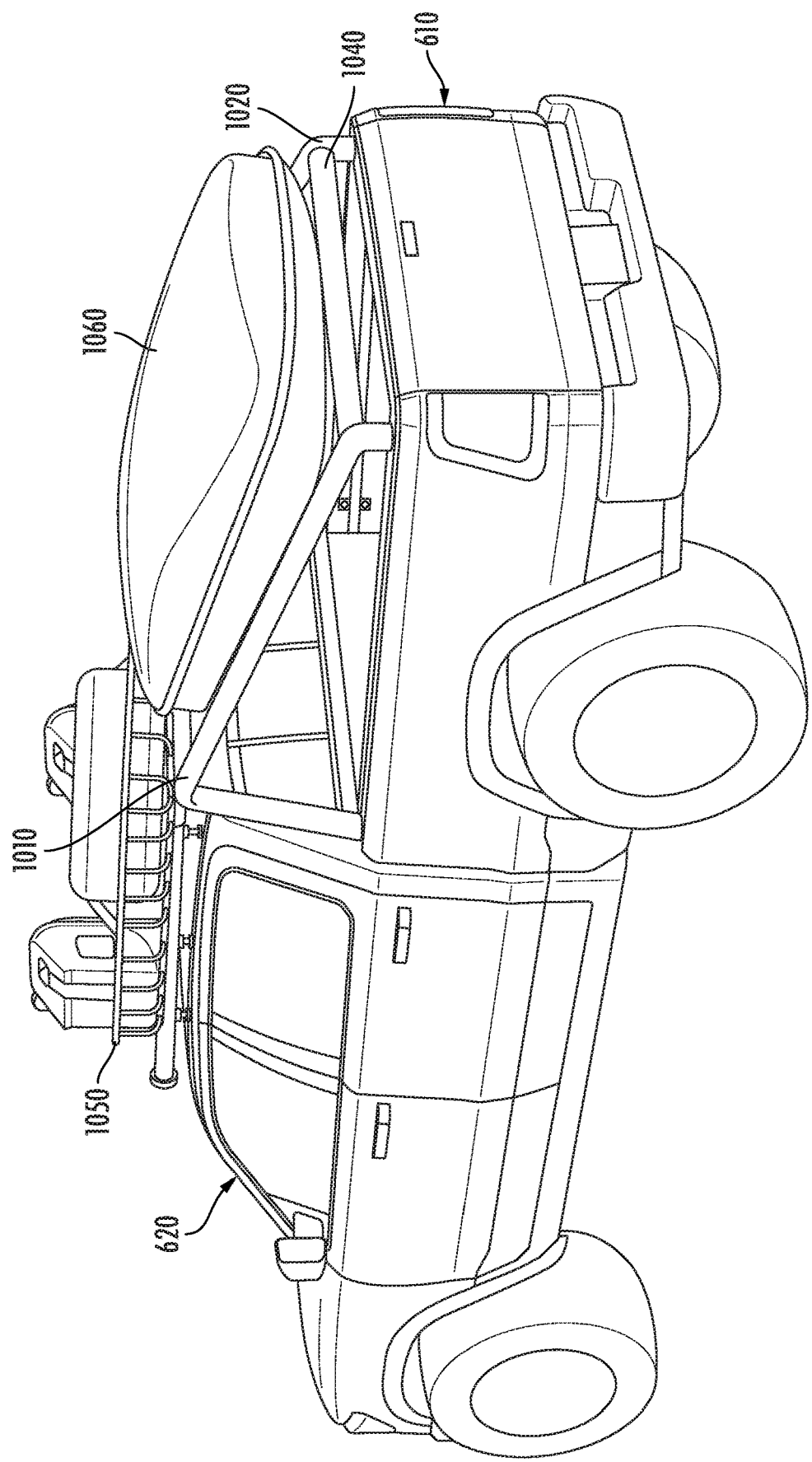

SKELETON FOR TRUCK BED AND CONVERTIBLE TOP

CROSS-REFERENCE TO RELATED APPLICATIONS

This application is a continuation-in-part application of U.S. patent application Ser. No. 16/040,416, filed Jul. 19, 2018, which is a continuation-in-part of U.S. patent application Ser. No. 15/916,976, filed on Mar. 9, 2018, which is a continuation-in-part application of U.S. patent application Ser. No. 15/336,702, filed Oct. 27, 2016, now U.S. Pat. No. 9,956,857, the entire contents of which are all incorporated herein by reference.

STATEMENT RE: FEDERALLY SPONSORED RESEARCH/DEVELOPMENT

Not Applicable

BACKGROUND

The various embodiments and aspects described herein relate to an accessory.

Sales of trucks have grown in the United States and abroad. These trucks are not only for industrial use but also for personal use. Individuals like trucks because they are versatile in that they can carry a load in the truck bed and also be configured to provide a protective covering over the truck bed. However, there are certain deficiencies in truck bed accessories.

Accordingly, there is a need in the art for improvement in use of truck bed accessories.

BRIEF SUMMARY

An accessory frame for a truck bed of the truck is disclosed herein. The accessory frame can be configured to provide for enclosure and also reconfigured so that the driver can utilize the full length, width, and height of the truck bed. For example, the accessory frame when configured to be open, a motorcycle can be loaded onto the truck bed even if the motorcycle is taller than the accessory frame. If the driver wants to form an enclosure over the truck bed, a foldable top can be deployed over the frame and also side panels can be attached to the frame to form the enclosure. Other accessories are also removably attachable to the frame including but not limited to a rack, flood lights and other accessories.

More particularly, a truck bed frame with a top traversable between a first opened configuration and a second closed configuration is disclosed. The truck bed frame may comprise the following components. A forward driver side post and a forward passenger side post disposed at forward corners of the truck bed, the forward driver and passenger side posts extending vertically upward with distal ends terminating at least about a height of the cab. A first set of rearward driver side post and a rearward passenger side post disposed at rearward corners of the truck bed. The first set of the rearward driver and passenger side posts may extend vertically upwards. A first set of driver and passenger side longitudinal extension members may extend between the forward and rearward driver and passenger side posts. A first top part of the top may be extendable between and may be removably attachable to the first set of driver and passenger side longitudinal extension members so that the first top part is traversed to the first opened configuration when the first top part is removed from the first set of driver and passenger side longitudinal extension members, and the top is traversed to the second closed configuration when the first top part is attached to the first set of driver and passenger side longitudinal extension members.

The first top part may further comprise a first rear cross member that extends between and is removably attachable to the upper portions of the rearward driver and passenger side posts of the first set. The first rear cross member may be removed from the upper portions of the first set of rearward driver and passenger side posts when the first top part is traversed to the first opened configuration. The first rear cross member may be attached to the upper portions of the first set of rearward driver and passenger side posts when the first top part is traversed to the second closed configuration.

The first top part may further comprise a first rear covering attachable to the first rear cross member and the first set of rearward driver and passenger side posts for providing a rain water tight seal with the first set of rearward driver and passenger side posts and the first rear cross member.

The frame may further comprise a front cross member that extends between and is attached to the upper portions of the forward driver and passenger side posts.

The frame may further comprise a front covering attachable to the front cross member and the forward driver and passenger side posts for providing a rain water tight seal with the forward driver and passenger side posts and the front cross member.

The frame may further comprise first driver and passenger side coverings attachable to the first set of driver and passenger side longitudinal extension members and the forward driver and passenger side posts and the first set of the rearward driver and passenger side posts for providing a rain water tight seal with the first set of driver and passenger side longitudinal extension members and the forward driver and passenger side posts and the first set of rearward driver and passenger side posts.

The first top part may be collapsible.

The frame may further comprise a second set of rearward driver side post and a rearward passenger side post which are shorter than the first set of the rearward driver side post and rearward passenger side post; and a second set of driver and passenger side longitudinal extension members that extend between and is attachable to the forward driver and passenger side posts and the second set of rearward driver and passenger side posts.

The frame may further comprise a second top part extendable between and is removably attachable to the second set of driver and passenger side longitudinal extension members so that the second top part is traversed to the first opened configuration when the second top part is removed from the second set of driver and passenger side longitudinal extension members, and the second top part is traversed to the second closed configuration when the second top part is attached to the second set of driver and passenger side longitudinal extension members.

The second top part may further comprise a second rear cross member that extends between and is removably attachable to the upper portions of the rearward driver and passenger side posts of the second set. The second rear cross member may be removed from the upper portions of the second set of rearward driver and passenger side posts when the second top part is traversed to the first opened configuration, and the second rear cross member may be attached to the upper portions of the second set of rearward driver and passenger side posts when the second top part is traversed to the second closed configuration.

The frame may further comprise second driver and passenger side coverings attachable to the second set of driver and passenger side longitudinal extension members and the forward driver and passenger side posts and the second set of the rearward driver and passenger side posts for providing a rain water tight seal with the second set of driver and passenger side longitudinal extension members and the forward driver and passenger side posts and the second set of rearward driver and passenger side posts.

The second top part may further comprise a second rear covering attachable to the second rear cross member and the second set of rearward driver and passenger side posts for providing a rain water tight seal with the second set of rearward driver and passenger side posts and the second rear cross member.

According to another embodiment, there is provided a truck bed cover for a truck bed. The truck bed cover may include a pair of side posts disposable adjacent respective forward corners of the truck bed so as to extend vertically upward from the truck bed and terminate at a respective top end at least about a height of the cab. A first pair of longitudinal extension members may extend from respective ones of the pair of side posts. A second pair of longitudinal extension members may extend from respective ones of the pair of side posts in spaced relation to the first pair of longitudinal extension members. A first pair of primary connectors may be connected to respective ones of the first pair of longitudinal extension members. A second pair of primary connectors may be connected to respective ones of the second pair of longitudinal extension members. The truck bed cover may additionally include a top having a top panel and a pair of secondary connectors coupled to the top panel. The top may be transitional between a first deployed position, and a second deployed position. In the first deployed position, the pair of secondary connectors may be coupled to respective ones of the first pair of primary connectors, and in the second deployed position, the pair of secondary connectors may be coupled to respective ones of the second pair of primary connectors.

The first pair of primary connectors may be identical to the second pair of primary connectors.

The first pair of longitudinal extension members may extend from respective ones of the pair of side posts adjacent the top ends thereof. Each of the pair of side posts may include a bottom end opposite the top end, and the second pair of longitudinal extension member extend from respective ones of the pair of side posts adjacent the bottom end thereof. The first pair of longitudinal extension members may be parallel to the second pair of longitudinal extension members.

Each of the pair of secondary connectors may include a portion pivotable relative to the top panel.

The pair of secondary connectors may be selectively engageable with the first pair of primary connectors and the second pair of primary connectors via snap-fit engagement.

According to another embodiment, there is provided a truck bed cover for a truck bed. The truck bed cover may comprise a pair of side posts disposable adjacent respective forward corners of the truck bed so as to extend vertically upward from the truck bed and terminate at a respective top end at least about a height of the cab. A pair of longitudinal extension members may extend from respective ones of the pair of side posts. A first pair of primary connectors may be connected to respective ones of the pair of longitudinal extension members, and a second pair of primary connectors may be positionable at respective portions of the truck bed. The truck bed cover may additionally include a top having a top panel and a pair of secondary connectors coupled to the top panel. The top may be transitional between a first deployed position, and a second deployed position. In the first deployed position, the pair of secondary connectors may be coupled to respective ones of the first pair of primary connectors, and in the second deployed position, the pair of secondary connectors may be coupled to respective ones of the second pair of primary connectors.

According to yet another embodiment, there is provided a cover for a truck bed comprising a pair of truck bed walls. The cover may comprise a pair of support frames engageable with the truck bed in opposed relation to each other. Each support frame may include an upper longitudinal member and a lower longitudinal member spaced from the upper longitudinal member. A pair of upper connectors may be coupled to respective ones of the pair of support frames at the upper longitudinal member thereof. A pair of lower connectors may be coupled to respective ones of the pair of support frames at the lower longitudinal member thereof. The cover may additionally include a top having a top panel and a pair of panel connectors coupled to the top panel. The top may be transitional between a first deployed position, and a second deployed position. In the first deployed position, the pair of panel connectors may be coupled to respective ones of the pair of upper connectors, and in the second deployed position, the pair of panel connectors may be coupled to respective ones of the pair of lower connectors.

According to another embodiment, a truck bed cover for a truck bed comprises an external frame connectable to the truck bed. The external frame includes a pair of forward side posts disposable adjacent respective forward corners of the truck bed so as to extend vertically upward from the truck bed and terminate at a respective top end at least about a height of the cab. A pair of rearward side posts are disposable adjacent respective rearward corners of the truck bed so as to extend vertically upward from the truck bed and terminate at a respective top end at least about a height of the cab. The external frame further includes a pair of longitudinal extension members, with each longitudinal extension member extending between a respective one of the pair of forward side posts and a respective one of the pair of rearward side posts. The truck bed cover additionally comprises a top engageable with the external frame so as to be positioned over the truck bed to at least partially define an enclosure over the truck bed. The top and the external frame are sized and structured such that when the top is engaged with the external frame, the external frame is outside of the enclosure.

The top may include a top panel and a pair of side panels foldable relative to the top panel. The top may further include a rear panel foldable relative to the top panel and extendable between the pair of side panels. The rear panel may include a transparent section and a non-transparent section at least partially surrounding the transparent section. The transparent section may be at least partially detachable from the non-transparent section. The top panel may be detachable from one of the side panels.

The top may be transitional between a deployed configuration and a stowed configuration. The top may fold onto itself as the top transitions from the deployed configuration toward the stowed configuration.

The top may include at least two panels joined at a seam, with a portion of the external frame extending parallel to the seam when the top is engaged with the external frame.

The external frame may include at least one transverse member extending between the pair of longitudinal extension members. The external frame may include at least three transverse members in spaced relation to each other.

According to another embodiment, a truck bed cover for a truck bed comprises an external frame connectable to the truck bed and having a first end portion positionable adjacent a first end of the truck bed and a second end positionable adjacent a second end of the truck bed. A top may be engageable with the external frame so as to be positioned over the truck bed to at least partially define an enclosure over the truck bed. The top and the external frame may be sized and structured such that when the top is engaged with the external frame, the external frame is outside of the enclosure.

Another implementation of the truck bed cover may include an external frame connectable to the truck bed. The external frame may include a pair of forward side posts disposable adjacent respective forward corners of the truck bed so as to extend vertically upward from the truck bed, and a pair of rearward side posts disposable adjacent respective rearward corners of the truck bed so as to extend vertically upward from the truck bed. The external frame may additionally include a pair of longitudinal extension members. Each longitudinal extension member may extend between a respective one of the pair of forward side posts and a respective one of the pair of rearward side posts. The truck bed cover may further include a weather strip engageable with the external frame and positionable between the external frame and the cab to form a water tight seal between the external frame and the cab. A top may be engageable with the external frame so as to be positioned over the truck bed to at least partially define an enclosure over the truck bed. The top and the external frame may be sized and structured such that when the top is engaged with the external frame, the external frame is outside of the enclosure.

The weather strip may be inflatable. The weather strip may be compressible. The weather strip may define an opening that is alignable with a window on the cab when the weather strip is positioned between the external frame and the cab. The weather strip may circumnavigate the opening.

Yet another implementation of the truck bed cover may include an external frame connectable to the truck bed. The external frame may include a pair of forward side posts disposable adjacent respective forward corners of the truck bed so as to extend vertically upward from the truck bed, and a pair of rearward side posts disposable adjacent respective rearward corners of the truck bed so as to extend vertically upward from the truck bed. The external frame may also include a pair of longitudinal extension members, with each longitudinal extension member extending between a respective one of the pair of forward side posts and a respective one of the pair of rearward side posts. The truck bed cover may also include a rack slidably connected to the external frame. A top may be engageable with the external frame so as to be positioned over the truck bed to at least partially define an enclosure over the truck bed. The top and the external frame may be sized and structured such that when the top is engaged with the external frame, the external frame is outside of the enclosure.

The truck bed cover may additionally include pair of rails coupled to respective ones of the pair of longitudinal extension members, the rack being slidable along the pair of rails. Each of the pair of rails may include a first section positionable over the cab, and a second section extendable along the respective one of the pair of longitudinal extension members. The first section may be angled relative to the second section. The wherein the rack may be pivotable relative to the pair of rails.

Still another implementation of the truck bed cover may include an external frame connectable to the truck bed. The external frame may include a pair of forward side posts disposable adjacent respective forward corners of the truck bed so as to extend vertically upward from the truck bed, and a pair of rearward side posts disposable adjacent respective rearward corners of the truck bed so as to extend vertically upward from the truck bed. The external frame may also include a pair of longitudinal extension members, each longitudinal extension member extending between a respective one of the pair of forward side posts and a respective one of the pair of rearward side posts and having a segment that slopes downwardly toward the tailgate in a direction from the forward side posts toward the rearward side posts. The truck bed cover may additionally include a top engageable with the external frame so as to be positioned over the truck bed to at least partially define an enclosure over the truck bed. The top and the external frame may be sized and structured such that when the top is engaged with the external frame, the external frame is outside of the enclosure.

The forward side posts may extend vertically upward from the truck bed by a first height and the pair of rearward side posts may extend vertically upward from the truck bed by a second height less than the first height.

The truck bed cover may additionally include a biasing element coupled to the upper panel and at least one of the pair of longitudinal extension members.

The truck bed cover may further comprise a crossbar extending between the forward side posts, and a hinge pivotally connecting the top to the crossbar.

According to yet another embodiment, the truck bed cover may further comprise a front crossmember that extends along a forward edge of the truck bed, along a rear edge of a truck cabin, and/or between a pair of forward side posts that extend upwards from the forward corners of the truck bed. The front crossmember may comprise a recess that accepts a front edge of a top cover of the frame. This coupling may be a hinged connection that allows the top to rotate relative to the recess.

According to yet another embodiment, slideable rails may be embedded within members of the frame, such as longitudinal or crosswise members along a side of the truck bed, longitudinal members that extend between posts of the frame, or even rooftop members that extend along a surface of a truck cabin. In preferred embodiments, the slideable rails comprise a recess that runs along a length of a member of the frame. Such recesses could extend along a length of one member to feed into a recess along a length of another member, for example a recess could extend along a length of a longitudinal member coupled to a rooftop mount, where the recess of the longitudinal member feeds into the recess of the rooftop mount. By utilizing such configurations, an extended recess and/or rail could be configured to allow a rack to slide along a length of discrete members that are attached to one another longitudinally.

In some embodiments, the rooftop mount could be hingedly coupled to other members of the frame, such that the rooftop mount could rotate between a position above a cabin of a truck and a position above a bed of a truck. In embodiments where the frame is slanted, the rooftop mount could be configured to rotate at least 90, 180, 210, or even 250 degrees.

Any suitable sliding mechanism could be used to slide a rack along a length of a member of the frame, for example wheels or mating projections. Preferably, the sliding mechanisms further comprise a lock to prevent the rack from sliding along a recess or a rail when in a locked position, and allow sliding when in an unlocked position. The sliding mechanisms are preferably located along a bottom edge of a rack to improve stability and connection between the rack and the rail. In preferred embodiments, a plurality of different types of racks could be configured to mate with the same rail or recess, allowing racks to be interchangeable, and also allowing a plurality of racks to be coupled to the same rail.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 41A shows a pivot mechanism configured to facilitate pivotal movement of the roof rack relative to the rails;

FIG. 69 shows a perspective view of the frame of FIG. 68 having the rack moved to a different position along the frame.

DETAILED DESCRIPTION

Figure 1:
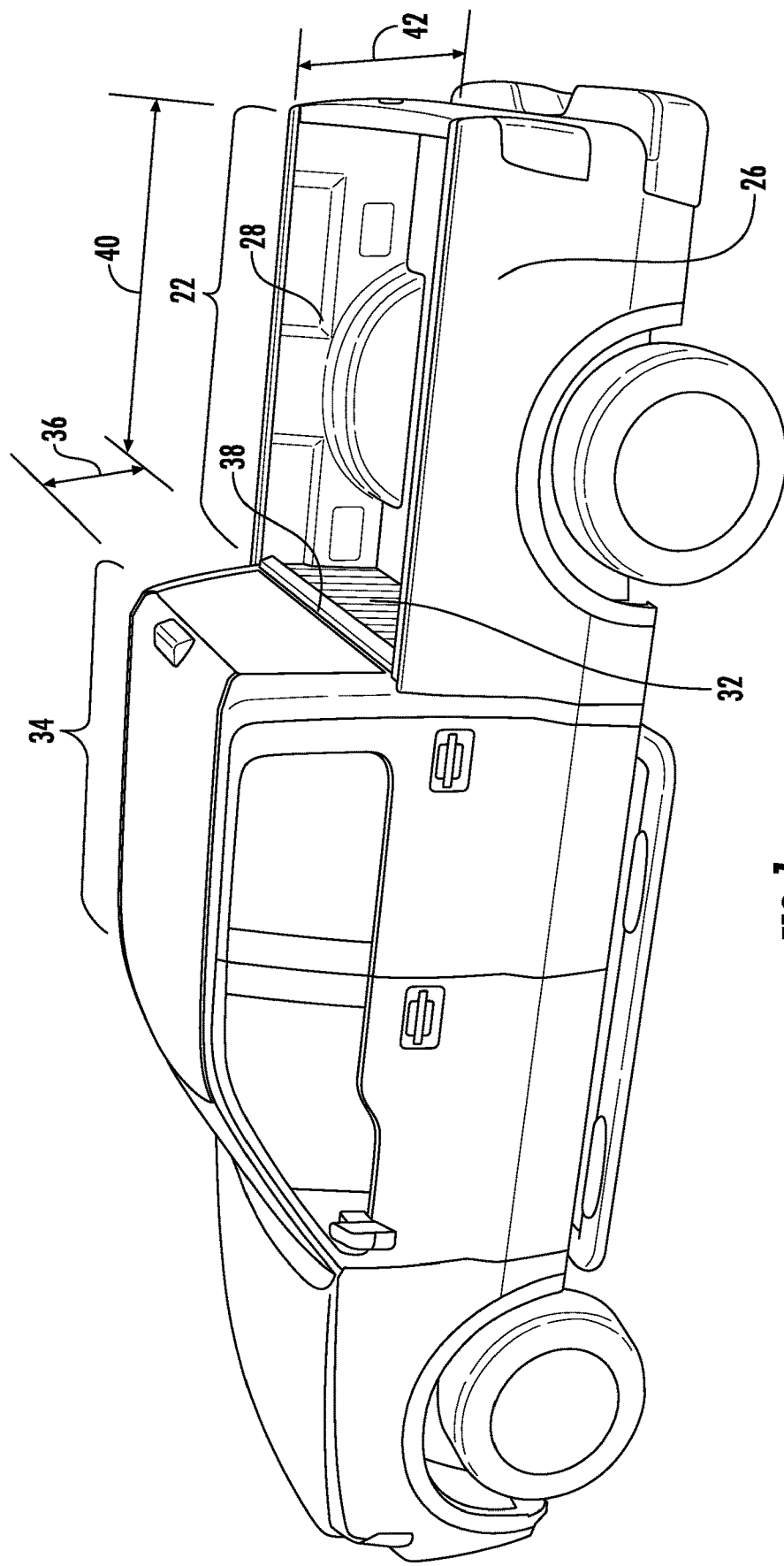
FIG. 1 is a perspective view of a truck.

Referring now to the drawings, a truck bed accessory frame 10, 210 (see FIGS. 4 and 23) is shown. The frame 10, 210 allows for various accessories to be removably mounted thereto such as a foldable top 12 (see FIGS. 4 and 14), removable side panels 14 (see FIG. 8), roof rack 16 (see FIG. 16), and pop-up top 18 are shown. The truck bed accessory frame 10, 210 may be configured to be enclosed, as shown in FIG. 15, partially open by removing one or more panels 14 or have an open top by removing the top 12 (see FIG. 13) so that a motorcycle 20 can fit in a truck bed 22. The truck bed accessory frame may form a box configured storage area, as shown in FIG. 9, or a slant back configuration, as shown in FIGS. 12, and 23-25. The truck bed accessory frame 10, 210 provides for flexible configuration that allows the user to have an enclosed truck bed area and one that is reconfigurable so that the full-length and height of the truck bed can be utilized and does not prevent the user from loading a motorcycle or something that is too high on the truck bed because of the truck bed accessory frame 10, 210.

Referring now to FIG. 1, a truck 24 shown. The truck 24 may have the truck bed 22. The truck bed has first and second sidewalls 26, 28, a tailgate 30, a front wall 32 and a cab 34 which is disposed in front of the front wall 32. The cab 34 also has a height 36 that extends vertically above a top edge 38 of the front wall 32. The truck bed 22 may have a length 40 of a short bed (e.g. 4 feet to 6.5 feet) or a long bed (e.g. 7 feet to 8 feet). The truck bed accessory frame 10, 210 may be sized and configured to be mounted to truck beds having various lengths 40 and widths 42.

Figure 2:
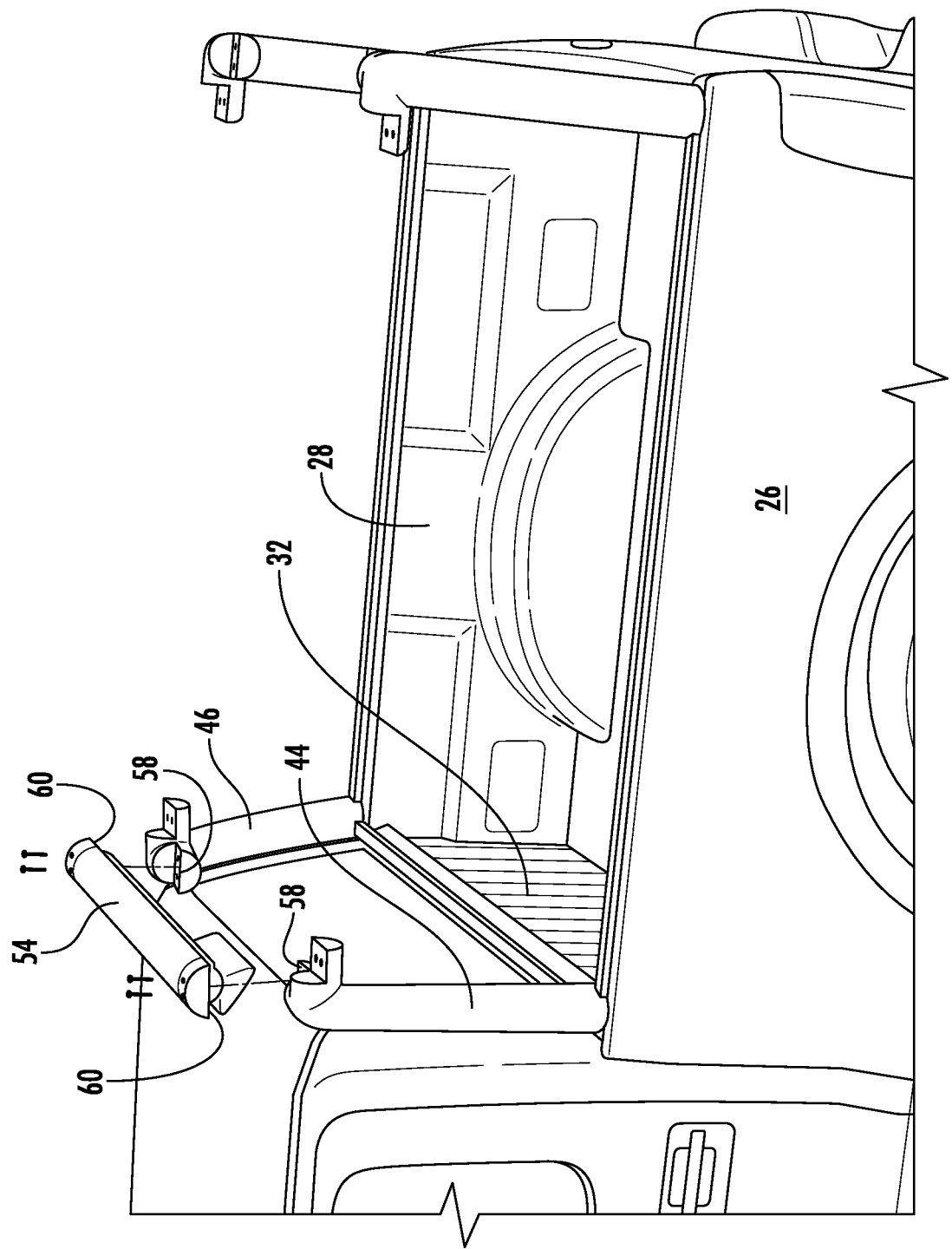
FIG. 2 is a perspective view of a truck bed with an exemplary frame being assembled on the truck bed.
Figure 23:
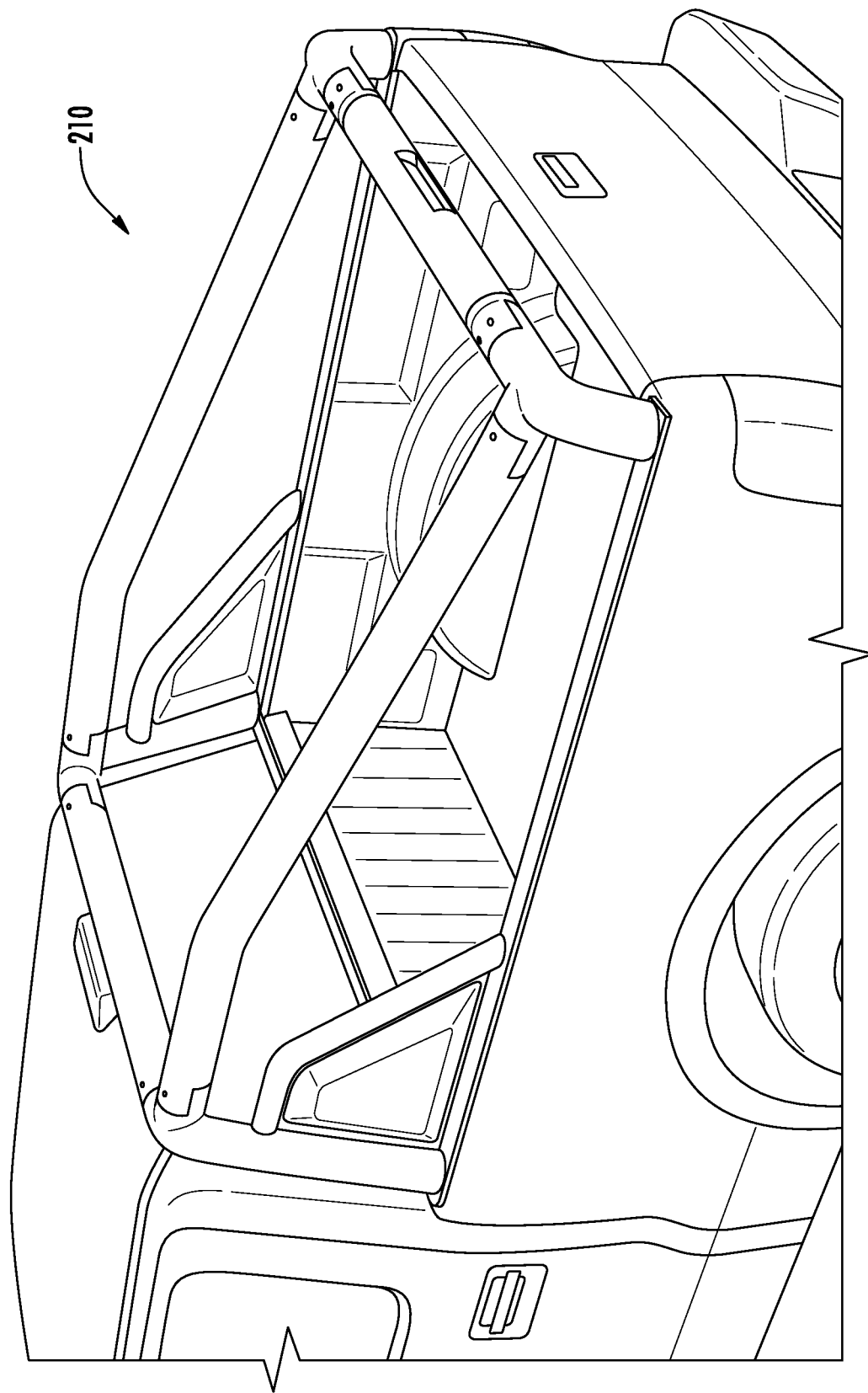
FIG. 23 illustrates a second embodiment of a frame.

Referring now to FIG. 2, the truck bed accessory frame 10 may have a forward driver side post 44, a forward passenger side post 46, a rearward driver side post 48, a rearward passenger side post 50 which are respectively aligned to corners of the truck bed 22, namely, the intersection between the first side wall 26 and the front wall 32, the intersection between the second sidewall 28 and the front wall 32 and the rear end portions of the first and second sidewalls 26, 28. The forward driver side and passenger side posts 44, 46 and the rearward driver side and passenger side posts 48, 50 may be mounted to a subframe 52. The subframe 52 may extend from the forward driver side post 44 to the rearward driver side post 48 and from the forward driver side post 44 to the forward passenger side post 46 and from the forward passenger side post 46 to the rearward passenger side post 50. The posts 44, 46, 48, 50 may be welded to the subframe 52. The subframe 52 may extend along the length of both sidewalls 26, 28 and along the front side above the top edge 38 of the front wall 32. The rearward driver side and passenger side posts 48, 50 may be similarly sized to the forward driver side and passenger side posts 44, 46, or alternatively, a rearward driver side and passenger side posts 248, 250 may be shorter as shown in FIG. 23, as will be discussed further below.

Figure 5:
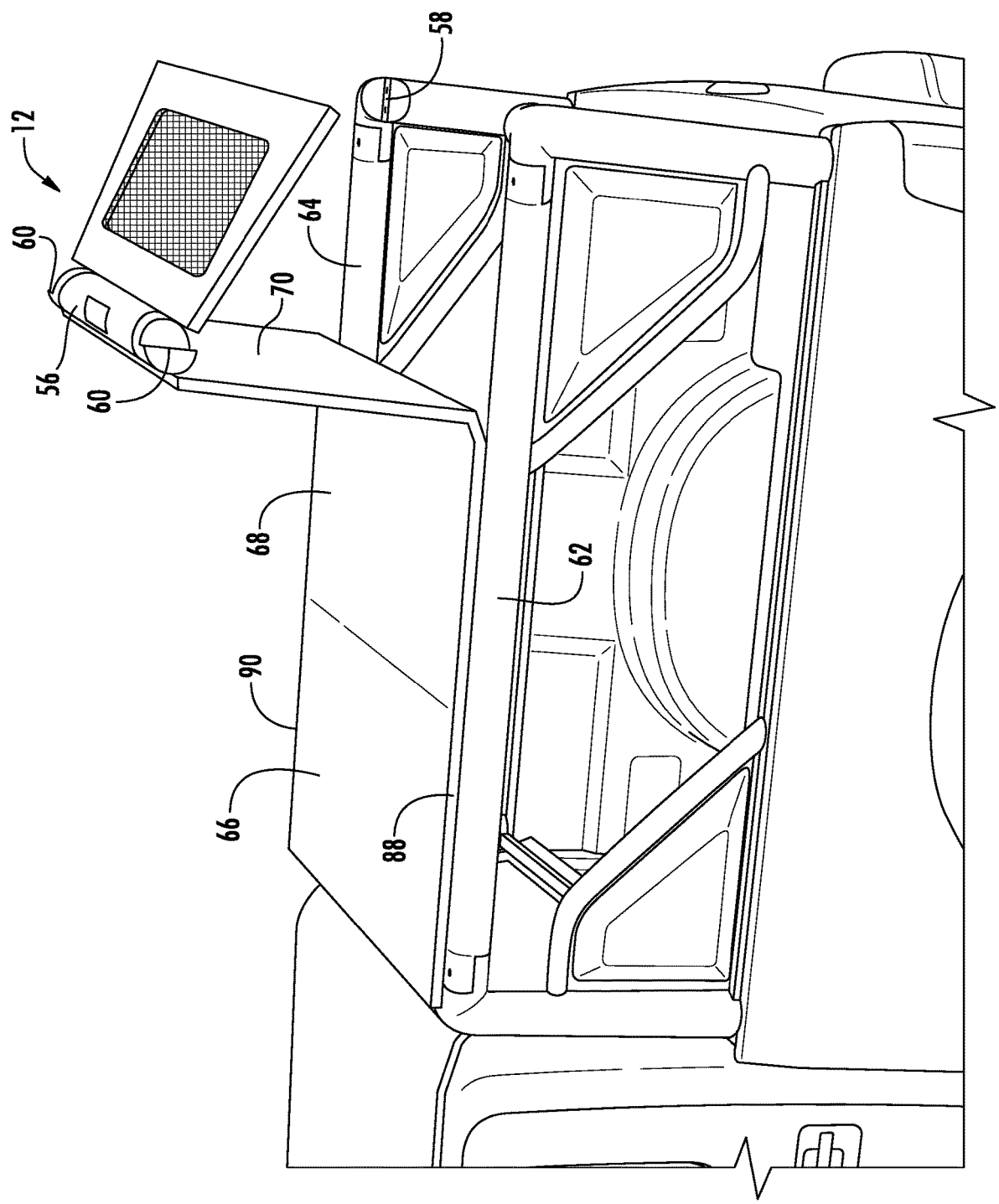
FIG. 5 is a perspective view of the truck bed and frame of FIG. 2 with the top being deployed on the frame.

The truck bed accessory frame 10, 210 may have a front crossmember 54 and a rear crossmember 56. The front crossmember 54 may be secured to the forward driver side and passenger side posts 44, 46 with fasteners. The front crossmember 54 and the upper end portions of the forward driver side and passenger side posts 44, 46 may have mating cutouts 58, 60, as shown in FIG. 2. The rear crossmember 56 may be secured to the rearward driver side and passenger side posts 48, 50 with fasteners as well. Similar to the front crossmember 54, the rear crossmember 56 and the upper end portions of the rearward driver side and passenger side posts 48, 50 may have mating cutouts 58, 60, as shown in FIG. 5. Although fasteners are not shown, they may be inserted into the apertures and received into respective threaded apertures. Additionally, the rear crossmember 56 may be easily removed and attached to the rearward driver side and passenger side posts 48, 50 by utilizing speed fasteners such as ball-lok pins fabricated by Avibank Manufacturing in Burbank, Calif.

Figure 3:
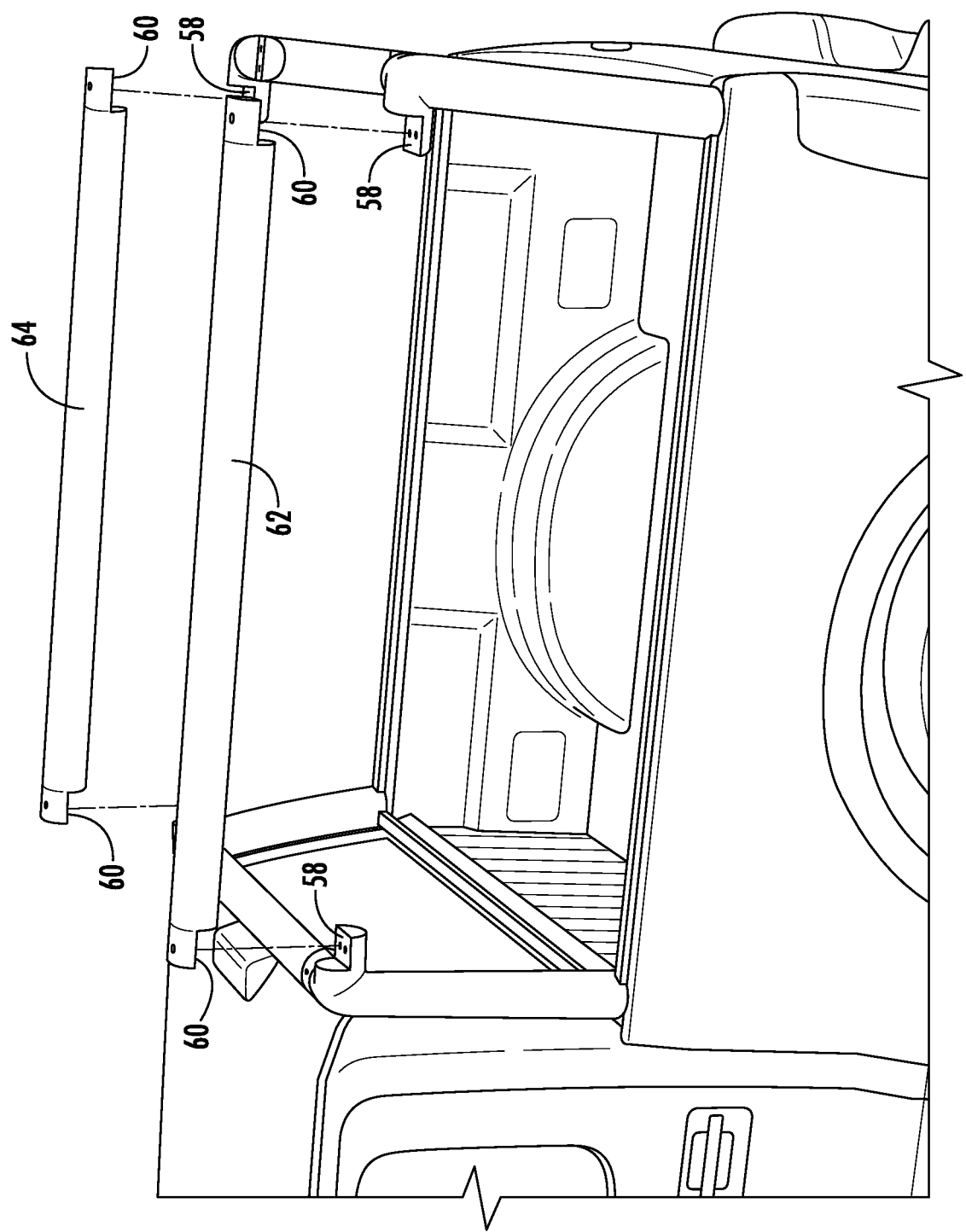
FIG. 3 is a perspective view of the truck bed with the frame of FIG. 2 being further assembled on the truck bed.

Referring now to FIG. 3, the truck bed accessory frame 10 may also have driver and passenger side longitudinal extension members 62, 64. The extension members 62, 64 may be secured to the forward and rearward driver side posts 44, 48 wherein the extension member 62, 64 on opposing end portions thereof and the upper end portions of the forward and rearward driver side posts 44, 48 may have mating cutouts 58, 60 that are secured to each other with fasteners, and the upper end portions of the forward and rearward passenger side posts 46, 50 may have mating cutouts 58, 60 that are secured to each other with fasteners.

Figure 4:
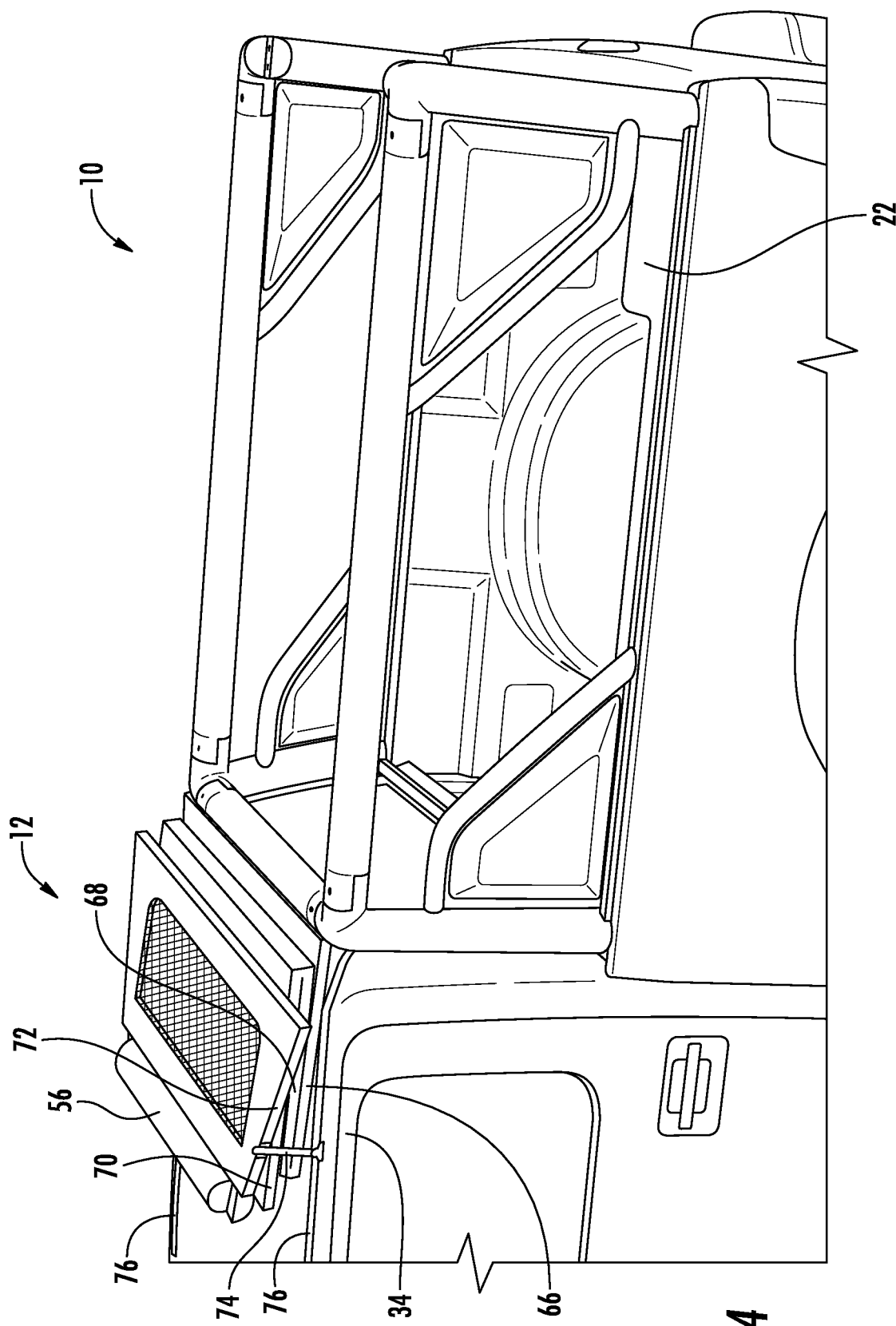
FIG. 4 is a perspective view of the truck bed and the frame of FIG. 2 with a top folded over a cab of the truck.
Figure 6:
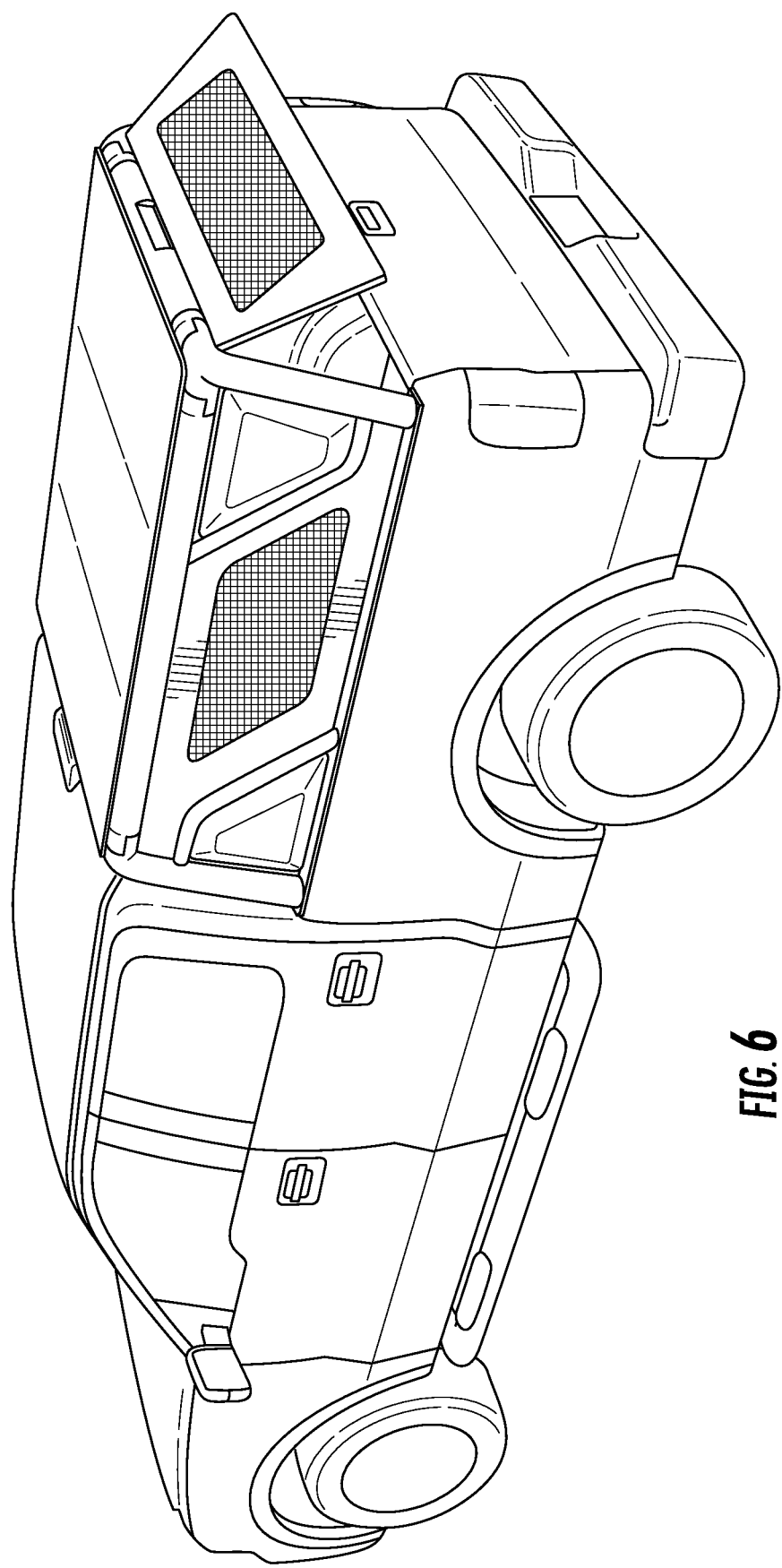
FIG. 6 is a perspective view of the truck bed and the frame of FIG. 2 with the top and side panels deployed on the frame.
Figure 7:
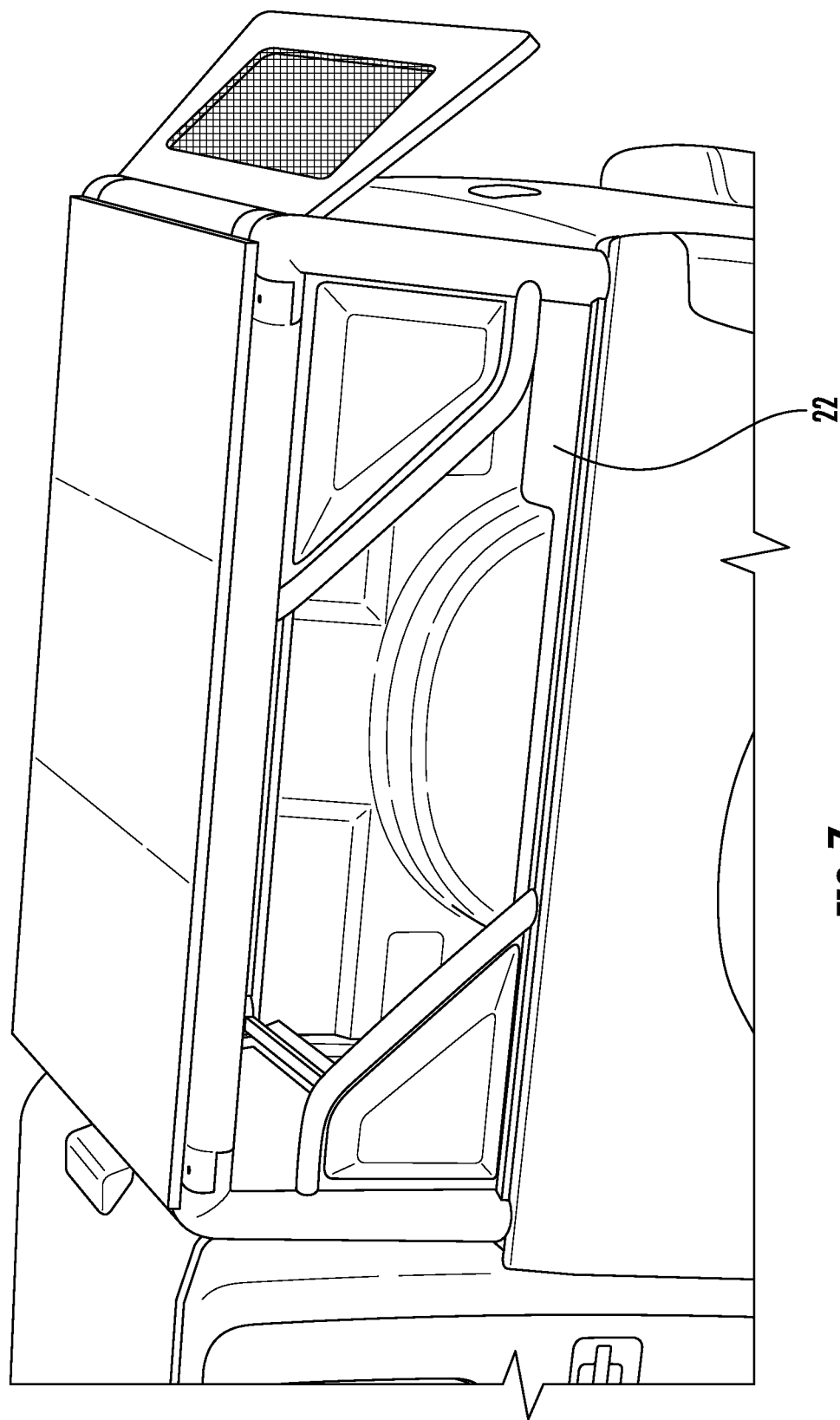
FIG. 7 is a perspective view of the truck bed and the frame of FIG. 2 with the side panels removed from the frame.

Referring now to FIGS. 4-7, the foldable top 12 is shown. The foldable top 12 may be stored above the cab 34 when the user wants full use of the truck bed 22. Alternatively, the user can deploy the top 12 as shown in FIGS. 6 and 7 so that the truck bed 22 is enclosed. The enclosure formed by the truck bed accessory frame 10 may be fully enclosed by securing side panels 14 to the respective posts 44, 46, 48, 50 and the front crossmember 54. The top 12 may have three panels 66, 68, 70 and a rear hatch 72. The panels 66, 68, 70 and the rear hatch 72 may be folded upon each other and stored above the cab 34, as shown in FIG. 4. The foldable top 12 may be secured to the roof of the cab 34 with rubber lockouts 74 (see FIG. 9). The rubber lockouts 74 may be attached to the rear hatch 72 and the roof of the cab 34 on both sides of the rear hatch 72. The rubber lockouts 74 may be secured to roof accessory rails 76 of the cab 34. The rubber lockouts 74 has a first part 78 secured to the rail 76 of the roof of the cab 34. The rubber lockouts 74 also has the second part 80 secured to the rear hatch 72. There is a rubber extension member 82 that is pivotally secured to the second part 80. The rubber extension member 82 may have a handle 84 that can be grasped to stretch the rubber extension member 82 so that an enlarged portion 86 can be pulled out of the first part 78 to dislodge the enlarged portion 86 of the rubber extension member 82 out of the first part 78. In this way, the panels 66, 68, 70 and the rear hatch 72 may be traversed from the stored position as shown in FIG. 4 to the deployed position as shown in FIG. 7. Left and right edges 88, 90 of the panels 66, 68, 70 may be secured to the driver and passenger side longitudinal extension members 62, 64 with removable fasteners including but not limited to screws, ball-lok pins and rubber lockouts 74 that are secured along the length of the edges 88, 90 and the driver and passenger longitudinal extension members 62, 64. Also, the rear crossmember 56 may be secured to the upper end portions of the rearward driver side and passenger side posts 48, 50 with fasteners or quick release fasteners.

Referring now to FIGS. 5-7, the rubber lockouts are not shown. However, this is merely for purposes of clarity. As is the case in relation to FIG. 19, the rubber lockouts 74 may be disposed about the top 12 in order to hold the top 12 down while driving the truck 24.

Figure 8:
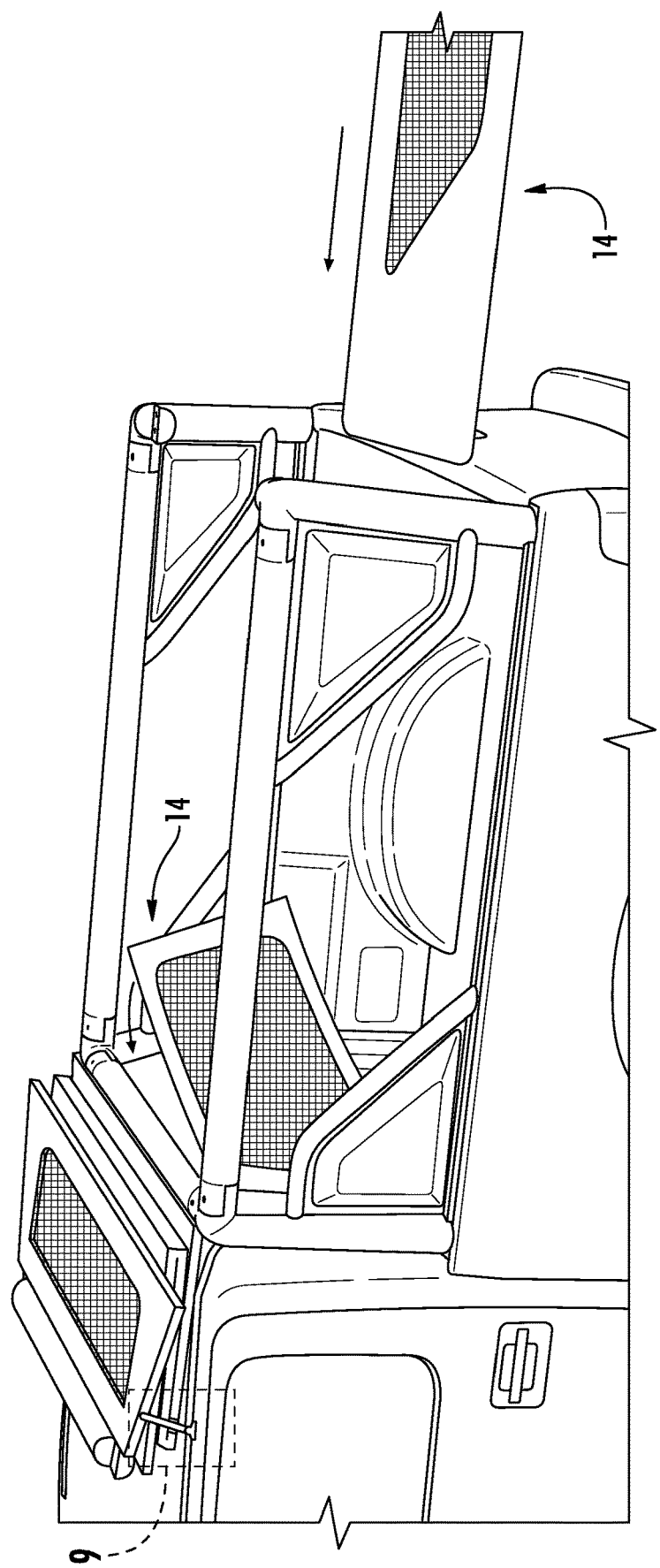
FIG. 8 illustrates side panels being mounted to the frame of FIG. 2.
Figure 9:
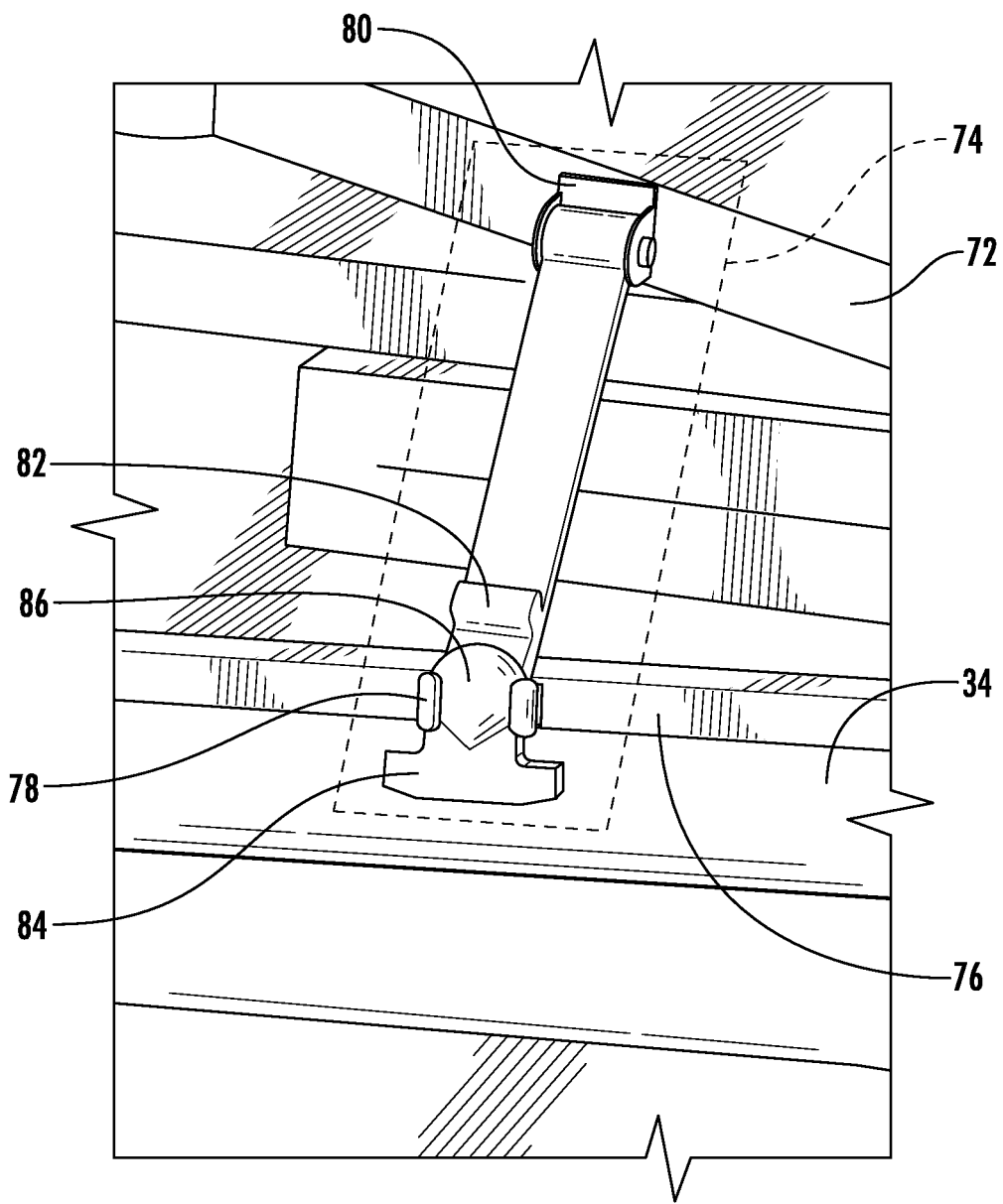
FIG. 9 illustrates rubber lockouts for securing the folded top to the cab, as shown in FIG. 4.
Figure 10:
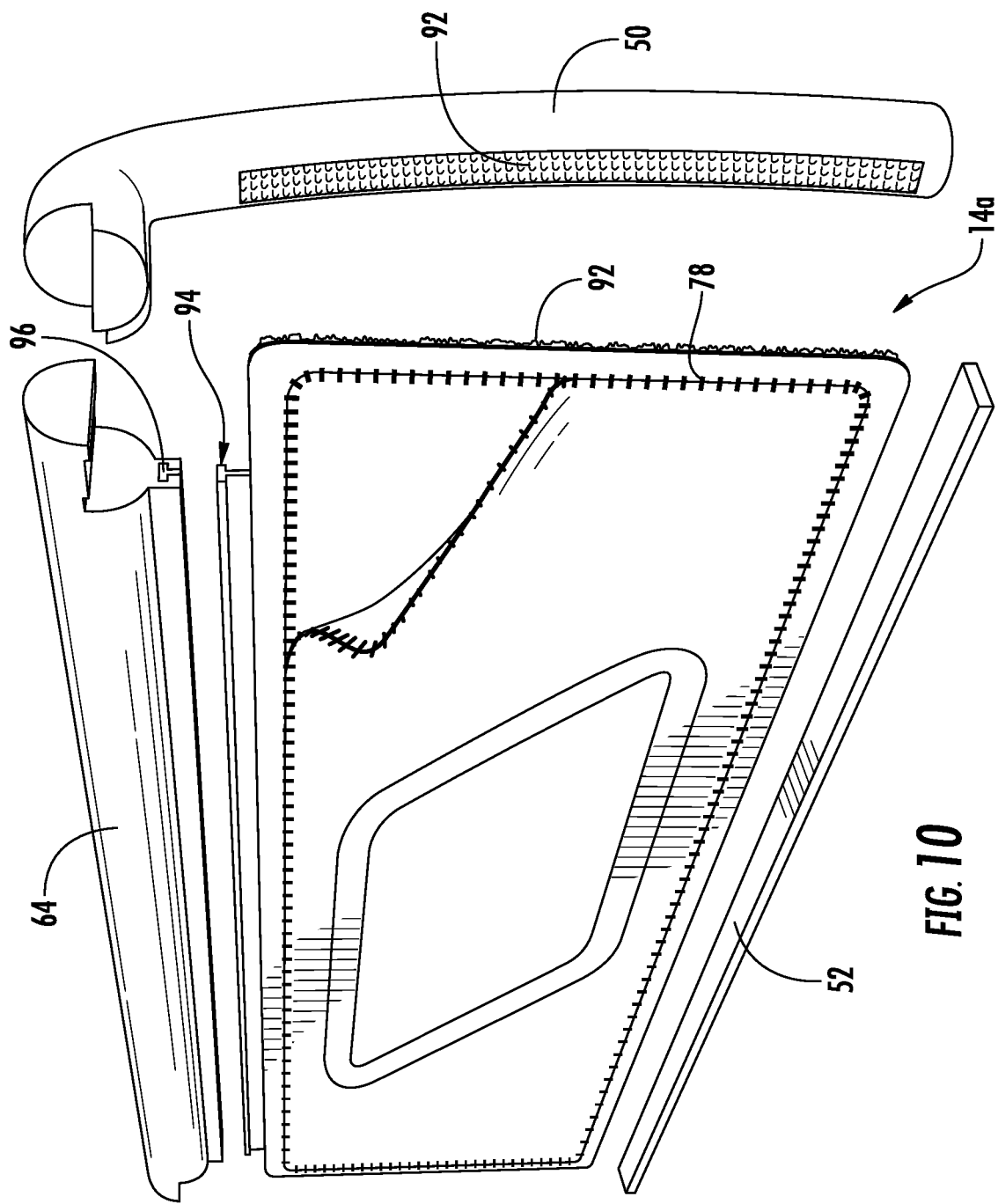
FIG. 10 illustrates the side panel and a first embodiment of securing the side panel to the frame of FIG. 2.
Figure 11:
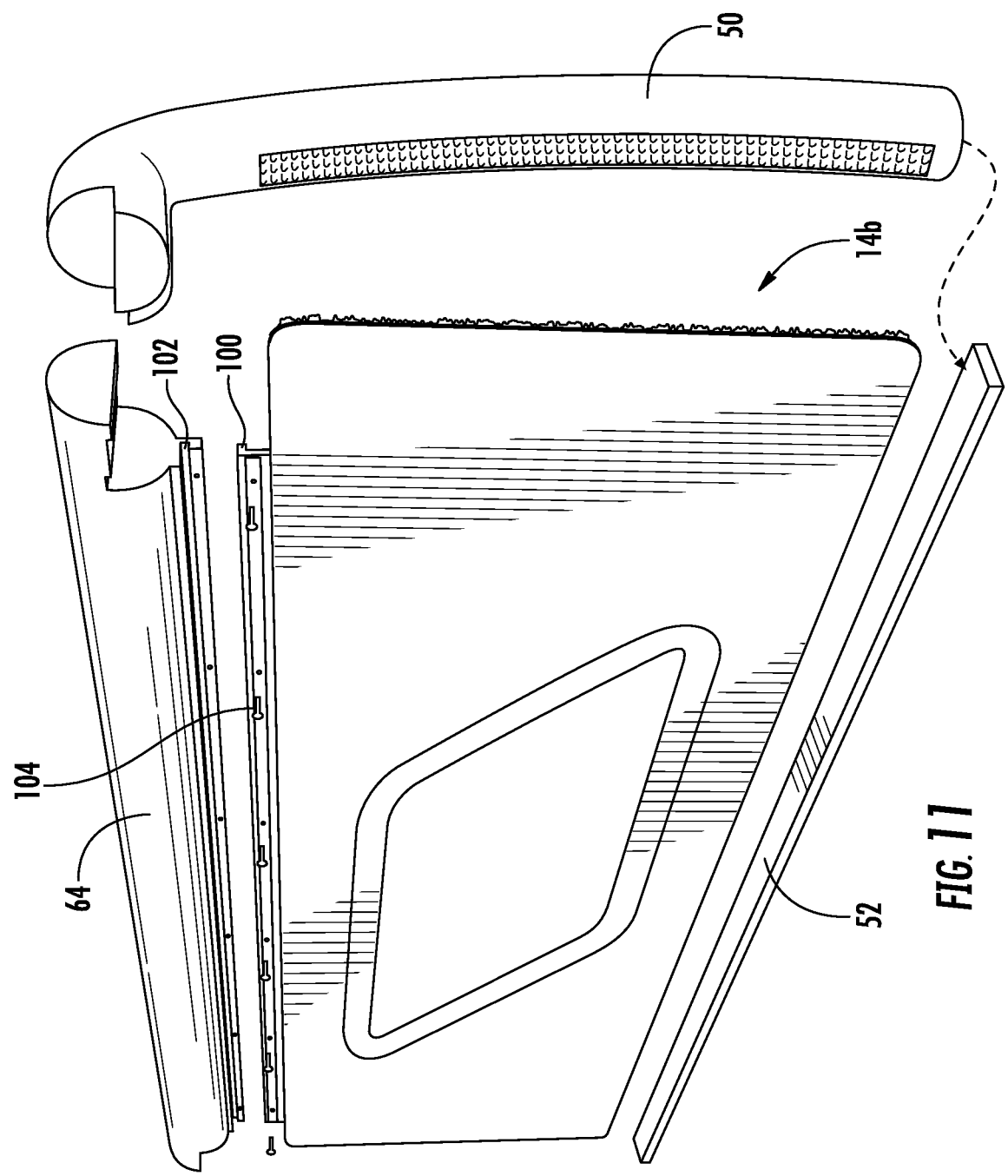
FIG. 11 illustrates a side panel and a second embodiment of securing the side panel to the frame of FIG. 2.

Referring now to FIG. 8, panels 14 may be secured to the frame 10 in order to form an enclosure. The panels 14 may be attached to the sides and the front of the frame 10. The panels 14 may be removably secured to the posts 44, 46, 48, 50 and the front crossmember 54 as shown in FIGS. 10 and 11. In FIGS. 10 and 11, the side panel 14 is shown as being removably securable to the passenger longitudinal extension member 64 and the rearward passenger side post 50 and the subframe 52. The subframe 52 and the rearward passenger side post 50 are shown as being detached from each other but this is for clarity. The bottom end of the rearward passenger side post 50 may be permanently secured to the subframe 52. The rearward passenger side post 50 is shown as being detached from the passenger longitudinal extension member 64 for the purpose of showing the interconnection between the panel 14 and the subframe 52, the rearward passenger side post 50 and the passenger longitudinal extension member 64. FIGS. 10 and 11 illustrate two different means of attaching the panel to the frame 10. In FIG. 10, the panel 14a may be secured to the rearward passenger side post 50 with hooks and loops. The upper edge of the panel 14a may be secured to the passenger longitudinal extension member 64 with a T slot. The panel 14a may have a T shaped male prong 94 and the passenger longitudinal extension member 64 may have a mating T shaped cavity 96. The T shaped male prong 94 may be slid into the female cavity 96. Thereafter, the passenger longitudinal extension member 64 may be secured to the passenger side posts 46, 50 with fasteners. The hooks and loops 92 may be used to attach the panel 14a to the forward and rearward passenger side posts 46, 50. Hooks and loops may also be used to secure the panel 14a to the subframe 52. Once the panel 14a is secured, a zipper 98 may be used to open up or close the side of the frame 10. The same structure used to secure the panel 14a to the passenger side of the frame 10 may also be utilized to secure a panel 14a to the front and driver sides of the frame 10.

In FIG. 11, the panel 14b may be secured to the frame 10 in the same manner except that the panel 14b does not have a zippered window and the interconnection between the panel 14b and the passenger longitudinal extension member 64 may be with an L shaped slot. In particular, this embodiment allows the panel 14b to be secured to the frame while the passenger longitudinal extension member 64 is already mounted to the passenger side posts 46, 50. The L shaped prong 100 may be received into an L shaped cavity 102. Fasteners 106 may be used to screw and hold the L shaped prong 100 into the L shaped cavity 102. The interconnections between the T shaped prong and the L shaped prong 94, 100 form a watertight connection. The T shaped prong and the L shaped prong 94, 100 connects to form a watertight connection with the passenger longitudinal extension member 64, driver longitudinal extension member 62 and the front crossmember 54.

Figure 12:
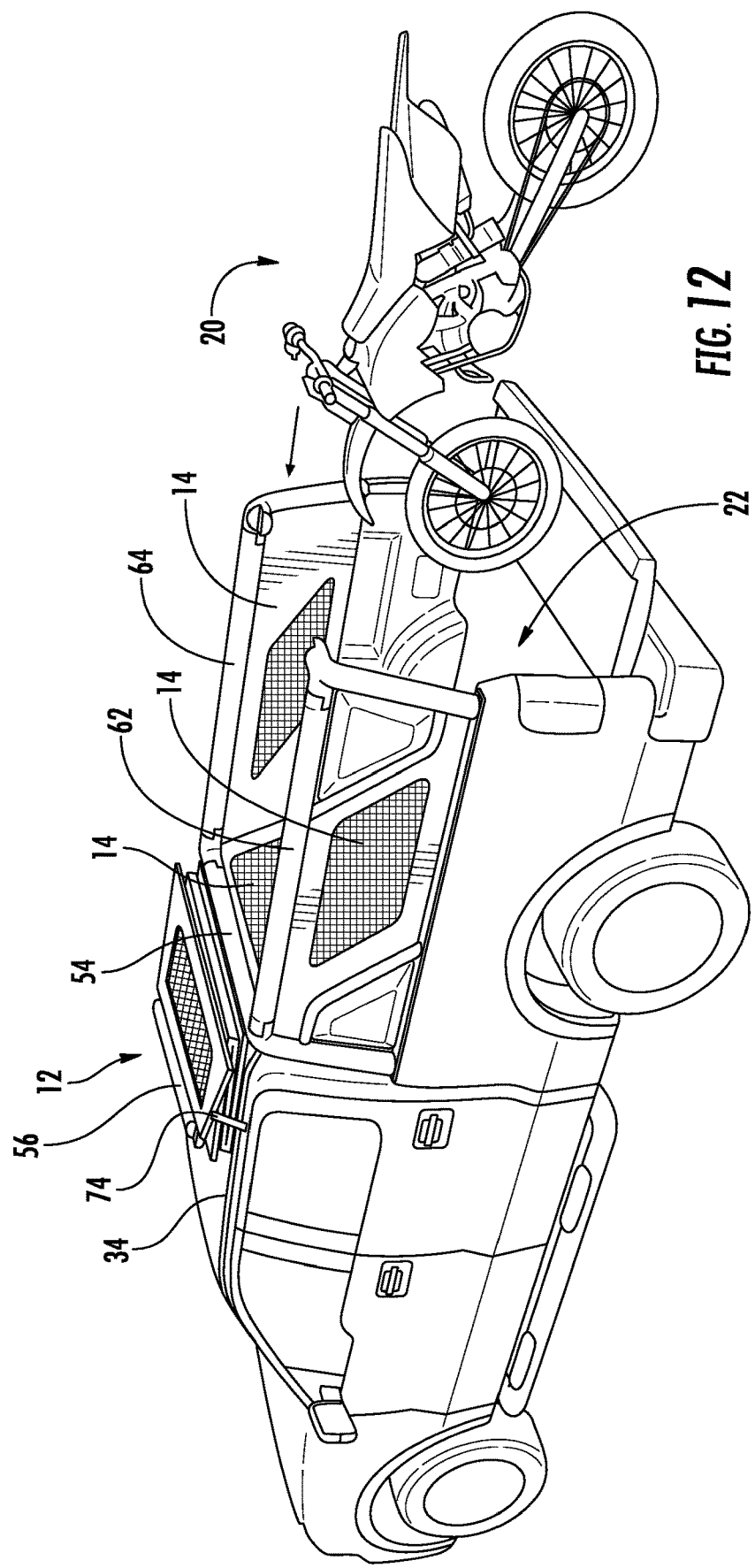
FIG. 12 illustrates a motorcycle being loaded on the truck bed and the top being in a stored position over the cab.
Figure 13:
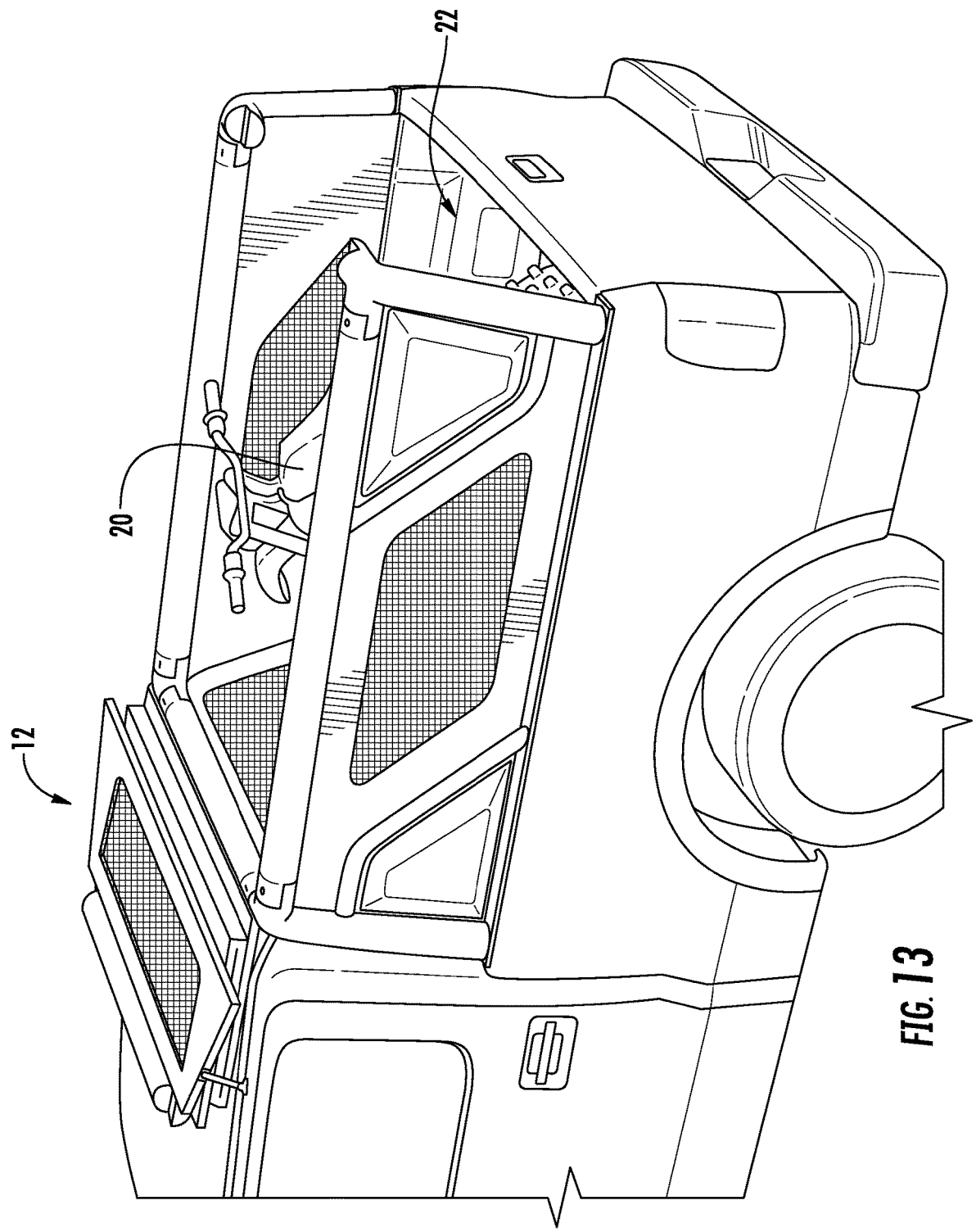
FIG. 13 illustrates a motorcycle loaded on the truck bed.

Referring now to FIGS. 12 and 13, the motorcycle 20 may be loaded onto the truck bed. This is true even if the height of the motorcycle extends above the front cross member 54 and the driver and longitudinal extension members 62, 64. When the motorcycle 20 is loaded onto the truck bed 22, the foldable top 12 is secured to the cab 34 with the rubber lockouts 74. Additionally, the panels 14 prevent dirt and debris from entering the truck bed 22. The motorcycle 20 may be locked down to the truck bed 22.

Figure 14:
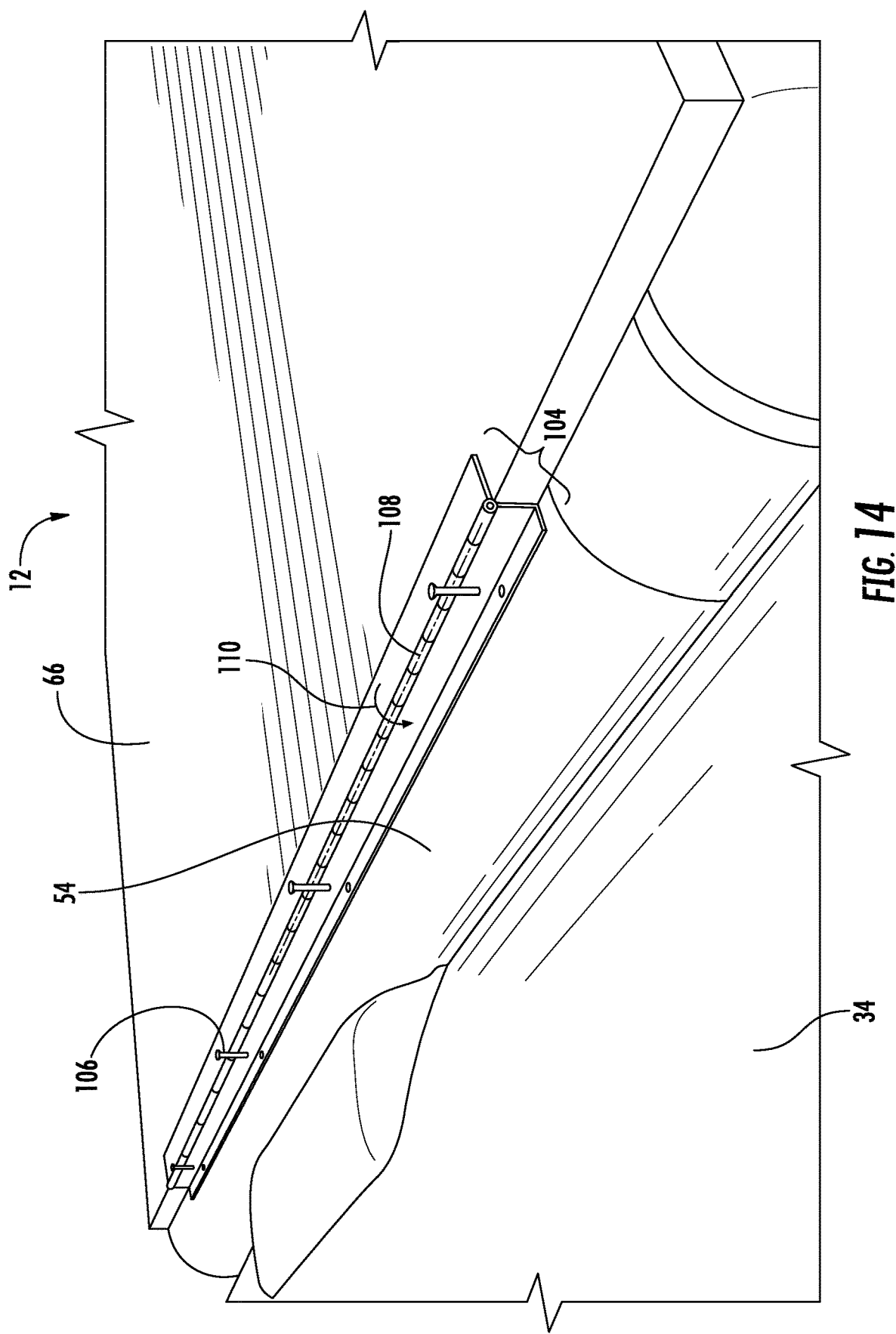
FIG. 14 illustrates a front edge of the top capable of being pivoted so that the folded top can be stored on top of the cab.
Figure 15:
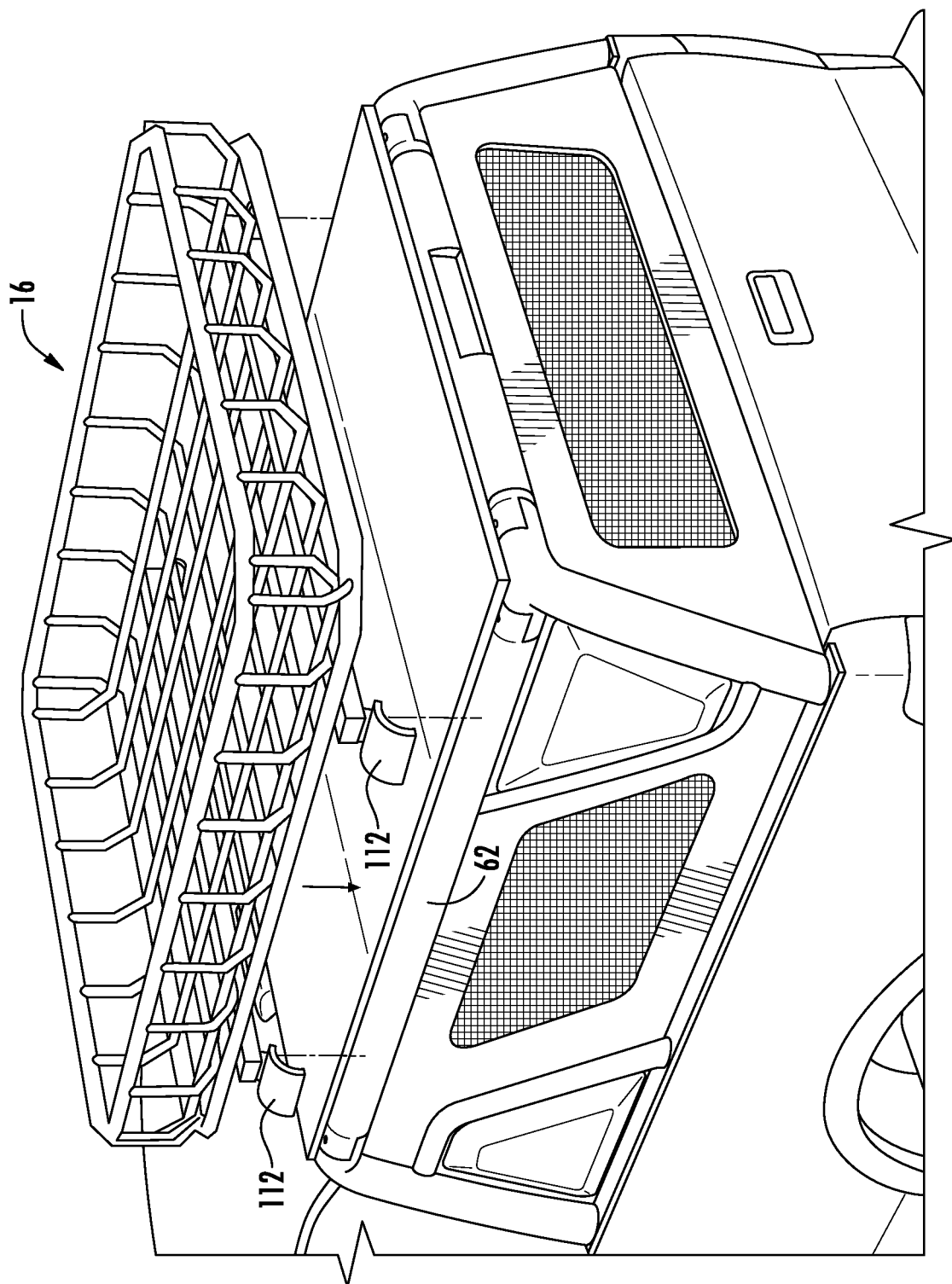
FIG. 15 illustrates a rack being mountable to a frame.

Referring now to FIG. 14, a hinge 104 is shown which allows the foldable top 12 to be stored over the cab 34. In particular, the hinge 104 may be secured to the front cross member 54 with fasteners 106 and the panel 66 of the foldable top 12. The panel 66 is rotatable 180° about a pivot axis 108 in the direction of rotational arrow 110.

Figure 16:
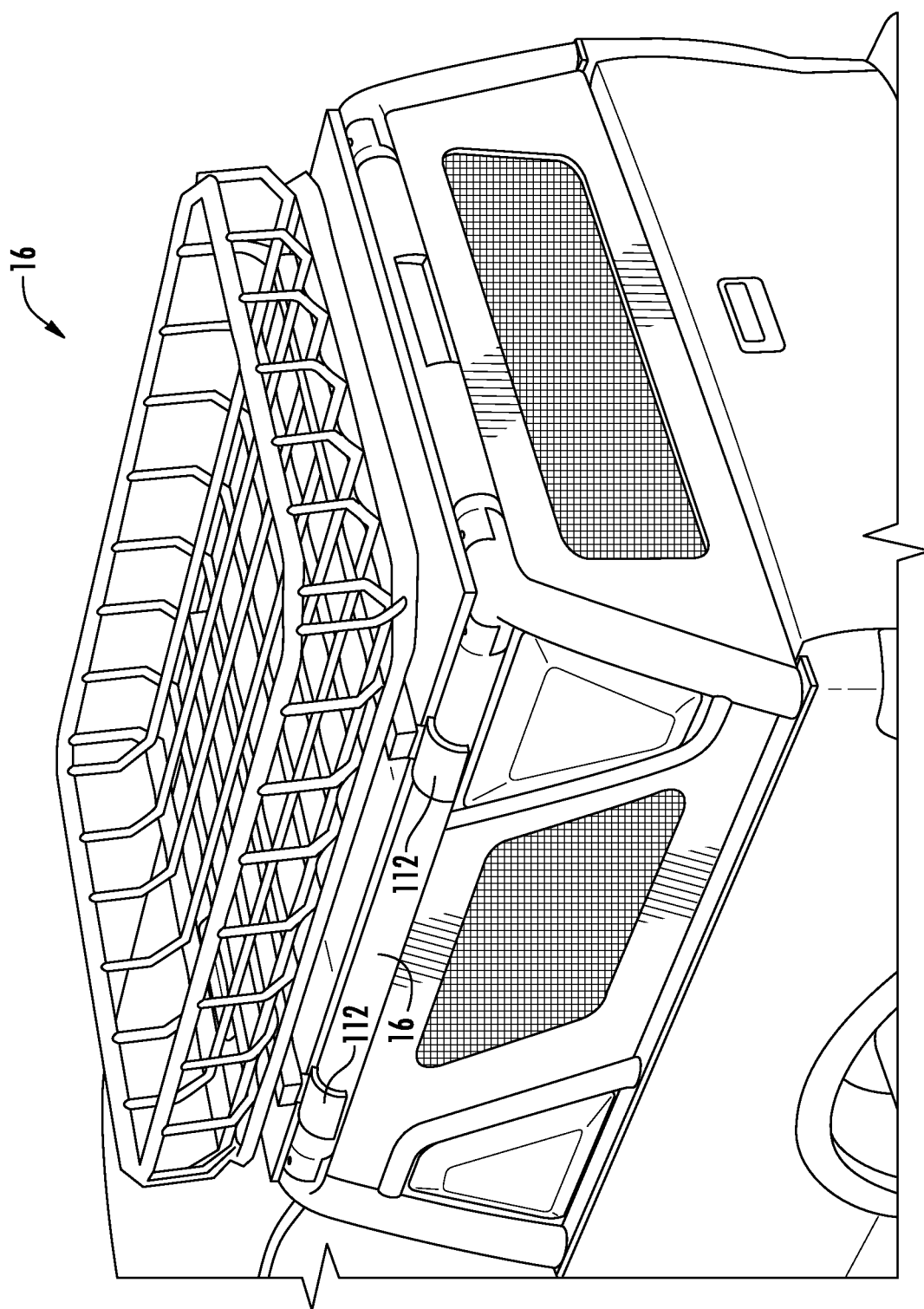
FIG. 16 illustrates the rack of FIG. 15 resting on the frame.
Figure 17:
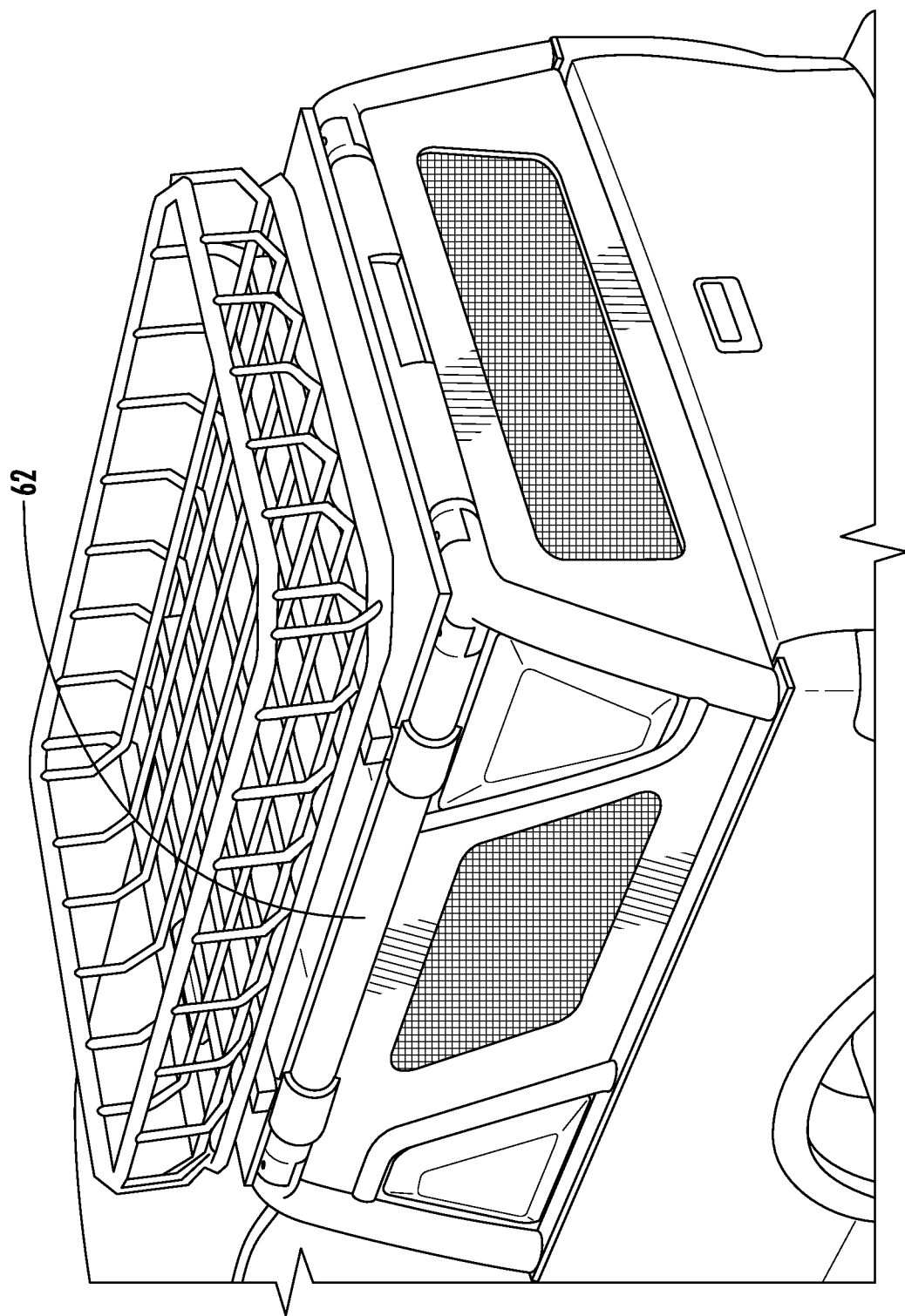
FIG. 17 illustrates the rack of FIG. 15 with clamps secured to the frame.

Referring now to FIGS. 15-18, the rack 16 may be secured to the driver and passenger longitudinal extension members 62, 64. In particular, the rack 16 may have clamps 112 that can be traversed between the released position, as shown in FIGS. 15-16 and an engaged position as shown in FIG. 17. With the clamps 112 in the released position, the clamps 112 are laid on top of the driver and passenger longitudinal extension members 62, 64 as shown in FIG. 16. The clamps 112 are then traversed (i.e. rotated) in order to clamp to the driver and passenger longitudinal extension members 62, 64.

Figure 18:
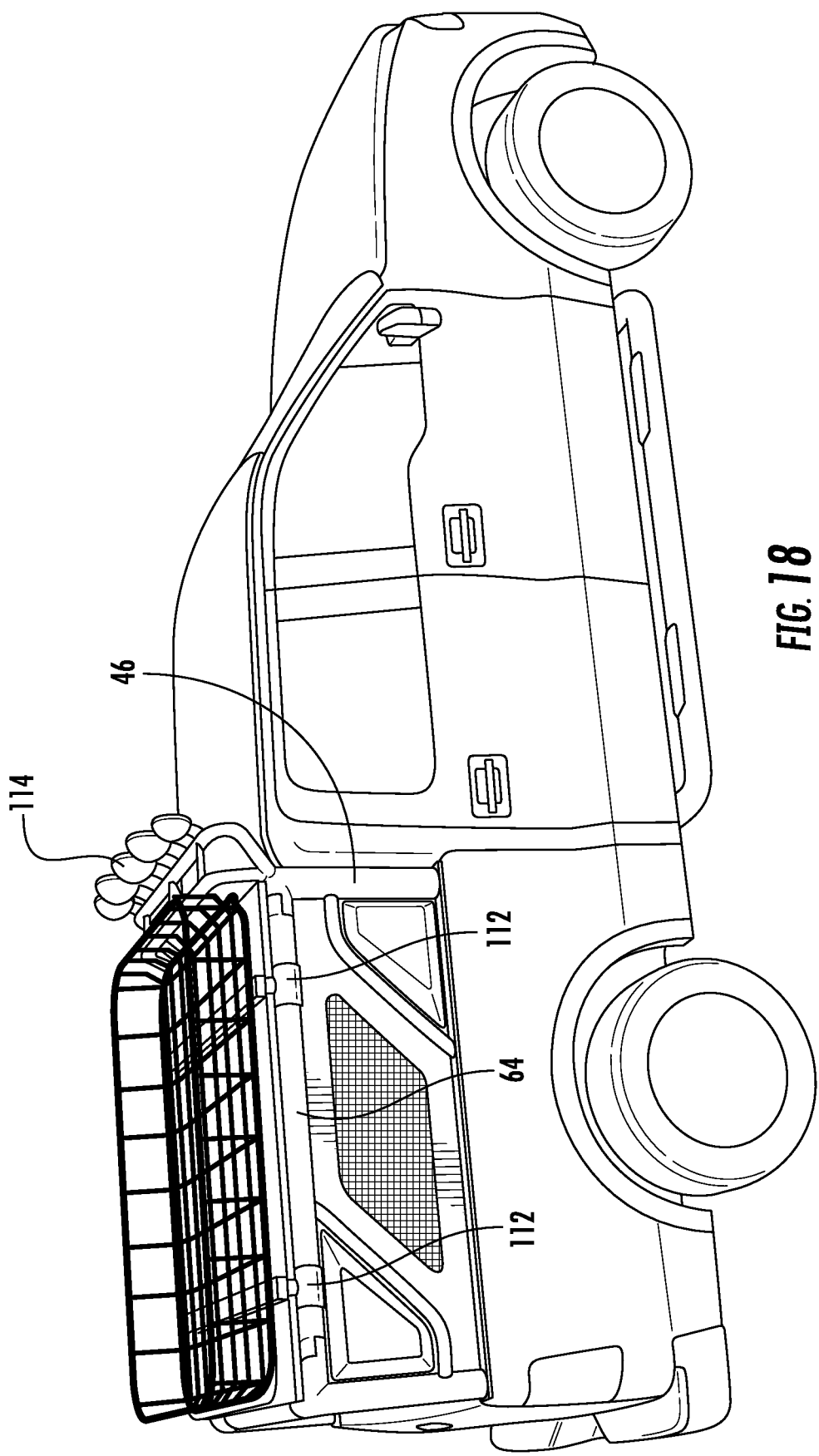
FIG. 18 illustrates front headlights mounted to the frame.

Additionally, in FIG. 18, flood lights 114 may be mounted to the frame 10, namely, the forward driver side and passenger side posts 44, 46 and/or the front crossmember 54.

Figure 19:
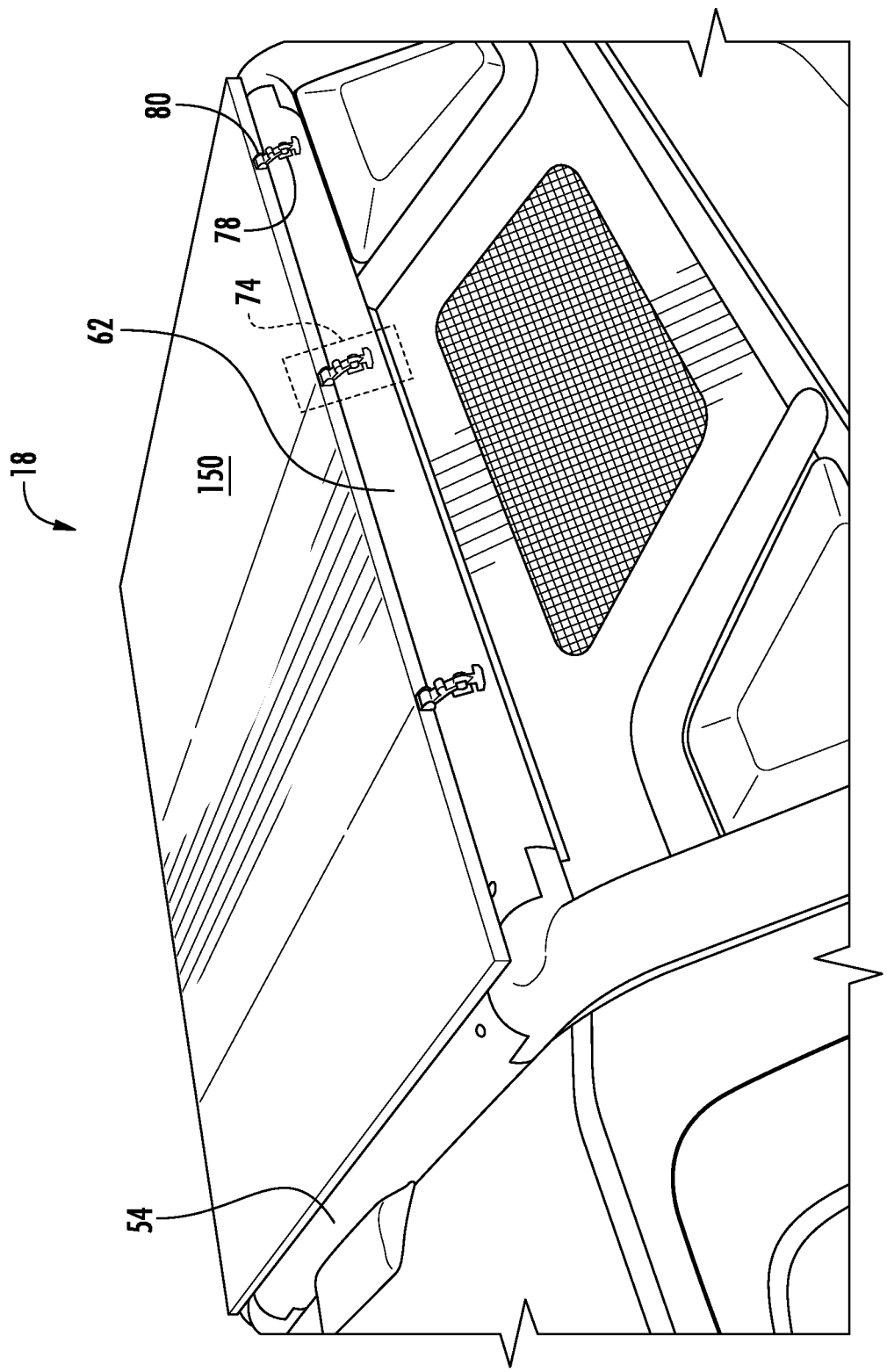
FIG. 19 illustrates a pop up top in a down position.
Figure 20:
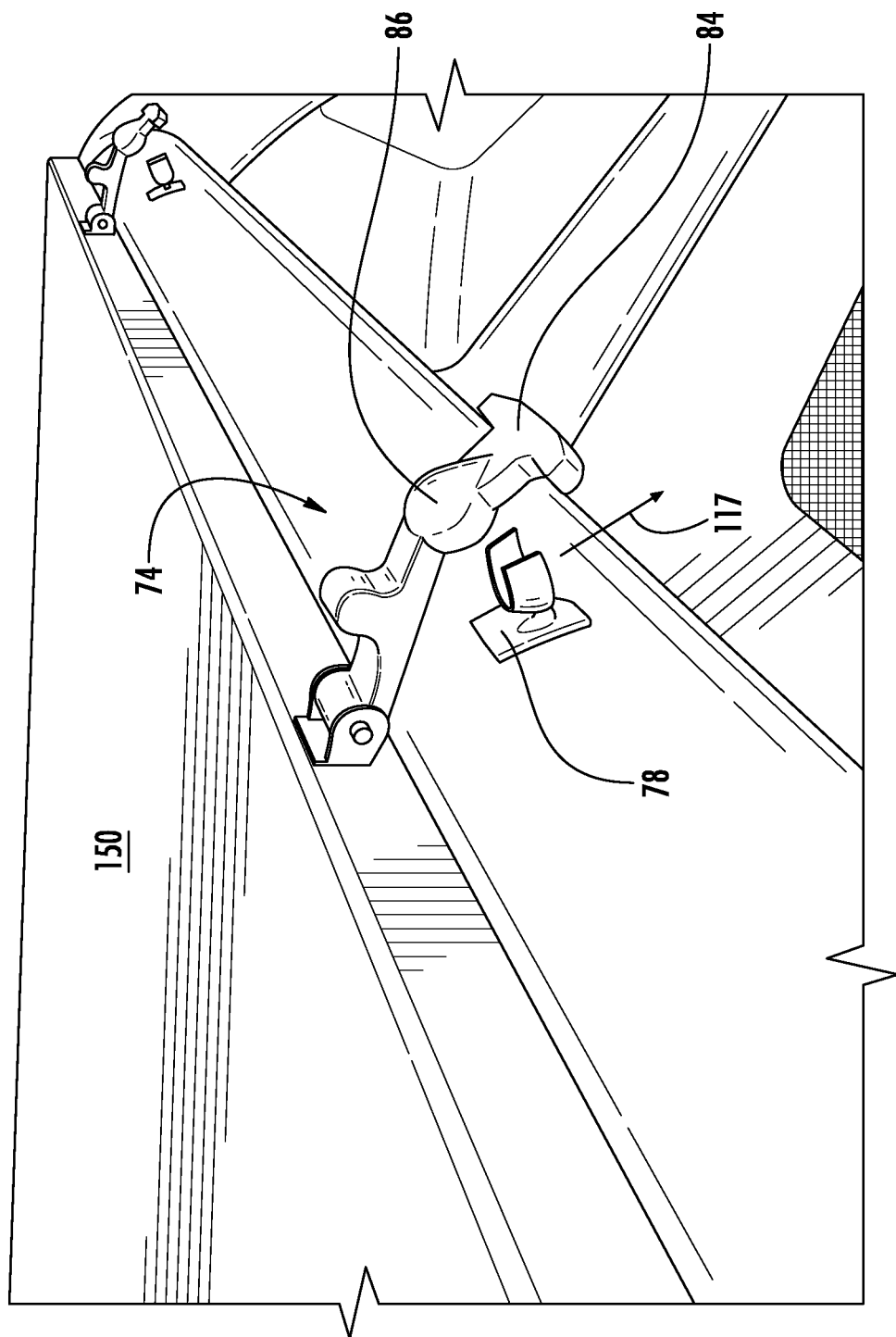
FIG. 20 illustrates rubber lockouts being disengaged so that the pop up top can be traversed to an up position.
Figure 21:
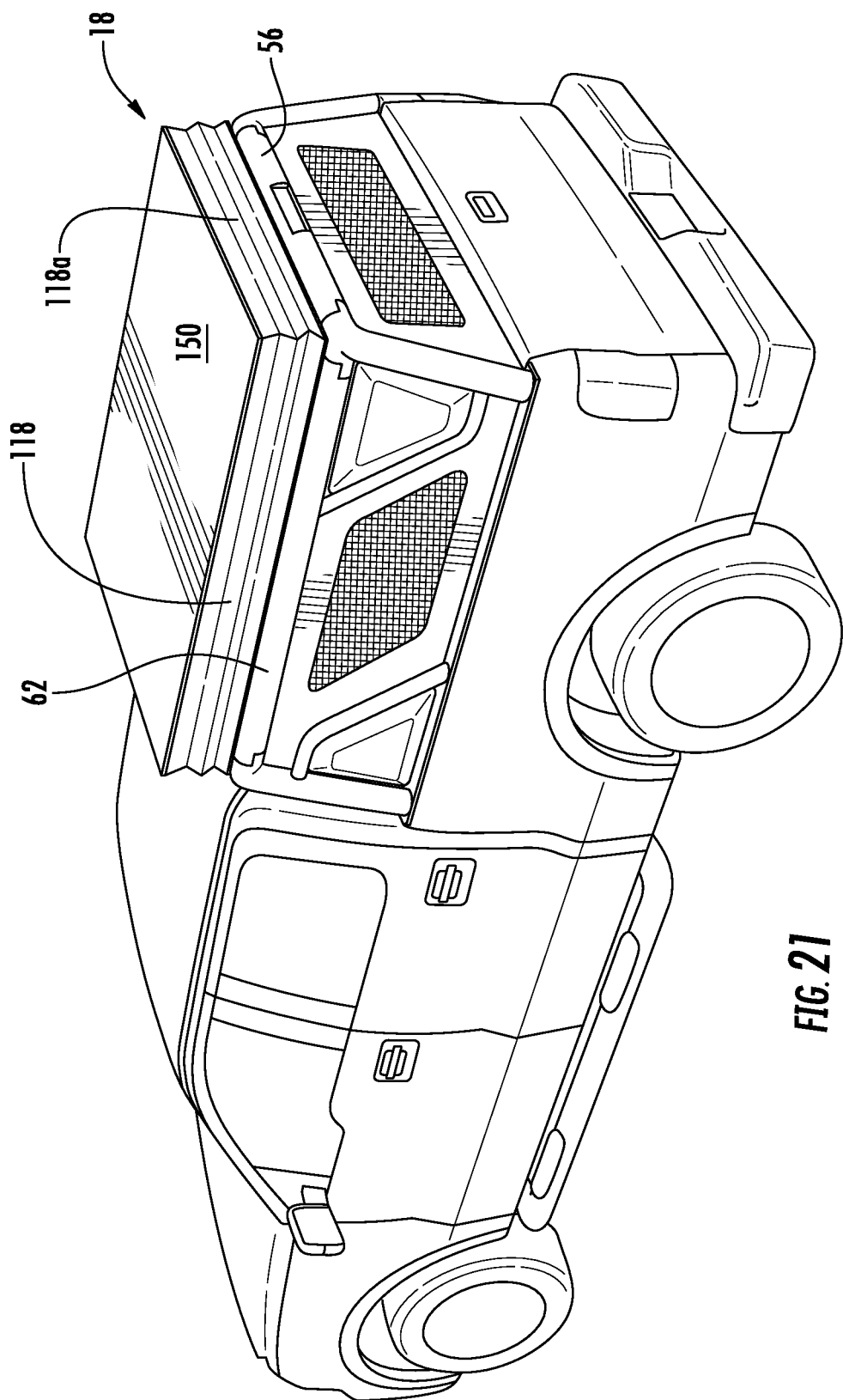
FIG. 21 illustrates the pop up top in the up position.

Referring now to FIGS. 19-22, a pop-up top 18 is shown. The pop-up top 12 may be extended upward, as shown in FIG. 21 so that the interior volume defined by the frame 10 may be enlarged in order to hold larger items within the truck bed 22. The pop-up top 18 may have a generally rigid top panel 150. The top panel 150 may be sufficiently large to cover the entire area from the front crossmember 54 to the rear crossmember 56 between the driver and passenger longitudinal extension members 62, 64. The top panel 150 of the pop-up top 18 is biased to the up position as shown in FIG. 21. In order to hold the top panel 150 in the down position which is shown in FIG. 19, the pop-up top 18 may include a plurality of rubber lockouts 74 around the periphery of the top panel 150.

The first part 78 may be attached to the driver and passenger longitudinal extension members 62, 64 and the front and rear crossmembers 54, 56. The second part 80 may be attached to the periphery of the top panel 150. In FIG. 19, the rubber lockouts 74 are shown as being only on the driver side of the top panel 150 but it is also contemplated that the rubber lockouts 74 may be disposed around the entire periphery so that one or more rubber lockouts 74 are on opposed sides of the top panel, specifically, the front and rear sides of the top panel 150 and/or the driver and passenger sides of the top panel 150.

Referring now to FIG. 20, the rubber lockout may be disengaged so that the top panel 150 can pop upward. By gripping the handle 84 and pulling downward in the direction of arrow 117, the enlarged portion 86 is removed from the first part 78. Once the enlarged part 86 clears the first part 78, the user releases the handle 84. All of the rubber lockouts 74 are disengaged so that the top panel 150 may be traversed upward. Additionally or alternatively, although not shown, rubber lockouts 74 may be placed on the inside or under the top panel 150 and on the interior of the frame 10. In this regard, the rubber lockouts 74 must be disengaged by having the user climb into the truck bed and disengage each of the rubber lockouts 74. The rubber lockouts 74 disposed on the inside may be placed about a periphery in the same manner as that of the rubber lockouts 74 disposed on the exterior side shown in FIGS. 19-20.

Figure 22:
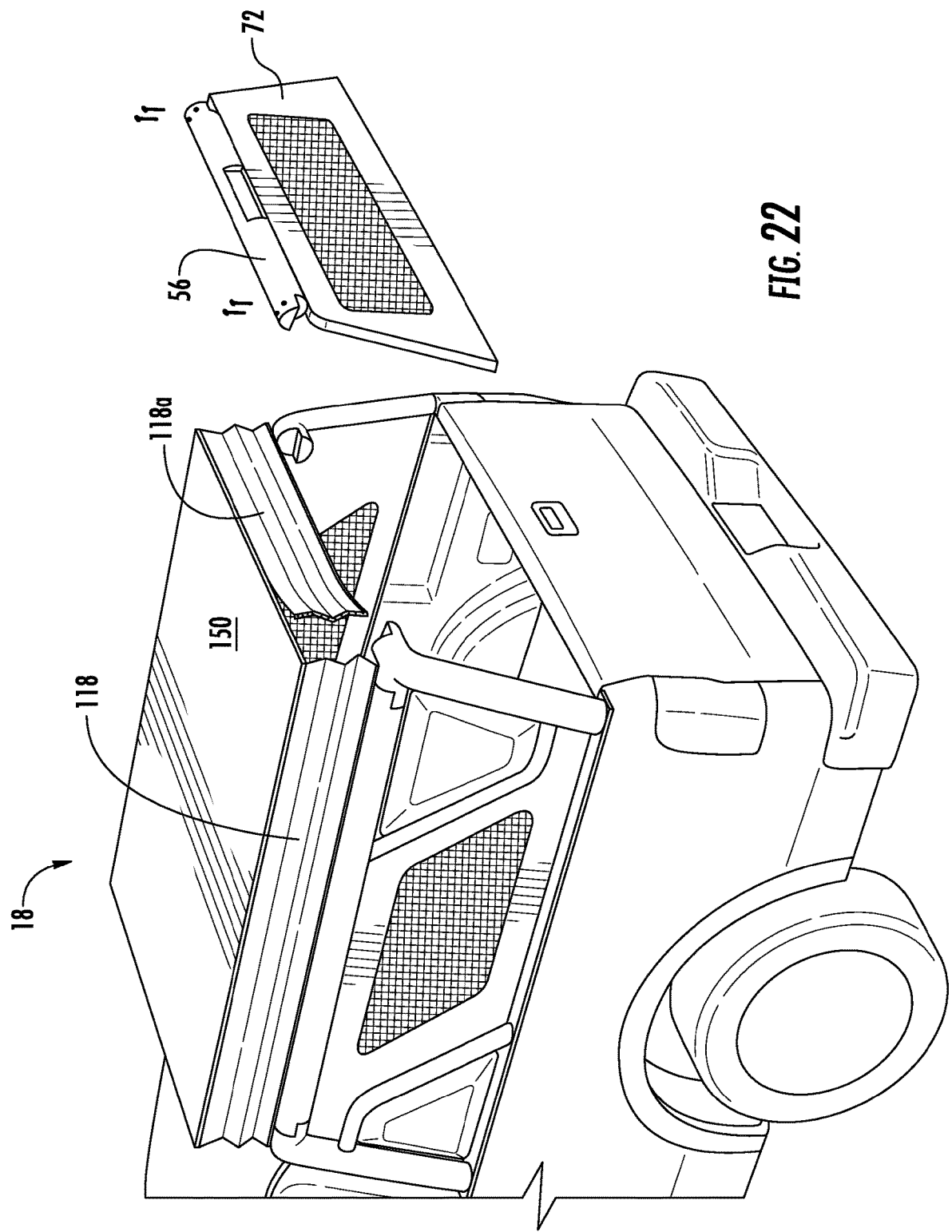
FIG. 22 illustrates how to open up the pop up top so that a motorcycle being higher than frame can fit within the truck bed.

Referring now to FIG. 21, the pop-up top 18 is shown. The top panel 150 is in the up position. In that up position, there are a plurality of pleated sides 118 about the entire periphery of the top panel 150 that extends from the top panel 150 to the front and rear crossmembers 54, 56 and the driver and passenger longitudinal extension members 62, 64. The pleated sides 118 and the top panel 150 enlarge the interior volume of the frame 210 so that, if needed, the truck bed 22 can fit a motorcycle. In order to fit the motorcycle, the pleated side 118a on the backside of the top panel 150 may be removed. In particular, as shown in FIG. 22, the pleated side 118a may be secured to the back edge of the top panel 150, the left and right pleated sides 118 and the rear crossmember 56 through any connection mechanism including but not limited to hooks and loops, snaps and other fastening mechanisms known in the art. In order to fit a motorcycle into the truck bed, the pleated side 118 may be removed as well as the rear crossmember 56 and the rear hatch 72. The motorcycle may be placed in the truck bed 22 then the pleated side 118a and the rear crossmember 56 and rear hatch 72 may be mounted back onto the pop-up top 18 and the frame 10. Instead of removing the pleated side 118a, the short left and right vertical sides may be removed from the driver side and passenger side pleated sides 118. Also, the bottom of the pleated side 118 may be removed from the rear crossmember 56. The pleated side 118a may be flipped up and over so that it rests on top of the top panel.

Figure 24:
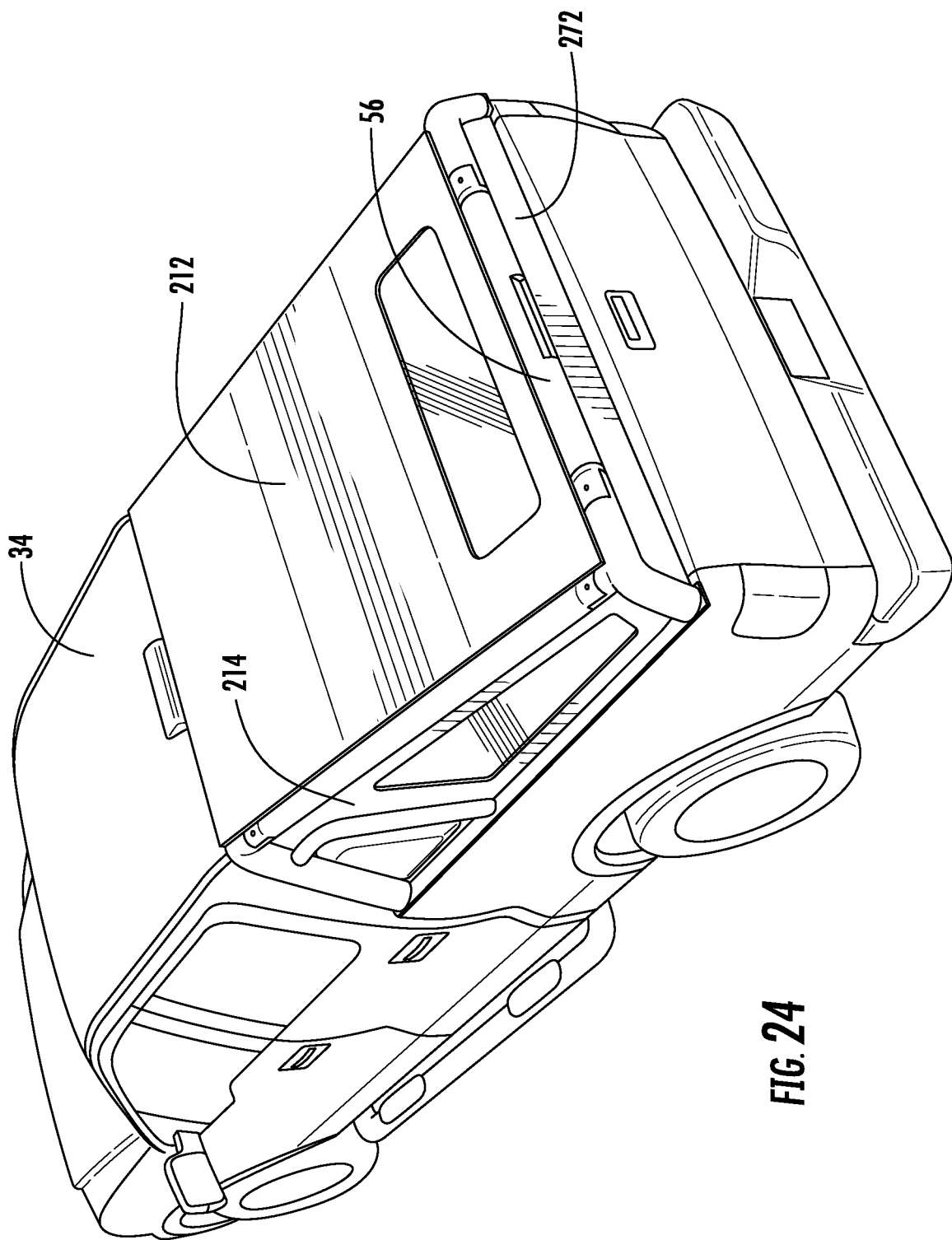
FIG. 24 illustrates the second embodiment shown in FIG. 23 with the foldable top and removably attachable side panels.
Figure 25:
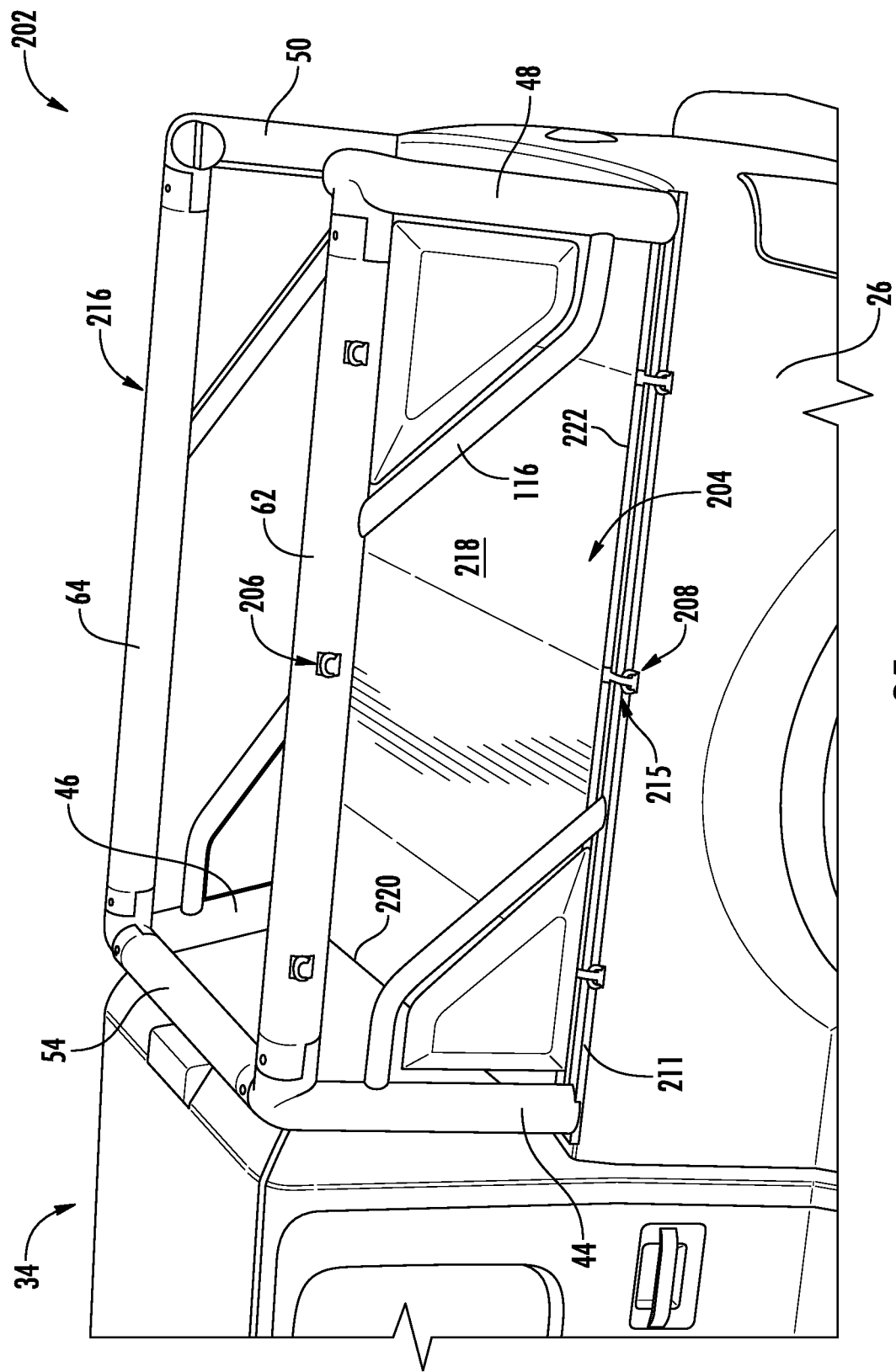
FIG. 25 is an upper perspective view of another embodiment of a truck bed cover.

Referring now to FIGS. 23-25, a second embodiment of the frame 210 is shown. In particular, the frame 210 may have a shortened rearward driver side and passenger side posts 248, 250. The rearward driver side and passenger side posts 48, 50 as well as the forward driver side and passenger side posts 44, 46 may extend up to about a height of the cab 34. In the frame 210, the forward driver side and passenger side posts 44, 46 may still come up to about the height of the cab 34 but the rearward driver side and passenger side posts 248, 250 may be about one half or less of the height of the forward driver side and passenger side posts 44, 46. The driver and passenger longitudinal extension members 262, 264 may extend backwards and slope downward as shown in FIG. 23. The second embodiment of the frame 210 illustrates a different configuration from that of the frame 10 to illustrate that the frame may have different configurations but nevertheless can form an enclosed volume as shown in FIG. 24 in the truck bed but also allow the side panels 214 to be removably attachable to the frame 210 in the same manner as that described in relation to the frame 10. Additionally, the top 212 and the rear hatch 272 may be foldable and stored on top of the cab for the same manner as that described in relation to frame 10.

The various accessories (e.g. foldable top, pop-up top, rack, floodlights, side panels) that are multiple to the frame 10 may also be configured to be used in relation to the frame 210. By way of example and patient, the top 212 may be stored above the cab 34 and held over the cab with rubber lockouts 74. This is the stored position of the top 212. The deployed position in order to form the enclosure is shown in FIG. 24. A pop-up top may be void on the frame 212. Instead of being traversed vertically up as shown in FIG. 21, the pop-up top employed on the frame 210 will be traversed upward at an angle defined by the driver and passenger longitudinal extension members 262, 264. The rack may be attached to the driver and passenger longitudinal extension members 262, 264 in the same manner described above in relation to frame 10. Likewise, floodlights may be mounted to the frame 210 in the same manner described above in relation to frame 10. Additionally, side panels may be shaped to the size of the frame 210 and the side panels may be mounted to the frame 210 in the same manner described above in relation to the frame 10.

The frames may have triangular reinforcement bars 116 that extend from forward driver side posts to the subframe 52, from the forward passenger side posts 46 to the subframe 52, from the driver longitudinal extension member 62 to the rear driver side post 48 and from the passenger longitudinal extension member 64 to the rear passenger side post 50. The triangular reinforcement bar 116 adds rigidity to the frame 10, 210.

The top and side panels may form a waterproof seal along with the front cross member, rear cross member and the driver and passenger longitudinal extension members with a gasket placed around a section or the entire periphery of the top and panels 14. The gasket may be an elongate rubber piece that mates with both the top and side panels and the front cross member, rear cross member and the driver and passenger longitudinal extension members. The weight of the top may press down on the gasket to form the watertight seal. Also, the rubber lockouts may place downward pressure from the top onto the gasket to further ensure the watertight seal. Other means of forming the waterproof seal are also contemplated such as the means explained in relation to FIGS. 10 and 11. Moreover, the side panels 14 may form a waterproof seal with the forward and rearward driver side posts and the forward and rearward passenger side posts with a gasket disposed between the side panels and the forward and rearward driver side posts and the forward and rearward passenger side posts. Other means of forming the waterproof seal are also contemplated such as the means explained in relation to FIGS. 10 and 11. In particular, the interconnection shown in FIGS. 10 and 11 may be formed between the panel and the forward and rearward driver side posts and the forward and rearward passenger side posts as well as the subframe 52.

Figure 26:
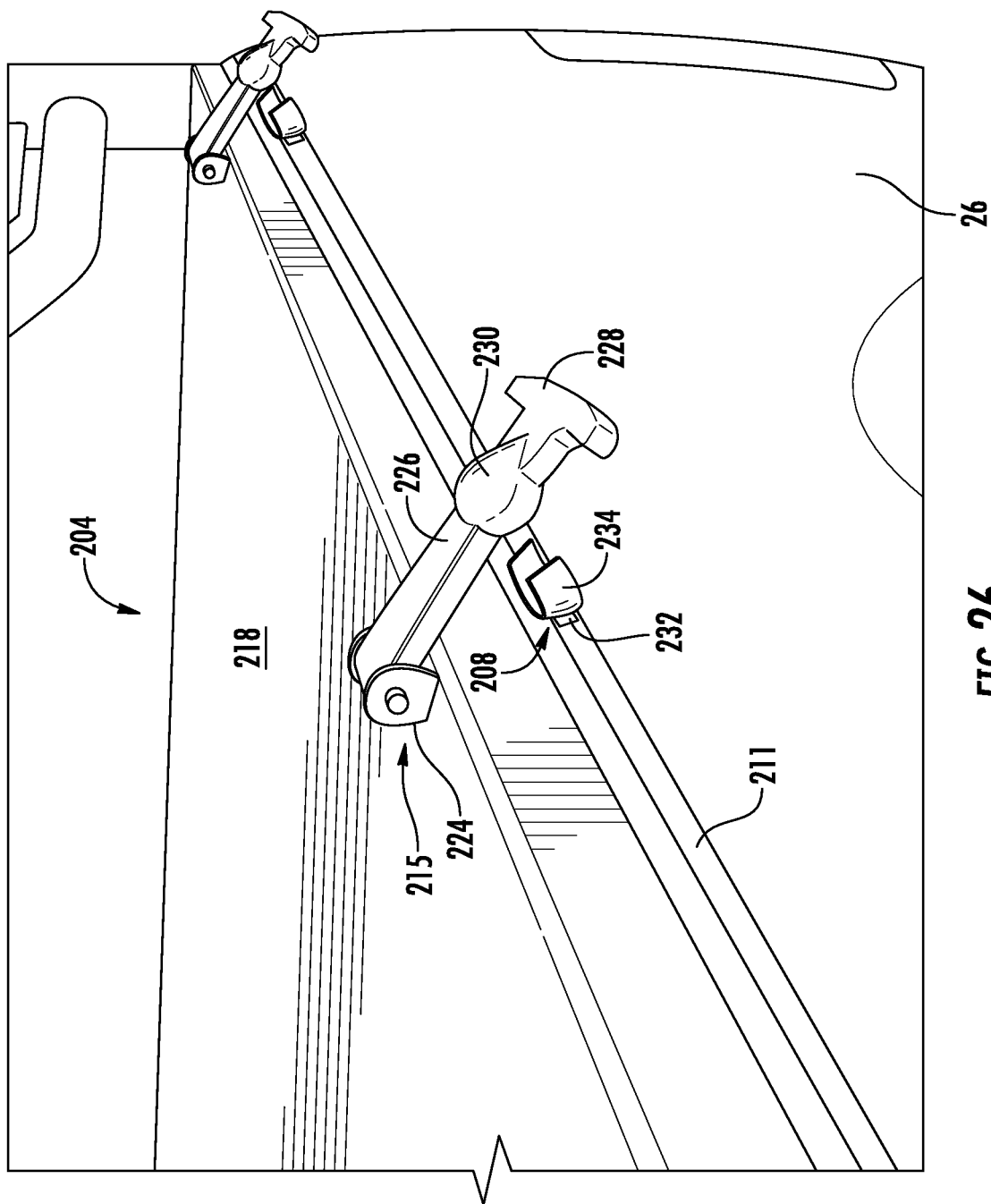
FIG. 26 is an enlarged view of one example of connectors used on the truck bed cover depicted in FIG. 25.
Figure 27:
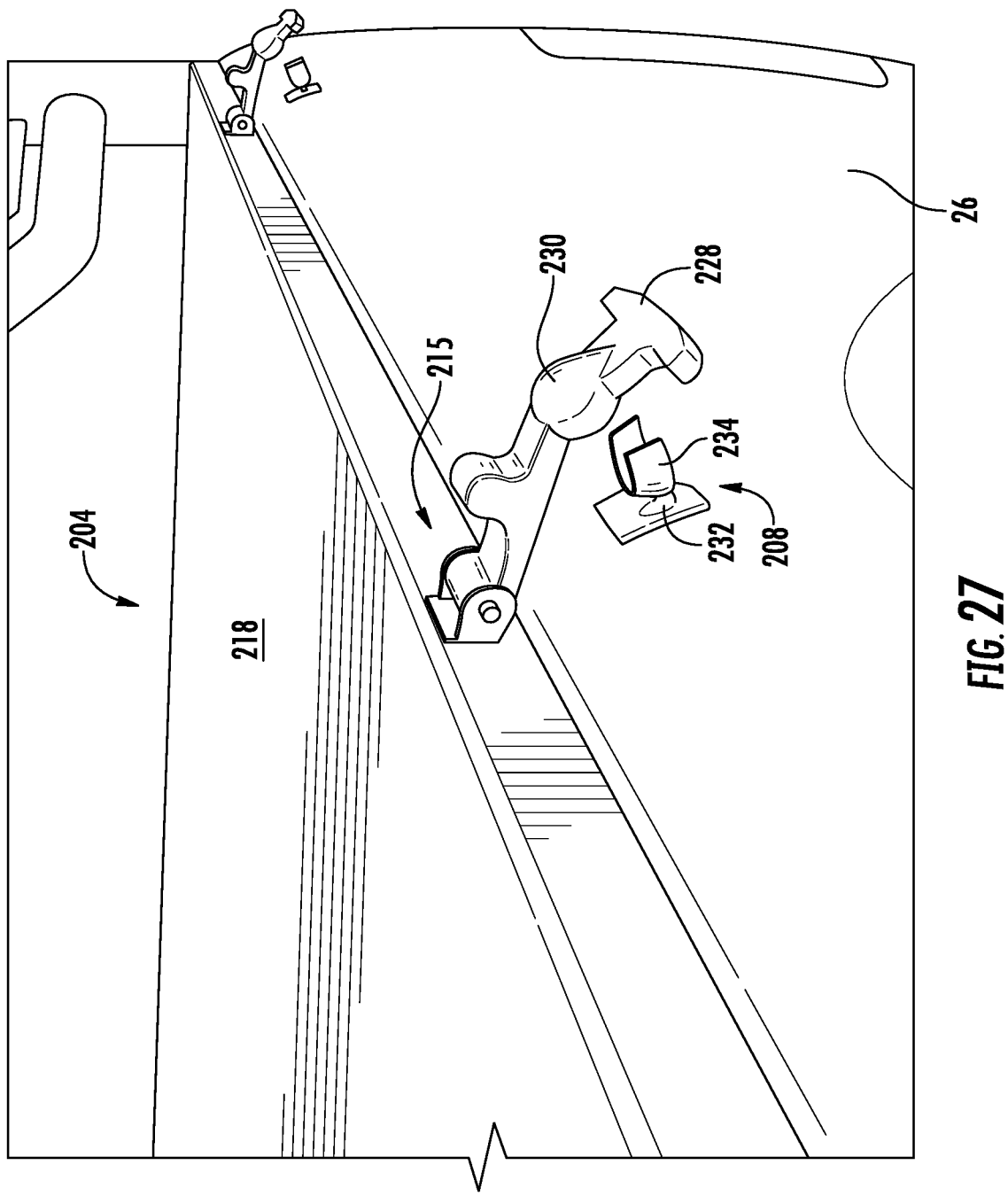
FIG. 27 is an enlarged view of another example of connectors used on the truck bed cover depicted in FIG. 25.

Referring now to FIGS. 25-27, there is depicted another embodiment of a truck bed cover 202, which may define an enclosure over the truck bed 22. The truck bed cover 202 may be adaptable to allow for variation in the size of the enclosure defined by the truck bed cover 202. In this regard, the truck bed cover 202 may include a top 204 which may be selectively transitioned between an upper position and a lower position to vary the size of the enclosure defined by the truck bed cover 202, wherein the upper position may be associated with a larger enclosure, while the lower position may be associated with a smaller enclosure. This adaptability may be implemented via identically configured connectors 206, 208, which may be located along upper longitudinal members 62, 64 and lower longitudinal members 211 extending over the sidewalls of the truck bed 22. The top 204 may include complimentary connectors 215, which may be selectively engaged with the upper connectors 206 on the upper longitudinal members 62, 64 to deploy the truck bed cover 202 in the upper position, or the lower connectors 208 on the lower longitudinal members 211 to deploy the truck bed cover 202 in the lower position.

In more detail, the truck bed cover 202 includes a pair of support frames 216 which are engageable with the truck bed 22 in opposed relation to each other. One frame support 216 may be on the driver's side and includes side posts 44, 48, as well as upper longitudinal member 62 and lower longitudinal member 211. Frame support 218 may be on the passenger's side and includes side posts 46, 50, as well as upper longitudinal member 64 and lower longitudinal member 211. The lower longitudinal members 211 may extend along the upper ends of the truck bed sidewalls between respective sets of the side posts 44, 48 on the driver's side and the side posts 46, 50 on the passenger's side. The lower longitudinal members 211 may be secured to the sidewalls via rivets, screws, adhesives, or other fasteners known in the art. The lower longitudinal members 211 may be in parallel relation to the upper longitudinal members 62, 64, or there may be non-parallel relationship between the lower longitudinal members 211 and the upper longitudinal members 62, 64. For instance, the upper longitudinal members 62, 64 may be angled downwardly from the rear of the cab toward the tailgate, similar to the configuration shown in FIG. 23.

The top 204 generally includes a top panel 218, and a plurality of panel connectors 215 coupled to the top panel 218. The top panel 218 may include a pair of transverse edges 220 (i.e., forward and rearward edges) and a pair of longitudinal edges 222 extending between the transverse edges 220. The top panel 218 may be a flexible panel, or a rigid panel. In the case of a flexible panel, the top panel 218 may include several regions or sections separated by fold lines to facilitate folding of the top panel 218 for storing the top 204. In one particular implementation, the top panel 218 may be folded to allow the top panel to be easily stowed within the cab of the truck. The flexible top panel 218 may be comprised of a fabric material, or other materials capable of defining fold lines therein. Alternatively, the flexible top panel 218 may be formed from a more rigid material, such as plastic, fiberglass, or the like, with the panel 218 being comprised of separate sections which are connected to each other via one or more hinges so as to facilitate folding of the top panel 218. A rigid top panel 218 may be generally inflexible, i.e., incapable of folding onto itself. The rigid top panel 218 may be formed from plastic, fiberglass, metal, rubber, or other materials known in the art.

The connectors 215 may be coupled to the top panel 218 adjacent the longitudinal edges 222 thereof. In the exemplary embodiment, the top 204 includes three connectors 215 positioned adjacent each longitudinal edge 22, with the spacing between the connectors 215 being substantially equal. However, it is understood that the number of connectors 215 and the spacing therebetween may be varied without departing from the spirit and scope of the present disclosure. Each connector 215 may include a stationary part 224 and a rubber extension member 226 pivotally secured to the stationary part 224. The rubber extension member 226 may have a handle 228 that can be grasped to stretch the rubber extension member 226 so that an enlarged portion 230 can be pulled out of a corresponding connector 206, 208 to dislodge the enlarged portion 230 of the rubber extension member 226 out of the corresponding connector 206, 208. It is contemplated that the extension member 226 may be formed from materials other than rubber, such as plastic, metal, etc.

The upper connectors 206 attached to the upper longitudinal members 62, 64, as well as the lower connectors 208 attached to the lower longitudinal members 211, may be complimentary to the panel connectors 215 coupled to the top panel 218. In this respect, the upper and lower connectors 206, 208 may be referred to herein as "primary connectors," while the panel connectors 215 may be referred to herein as "secondary connectors." According to one embodiment, the upper connectors 206 and lower connectors 208 may be identical in configuration. As shown in the exemplary embodiment, the upper and lower connectors 206, 208 may include a shaft portion 232 and a cup portion 234 at a distal end of the shaft portion 232. The cup portion 234 may be adapted to receive the enlarged portion 230 of the rubber extension member 226 so as to secure the connector 206, 208 to the panel connector 215. In this respect, the cup portion 234 may be resilient to allow the cup portion 234 to expand as the rubber extension member 226 is inserted therein and removed therefrom. The resiliency may also allow the cup portion 234 to apply a compressive force on the rubber extension member 226 to retain the rubber extension member 226 within the cup portion 226. Such resiliency may be referred to as "snap-fit engagement" between the cup portion 234 and the panel connector 215.

Although the foregoing description and related figures show the panel connectors 215 as including the pivotable rubber extension members 226, and the upper and lower connectors 206, 208 as including the complimentary cup portion 234, it is understood that the configuration of the connectors may be reversed. For instance, the panel connectors 215 may include the cup portion 234, while the upper and lower connectors 206, 208 may include the pivotable rubber extension members 226. Furthermore, it is understood that other complimentary connectors may be used without departing from the spirit and scope of the present disclosure. Along these lines, the primary connectors 206, 208 and secondary connectors 215 may include snaps, buttons, zippers, hook and loop fasteners, magnets, or other fasteners known in the art for securing the top panel 218 in place.

Although the foregoing describes the lower connectors 208 as being connected to the lower longitudinal members 211, it is contemplated that the lower connectors 208 may be connected directly to the sidewalls of the truck bed, as shown in FIG. 27. As such, the position of the lower connectors 208 is not limited to being directly connected to the lower longitudinal members 211. The lower connectors 208 may be coupled to the sidewalls of the truck bed via adhesives, magnets, rivets, screws, or other fasteners known in the art.

In use, the top 204 may be selectively transitioned between several different positions to allow the truck bed cover 202 to assume several different operable configurations. The top 204 may be placed in a first deployed position, or an upper position, by connecting the top 204 to the upper longitudinal members 62, 64 (see FIGS. 19 and 20). When the top 204 is in the first deployed position, the panel connectors 215 are engaged with the upper connectors 206, and disengaged from the lower connectors 208. By placing the top 204 in the first deployed position, the truck bed cover 204, including the side panels 14 discussed in more detail above, may define a large enclosure. In the first deployed position, the top panel 218 may be spaced upwardly from the sidewalls of the truck bed and the top of the tailgate. At least a portion of the top panel 218 may reside in a plane that is substantially parallel to the roof of the cab. When the side panels 14 are used for forming part of the enclosure, it is contemplated that the side panels 14 may be connected to an inner periphery of the corresponding support frame 216. In this regard, the "inner periphery" refers to any portion of the upper longitudinal members 62, 64 and the lower longitudinal members 211 to which the side panels 14 may be attached, while still allowing at least a portion of the upper and lower longitudinal members 62, 64, 211 to be exposed to create the appearance of a robust exoskeleton. As such, the "inner periphery" of the upper longitudinal members 62, 64 may broadly include any part of the lower hemisphere or lower half of the upper longitudinal members 62, 64, as well as any part of the inner hemisphere or inner half of the upper longitudinal members 62, 64. Likewise, the "inner periphery" of the lower longitudinal members 211 may broadly include any part of the upper hemisphere or upper half of the upper longitudinal members 211, as well as any part of the inner hemisphere or inner half of the lower longitudinal members 211.

The top 204 may be placed in a second deployed position, or lower position, by connecting the top 204 to the lower longitudinal members 211. When the top 204 is in the second deployed position, the panel connectors 215 are engaged with the lower connectors 208, and disengaged from the upper connectors 206. By placing the top 204 in the second deployed position, the truck bed cover 204 may extend over the truck bed in close proximity to the top of the sidewalls of the truck bed, as well as the top of the tailgate to define a smaller enclosure relative to the size of the enclosure when the top 204 is in the first deployed position.

The top 204 may assume a third deployed position, similar to the second deployed position, wherein the panel connectors 215 are engaged with lower connectors 208 on the sidewalls of the truck bed. In this regard, the support frame used to support the top panel 218 in the first deployed position may be removed from the truck bed, including the posts 44, 46, 48, 50, the upper longitudinal members 62, 64, and the lower longitudinal members 211.

By moving the top 204 from the first deployed position to the second deployed position or third deployed position, the top 204 may be lowered by a distance which is substantially equal to the height 36 of the cab 34. Conversely, by moving the top 204 from the second deployed position, or third deployed position, to the first deployed position, the top 204 may be raised by a distance which is substantially equal to the height 36 of the cab 34.

In addition to the first and second deployed positions, the top 204 may be transitioned to a disengaged position, by disconnecting the panel connectors 215 from the upper connectors 206 and the lower connectors 208. After such disconnections are made, the top 204 may be removed from the truck bed, leaving the truck bed uncovered. By uncovering the truck bed, tall items which may extend well above the cab, such as motorcycles, may be placed in the truck bed. As such, use of the truck bed cover 202 does not limit use of the truck bed. Rather, the truck bed cover 202 enhances use of the truck bed by providing an enclosure which may be selectively deployed and sized as needed.

When the top 204 is disengaged from the truck bed, the top panel 218 may be folded and stored in the cab of the truck, or in another location outside of the truck, such as in a garage or storage closet. In this respect, the top panel 218 may be formed of sections or sub-panels, which may facilitate folding of the top panel 218. It is also contemplated that other ways of allowing the top panel 218 to assume a smaller configuration, such as rolling the top panel 218, may also be used.

Figure 28:
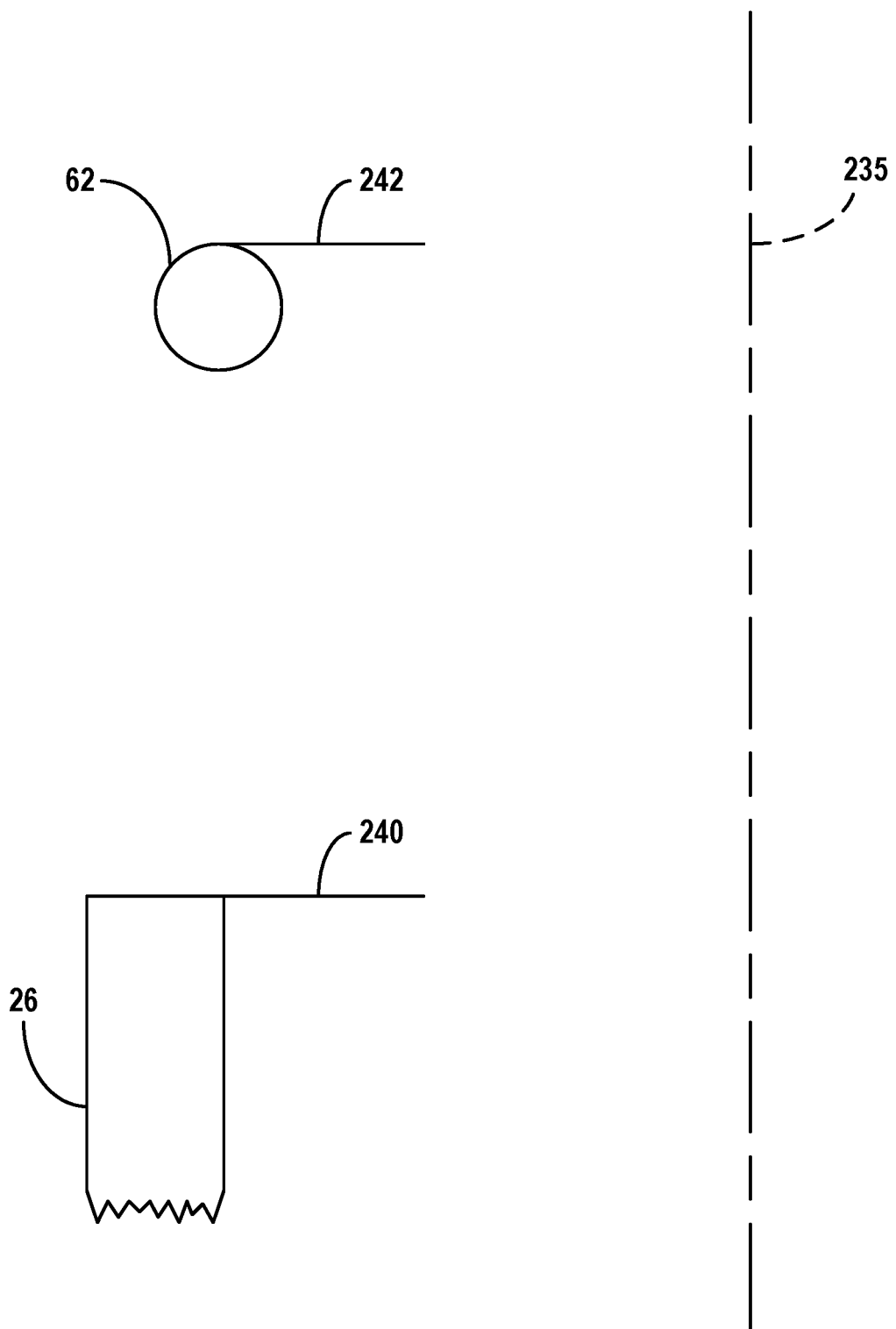
FIG. 28 is a schematic, cross sectional representation of a truck bed capable of selectively supporting a truck bed cover in a raised position and a lowered position.

The configuration of the top 204 provides enhanced adaptability that allows the owner to remount the top 204 in several different positions, depending on the space that is needed in a given time. Furthermore, the top 204 may form a part of all types of tonneau covers, including folding-panel-type tonneau covers, roll up tonneau covers, hinging tonneau covers, or other types of tonneau covers known in the art. Along these lines, FIG. 28 is a schematic, cross sectional representation of a truck bed capable of selectively supporting the top of a truck bed cover in a lowered position and a raised position. Only one side of the truck bed is shown in FIG. 28, with the opposing side being symmetrical about axis 235. When in the lowered position, the top 204 may be supported by a lower support 240 connected to a respective sidewall 26, 28 of the truck bed 22. When in the raised position, the top 204 may be supported by an upper support 242 connected to a respective longitudinal extension member 62, 64. The lower and upper supports 240, 242 may be configured to accommodate the specific type of top included in a particular tonneau cover.

For a roll up tonneau cover, the lower and upper supports 240, 242 may include side rails which may support a top 204 having a rear bar, front bar, support bows, and a cover panel. An exemplary roll up tonneau cover is the Original Slantback® Roll-Up Cover sold by Access®, which is a division of AGRI-COVER, INC. in Jamestown, N. Dak. For more detail regarding roll up tonneau covers, please refer to the INSTALLATION INSTRUCTIONS for the Original Slantback® Roll-Up Cover by Access®, which are expressly incorporated herein by reference.

For a tri-fold tonneau cover, the lower and upper supports 240, 242 may include structures which may interface with clamps or other mounting hardware on the tri-fold tonneau cover. An exemplary soft tri-fold tonneau cover is the Tri-Fold Tonneau Cover sold by American Tonneau Company™, located in Ann Arbor, Mich. An exemplary hard tri-fold tonneau cover is the Hard Tri-Fold Tonneau from Rugged Cover™, located in Owosso, Mich. It is understood that tri-fold tonneau covers may clamp onto slide bracket assemblies that slide within channels formed in the truck bed. In this regard, it is contemplated that the lower and upper supports 240, 242 may also include channels for support such slide bracket assemblies. As an alternative, it is contemplated that the upper and lower supports 240, 242 may integrate the structure associated with the slide bracket assemblies that interface with clamps on the tonneau cover. For more information regarding tri-fold tonneau covers, please refer to the TRI-FOLD TONNEAU INSTALLATION GUIDE for the American Tonneau Company Tri-Fold Tonneau Cover, as well as the HARD TRI-FOLD TONNEAU INSTALLATION INSTRUCTIONS for the Rugged Cover Hard Tri-Fold Tonneau, the contents of each of which are expressly incorporated herein by reference.

For a retractable tonneau cover, the lower and upper supports 240, 242 may include rails which slidably support the tonneau top. Exemplary retractable tonneau covers include the JackRabbit™ series of tonneau covers, sold by Pace Edwards located in Centralia, Wash. For more information regarding retractable tonneau covers, please refer to the STANDARD INSTALLATION INSTRUCTIONS for the JackRabbit™ series.

For hard tonneau covers, the lower and upper supports 240, 242 may include mounting brackets to support hydraulic struts used to facilitate pivotal movement of the tonneau cover. In this regard, it is contemplated that the truck bed frame 210 may allow a hard tonneau cover may be pivotally mounted in two positions over the truck bed, i.e., a lowered position and a raised position. Exemplary hard tonneau covers include the Model 1010 tonneau cover sold by UnderCover™ located in Rogersville, Mo., as well as the Ridgelander™ DF921019, also sold by UnderCover™. For more information regarding hard tonneau covers, please refer to the TONNEAU INSTALLATION GUIDE for the UnderCover™ Model 1010 tonneau cover, as well as the INSTALLATION GUIDE for the Ridgelander™ DF921019, the contents of both being expressly incorporated herein by reference.

It is contemplated that tonneau covers may be sectioned so as to include different panels. For instance, a sectional tonneau cover may include a tailgate panel, and a cab & T panel. It is also contemplated that a sectional tonneau cover may include cab panel, a center panel and a tail panel. Exemplary sectional tonneau covers may include the Diamondback 270 tonneau cover, as well as the Diamondback HD SE tonneau cover, both being sold by DiamondBack located in Philipsburg, Pa. For sectional tonneau covers, the lower and upper supports 240, 242 may include brackets or other structures which interface with clamps on the tonneau cover. For more information regarding sectional tonneau covers, please refer to the INSTALLATION GUIDE for the Diamondback 270 tonneau cover, as well as the INSTALLATION GUIDE for the Diamondback HD SE cover, the contents of both being expressly incorporated herein by reference.

Figure 29:
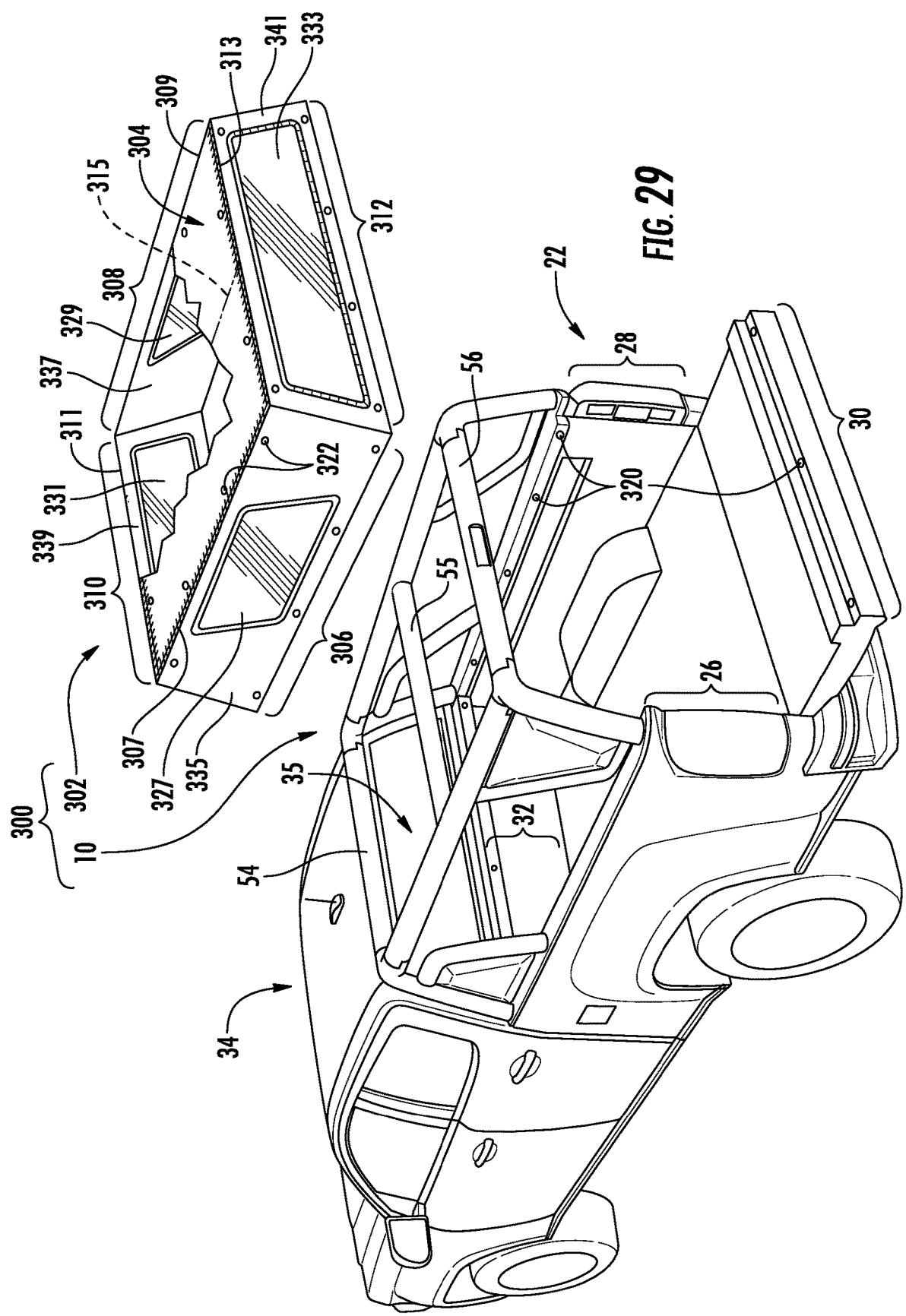
FIG. 29 is an exploded upper perspective view of the top in a deployed configuration and removed from the truck bed and the external frame.
Figure 30:
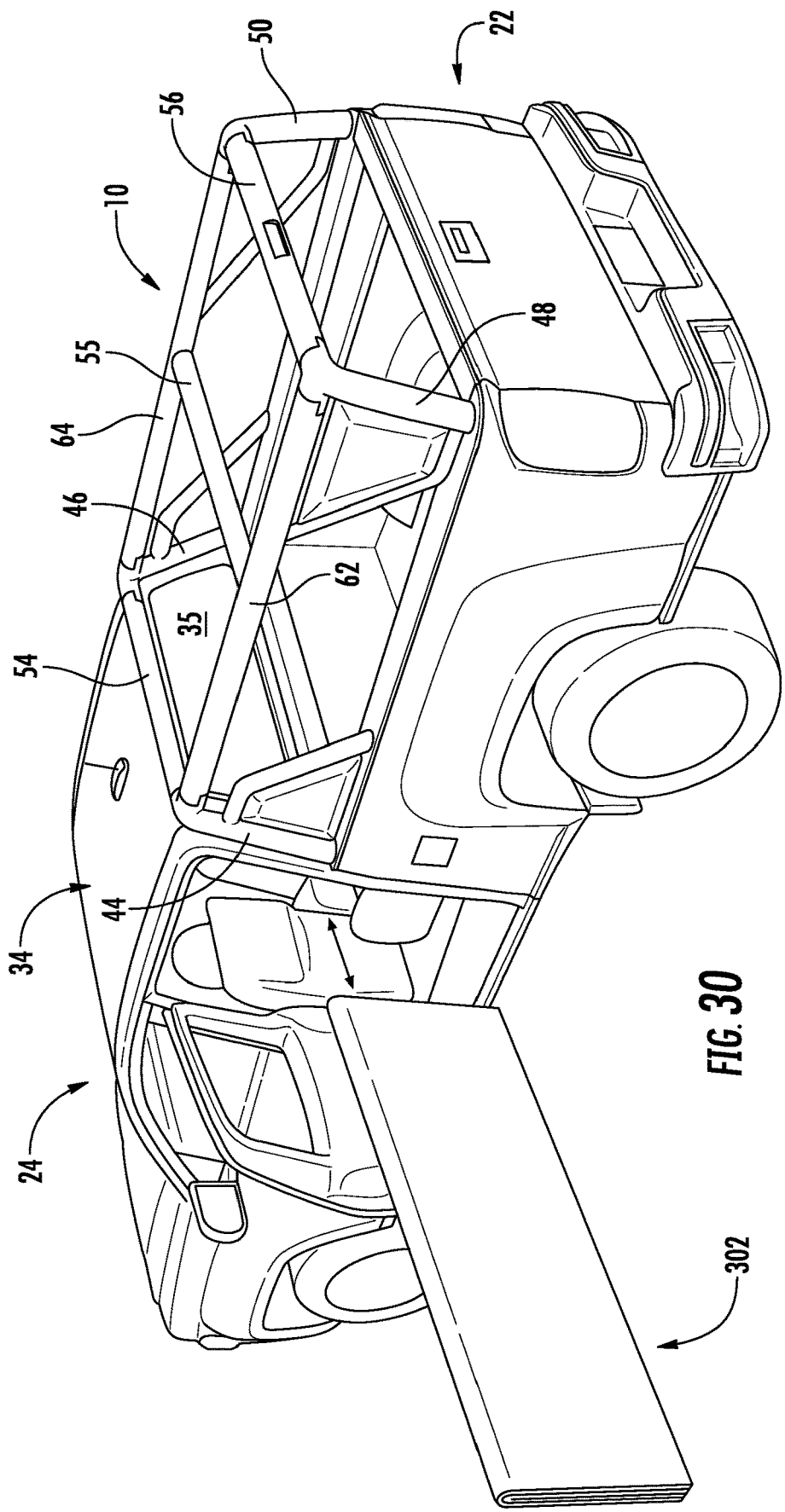
FIG. 30 is an upper perspective view of another embodiment of a truck bed cover including a top in a folded configuration for storage in a cab of the truck.

Referring now to FIGS. 29-34, there is depicted another embodiment of a truck bed cover 300 (see FIG. 29) in various stages of deployment. The truck bed cover 300 generally includes the frame 10 securable to the truck bed 22 (see FIG. 29), as described in more detail above, and a top 302 attachable to an interior side of the frame 10. FIG. 29 shows the top 302 in an unfolded configuration outside of the frame 10, while FIG. 30 shows the top 302 in a folded configuration for storage in the cab of the truck. FIGS. 31-34 show the top 302 connected to the interior side of the frame 10, such that the frame 10 is visible to a person standing outside and adjacent to the truck because the top 302 is on the inner side of the frame 10, the frame 10 is visible to the person. This creates the appearance of a robust exoskeleton supporting the top 302. The top 302 may also include an upper panel 304, which may extend between upper edges of lower panels 306, 308, 310, 312 of the top 302 to form a roof over the truck bed. The upper panel 304 may also be detached from the lower panels of the top 302 and folded to create an opening over the truck bed 22 so that the truck bed can accommodate larger items, such as a motorcycle in the truck bed. The frame 10 may also include upper crossmembers 54, 55, 56, which may be removed to accommodate such larger items when the upper panel 304 is folded. The top 302 may be attached to the frame 10 so that the lower panels 306, 308, 310, 312 are still held in place on the interior side of the frame 10 when the upper panel 304 is removed or transitioned so as to be configured to be out of the way to allow a larger item to be stored on the truck bed.

Referring now specifically to FIG. 29, the top 302 generally includes the upper panel 304, a pair of side panels 306, 308, a front panel 310, and a rear panel 312. The side panels 306, 308 are joined to the upper panel 304 to define respective side seams 307, 309, with the side panels 306, 308 extending downwardly from the upper panel 304 in generally opposed relation to each other. When the top 302 is positioned over the truck bed and attached to the frame 10, each side panel 306, 308 extends from the upper panel 304 to an upper region of a respective sidewall 26, 28 on the truck bed 22. The front panel 310 is joined to the upper panel 304 to define a front seam 311, with the front panel 310 extending from the upper panel 304, between the pair of side panels 306, 308 and being positionable so as to extend adjacent to (e.g., parallel) a rear wall 35 of the cab 34 when the top 302 is deployed. The rear panel 312 is joined to the upper panel 304 to define a rear seam 313, with the rear panel 312 extending from the upper panel 304 in generally opposed relation to the front panel 310, and between the pair of side panels 306, 308. The rear panel 312 may extend between the upper panel 304 and the tailgate 30 when the tailgate 30 is in a closed, raised position.

The upper panel 304 may include an inner surface 314 (see FIG. 32) and an outer surface 316 (see FIG. 32), with the inner surface 314 facing toward the truck bed 22 when the top 302 is deployed, and the outer surface 316 facing away from the truck bed 22 when the top 302 is deployed.

To transition the top 302 from the deployed position shown in FIG. 29 to the folded configuration shown in FIG. 30, the side panels 306, 308 may be folded about respective seams 307, 308 (see FIG. 29) and toward the inner surface 314 (see FIG. 32) of the upper panel 304. The side panels 306, 308 may also folded about pleated lines 301. Similarly, the front panel 310 and rear panel 312 may also be folded about respective seams 311, 313 (see FIG. 29) and toward the inner surface 314 of the upper panel 304. With the side panels 306, 308, front panel 310, and rear panel 312 folded toward the inner surface 314 of the upper panel 304, the upper panel 304 may be folded in half about a longitudinal fold line 315 (see FIG. 29), thereby making the overall size of the folded top 302 smaller to facilitate storage. The top 302 may be folded along other fold lines (not shown) which may be parallel or perpendicular to longitudinal fold line 315, depending on the desired folded configuration. As shown in FIG. 30, the folded top 302 may be placed in the cab 34 for storage behind the seat, and then subsequently removed from the cab 34 for use and deployment.

Figure 31:
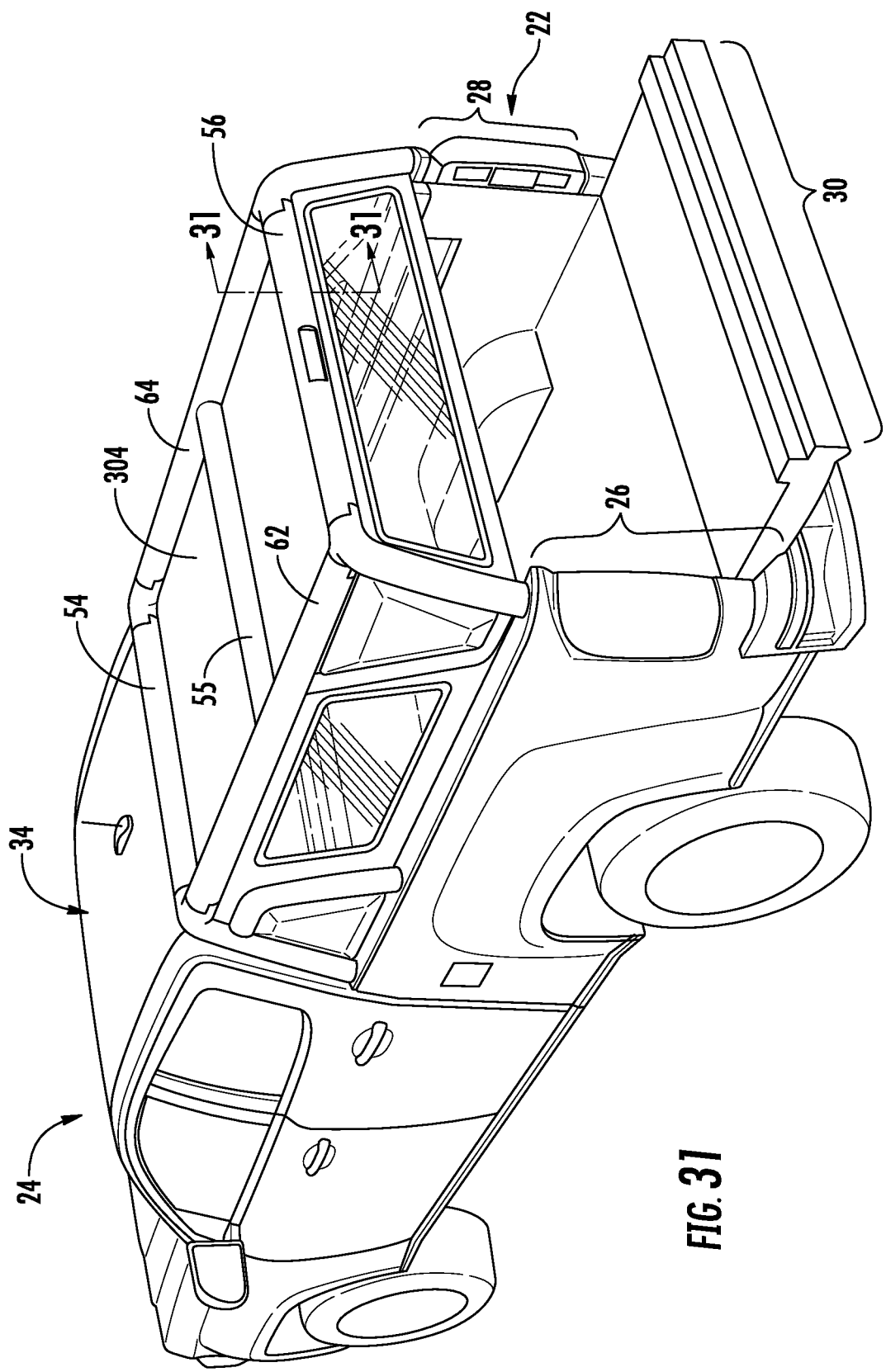
FIG. 31 is an upper perspective view of the truck bed cover of FIG. 29, with the cover in a deployed configuration and connected to an external frame.

To deploy/unfold the top 302, the top 302 may be transitioned to the configuration shown in FIG. 29, with the side panels 306, 308, front panel 310, and rear panel 312 all extending downwardly from the upper panel 304. The top 302 may be moved into position for attachment to the frame 10. In particular, the top 302 may be placed over the truck bed 22, and under the frame 10. The top 302 may then be attached to the frame 10 so that the top 302 is partially supported by the frame 10 as shown in FIG. 31. The top 302 and the frame 10 may include snap fasteners 318 (see FIG. 32) for allowing the top 302 to be secured to the frame 10.

Figure 32:
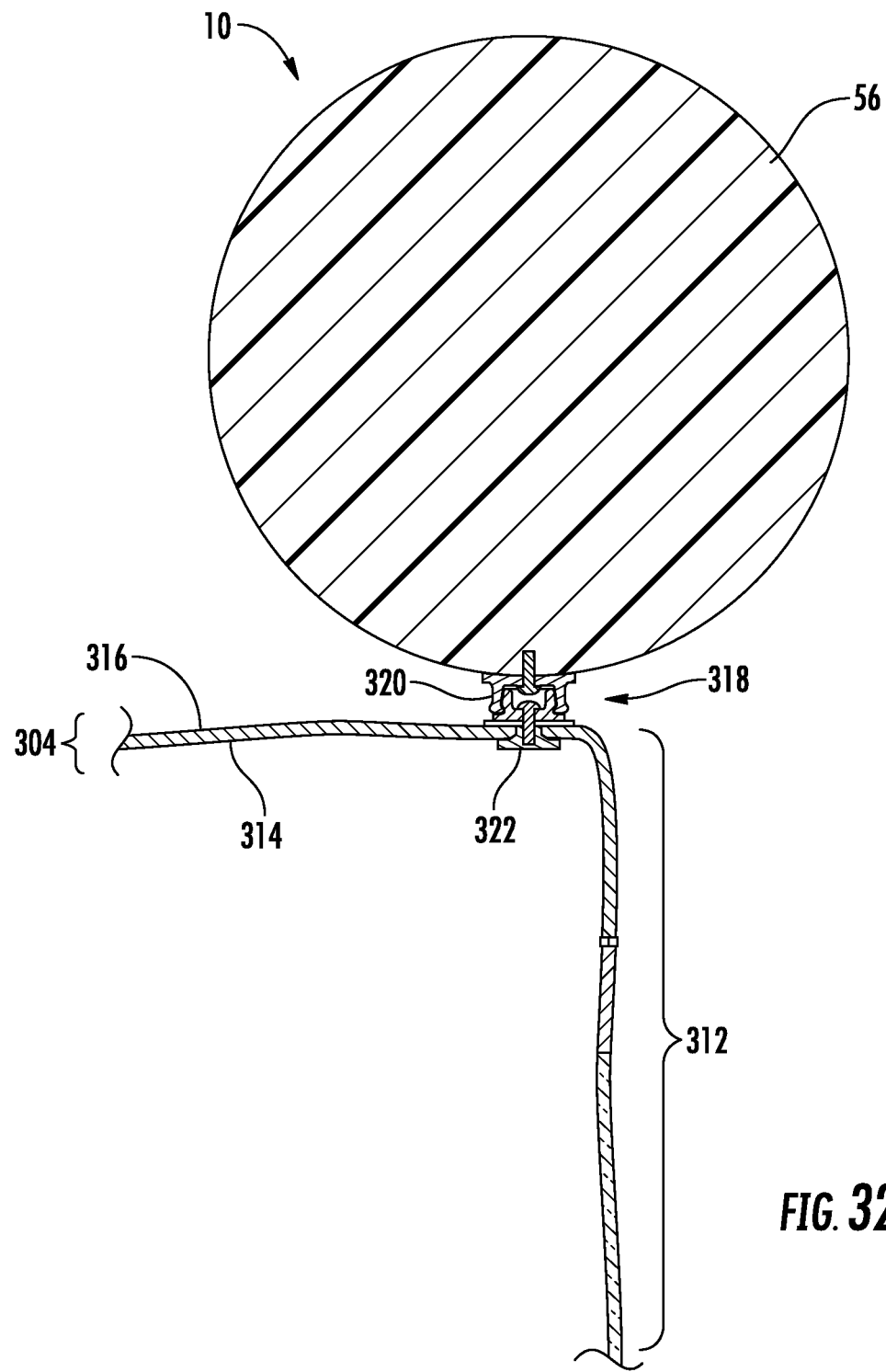
FIG. 32 is a partial cross sectional view of the truck bed cover of FIG. 30, showing a snap fastener for connecting the top to the external frame.

Referring now to FIG. 32, a snap fastener 318 is shown for connecting the top 302 to the frame 10. In particular, the snap fastener 318 may include a first fastener body 320 and a second fastener body 322. The first fastener body 320 may be mounted on the frame 10, with FIG. 32 showing the first fastener body 320 on the rear crossmember 56, and the second fastener body 322 is shown as being mounted on the upper panel 304. The second fastener body 322 may be pressed into the first fastener body 320 to facilitate connection between the fastener bodies 320, 322, as well as connection of the top 302 to the frame 10.

The top 302 may include a plurality of first fastener bodies 320 arranged adjacent the outer periphery of the upper panel 304 in spaced relation to each other. For instance, adjacent first fastener bodies 320 may be spaced apart from each other by approximately 6-18 inches, and more preferably, 12 inches. The front crossmember 54, rear crossmember 56, intermediate crossmember 55, and extension members 62, 64 may include a plurality of corresponding second fastener bodies 322. Thus, the user may begin by attaching the first fastener bodies 320 on the top 302 to the second fastener bodies 322 on the front cross member 54, then the intermediate cross member, and along the extension members 62, 64. Finally, the first fastener bodies 320 on the top 302 may be connected to the second fastener bodies 322 on the rear crossmember 56. The spacing of the second fastener bodies 322 along the frame may be spaced similar to the first fastener bodies 320 such that second fastener bodies 322 become aligned with the first fastener bodies 320 when the top 302 is moved toward the deployed configuration.

In addition to attachment to the frame 10, the panels 306, 308, 310, 312 may also include a plurality of first fastener bodies 320 in spaced relation to each other, which interface with a corresponding plurality of second fastener bodies 322 mounted to the truck bed 22. Therefore, after the top 302 has been connected to the frame 10, the first fastener bodies 320 on the top 302 may be connected to the corresponding second fastener bodies 322 on the front wall 32 of the truck bed, then along the sidewalls 26, 28, and finally along the tailgate 30.

Although the foregoing describes the user of snap fasteners 318 for connecting the top 302 to the frame 10 and truck bed 22, it is contemplated that zippers, track members, magnets, buttons, or other fasteners may be used in lieu or in addition to snap fasteners to attach the top 302 to the frame 10.

The side, front and rear panels 306, 308, 310, 312 may be separate panels that are joined to the upper panel 304 to define water-tight seams at the junction of adjacent panels, which themselves may be formed from water-resistant material. The adjacent panels may be joined by a zipper, sewing, through the use of adhesives, welding, or via other fasteners or techniques known by those skilled in the art. The frame 10 and the top 302 may be sized and structured such that when the top 302 is deployed and connected to the frame 10, various members of the frame 10 may extend along the seams on the top 302 to at least partially hide or conceal the seams, and enhance the robust appearance of the truck bed cover 300. The proximity of the frame members to the seams may also allow the frame 10 to provide support to the top 302 adjacent the seams to enhance the strength of the truck bed cover 300. With regard to a given seam, the adjacent panels forming that seam may both be attached to a common frame member to transfer forces from the panels to the frame member, rather than having all of the forces between the adjacent panels being supported solely by the seam.

It is contemplated that the upper panel 304 may be configured when deployed and connected to the frame 10 so that a central area of the upper panel 304 is raised to a higher level than the periphery of the upper panel 304 so that rainwater tends to drip off the upper panel 304 and does not collect on to the upper panel 304. In this regard, the snap fastener 318 located at the central area of the upper panel 304 may pool up on the central area of the upper panel 304 while the snap fastener 318 and other areas of the upper panel 304 slope downward as one approaches the outer periphery of the upper panel 304.

Each of the panels 306, 308, 310, 312 may include a transparent section 327, 329, 331, 333 (see FIG. 29) and a non-transparent section 335, 337, 339, 341, with the transparent sections 327, 329, 331, 333 functioning as windows. The non-transparent sections 335, 337, 339, 341 may be formed from a woven material, such as canvas, or other durable materials known in the art, while the transparent sections 327, 329, 331, 333 may be formed from plastic, vinyl, or other transparent materials known in the art. The transparent sections 327, 329, 331, 333 may allow a user to look through the top 302 and see the contents located in the truck bed 22. For instance, the transparent section 331 in the front panel 310 may be aligned with a rear window on the cab 34 to allow people inside of the cab 34 to look into the truck bed 22. Furthermore, the combination of the transparent sections 331, 333 in the front panel 310 and the rear panel 312 may provide a clear view path for the driver when the driver looks at the rear view mirror to see activity or objects behind the truck 24.

The panels 306, 308, 310, 312 and the upper panel 304 may be fabricated from a bendable material so that the top 302 can be transitioned to the folded position. It is also contemplated that the upper panel 304 may be fabricated from a generally more rigid material than that of the panels 306, 308, 310, 312. Nevertheless, the upper panel 304 may be configured to slope downward from the central area of the upper panel 304 which is slightly higher than the other areas of the upper panel 304.

Figure 33:
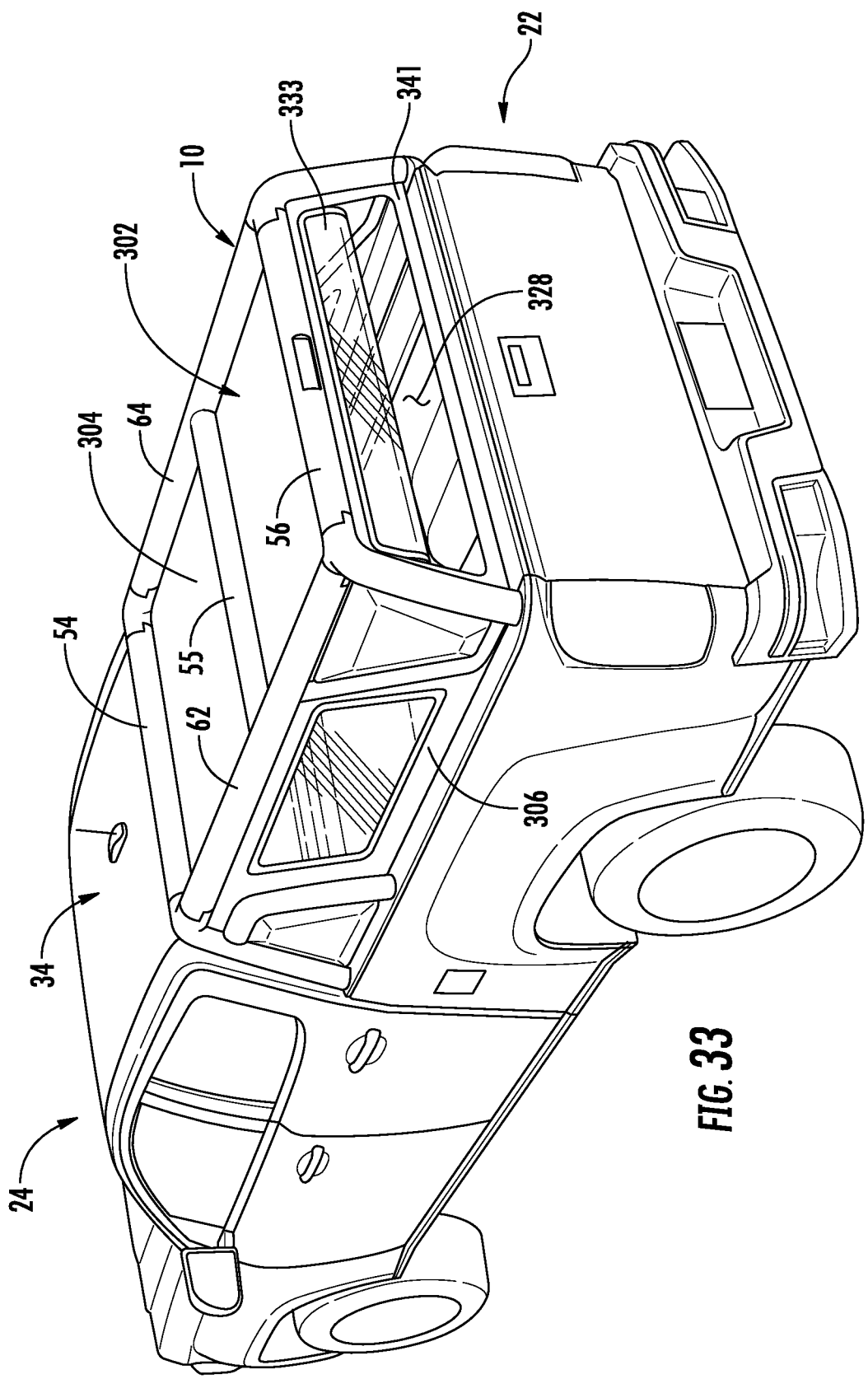
FIG. 33 is an upper perspective view of the truck bed cover of FIG. 30, depicting a rear window panel in a partially rolled up configuration.

Referring now specifically to FIG. 33, access to the truck bed 22 through the truck bed cover 300 may be facilitated through the transparent section 333, which may be at least partially separable from the side panels 306, 308 or the non-transparent section 341 to allow the transparent section to be rolled-up or folded relative to the non-transparent section 341. The rolled-up portion, i.e., the transparent section 333 may be rolled up so that it is in the up position and the user can access the truck bed. The rolled up portion may be securable to the upper panel 304. When in the rolled-up configuration, the rear panel 312 defines an opening 328, through which a user may access the truck bed 22 without having to lower the tailgate. The transparent section 333 of the rear panel 312 may be detachably securable to the non-transparent section 341 via snaps, magnets, hooks and loops fasteners, or other fasteners known in the art.

Figure 34:
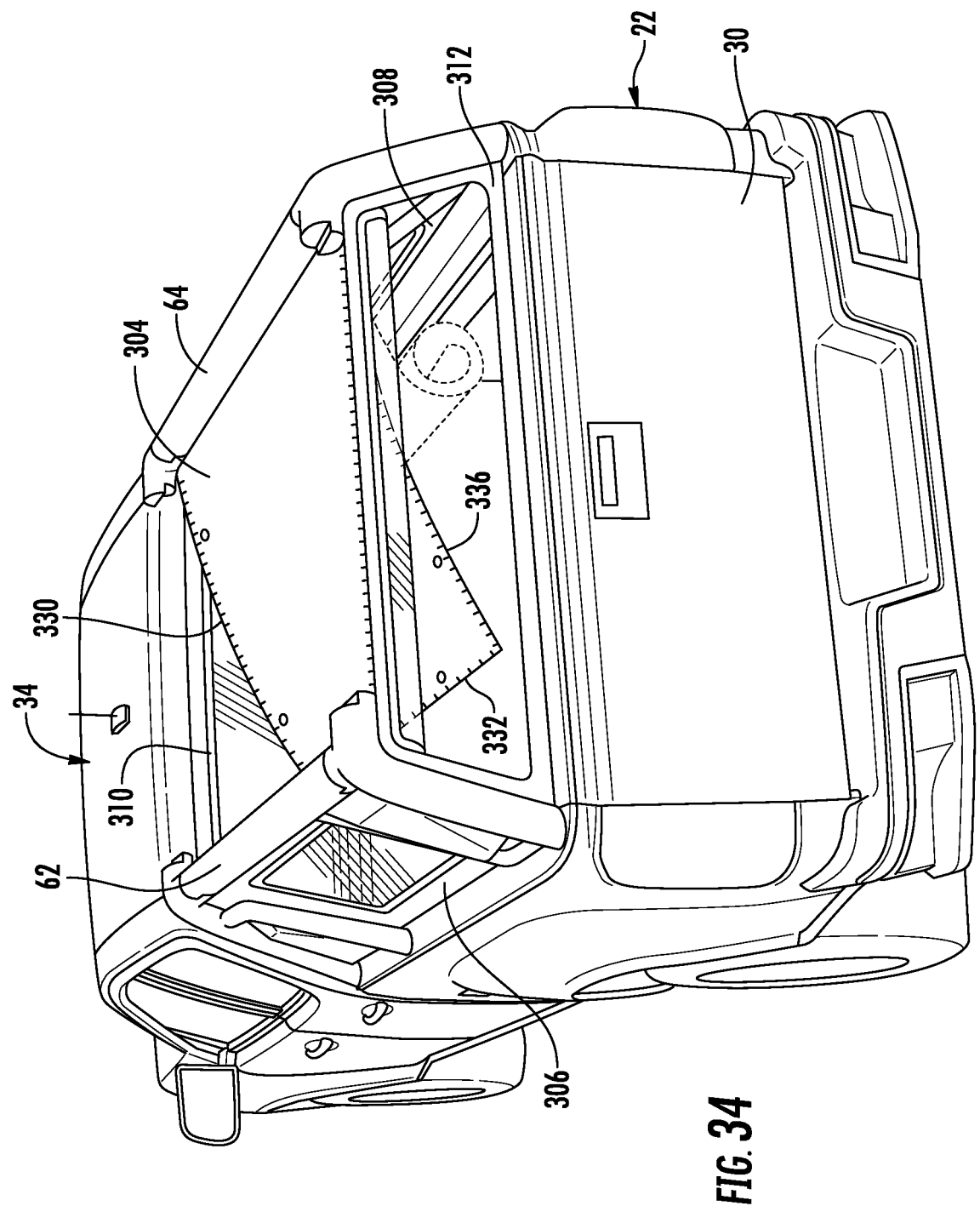
FIG. 34 is an upper perspective view of the truck bed cover of FIG. 30, with a top panel being transitioned to a stowed configuration.

Referring now to FIG. 34, the top 302 may be structured to allow for the upper panel 304 to be disconnected from the front panel 310, rear panel 312, and a side panel 306 and folded to the side. Disconnection of the upper panel 304 may preferably still allow the top 302 to remain engaged with the frame 10 while at the same time, removing the upper panel 304 to accommodate larger items, such as a motorcycle in the truck bed. As such, the user may not be required to remove the entire top 302 from the frame 10 to accommodate taller items; rather, the upper panel 304 may be simply transitioned from an extended position to a folded or removed position. It is also contemplated that the upper panel 304 may be completely removed from the panels 306, 308, 310, 312.

The upper panel 304 may include a front edge 330, a first side edge 332, and a rear edge 336. The front edge 330 may be detachably connectable to the front panel 310, the first side edge 332 may be detachably connectable to side panel 306, and the rear edge 336 may be detachably connectable to the rear panel 312. When the upper panel 304 is in an extended position, the front edge 330 is connected to the front panel 310, the first side edge 332 is connected to the side panel 306, and the rear edge 336 is connected to the rear panel 312, with the upper panel 304 forming a roof over the truck bed enclosure. Therefore, a user may place small items in the truck bed enclosure, and keep such items secure and isolated from the outside environment. When the upper panel 304 is in a folded configuration, the front edge 330 is disconnected from the front panel 310, the first side edge 332 is disconnected from the side panel 306, and the rear edge 336 is disconnected from the rear panel 312. When the upper panel 304 is in the folded configuration, loops, straps or other fasteners (not shown) may be used to maintain the upper panel 304 in the folded configuration. Placing the upper panel 304 in the folded configuration allows a user to store larger, taller items in the truck bed 22. The crossmembers 54, 55, 56 of the frame 10 may be detached from the extension members 62, 64 to accommodate such larger items. For instance, the upper panel 304 may be placed in the folded configuration to allow for storage of a motorcycle in the truck bed 22. The detachability and foldability of the upper panel 304 relative to the remaining panels 306, 308, 310, 312 allows the top 302 to remain attached to the frame 10 when larger items are placed in the truck bed 22. Thus, rather than having to remove the top 302 in its entirety to accommodate larger items, the upper panel 304 can simply be folded to accommodate the larger items.

The detachable connection between the upper panel 304 and the side, front, and rear panels 306, 310, 312 may be facilitated through a zipper or other fasteners which preferably are capable of creating a fluid tight interconnection between the upper panel 304 and the side, front, and rear panels 306, 310, 312. However, it is understood that fasteners which do not create a fluid tight interconnection may also be used without departing from the spirit and scope of the present disclosure.

Figure 35:
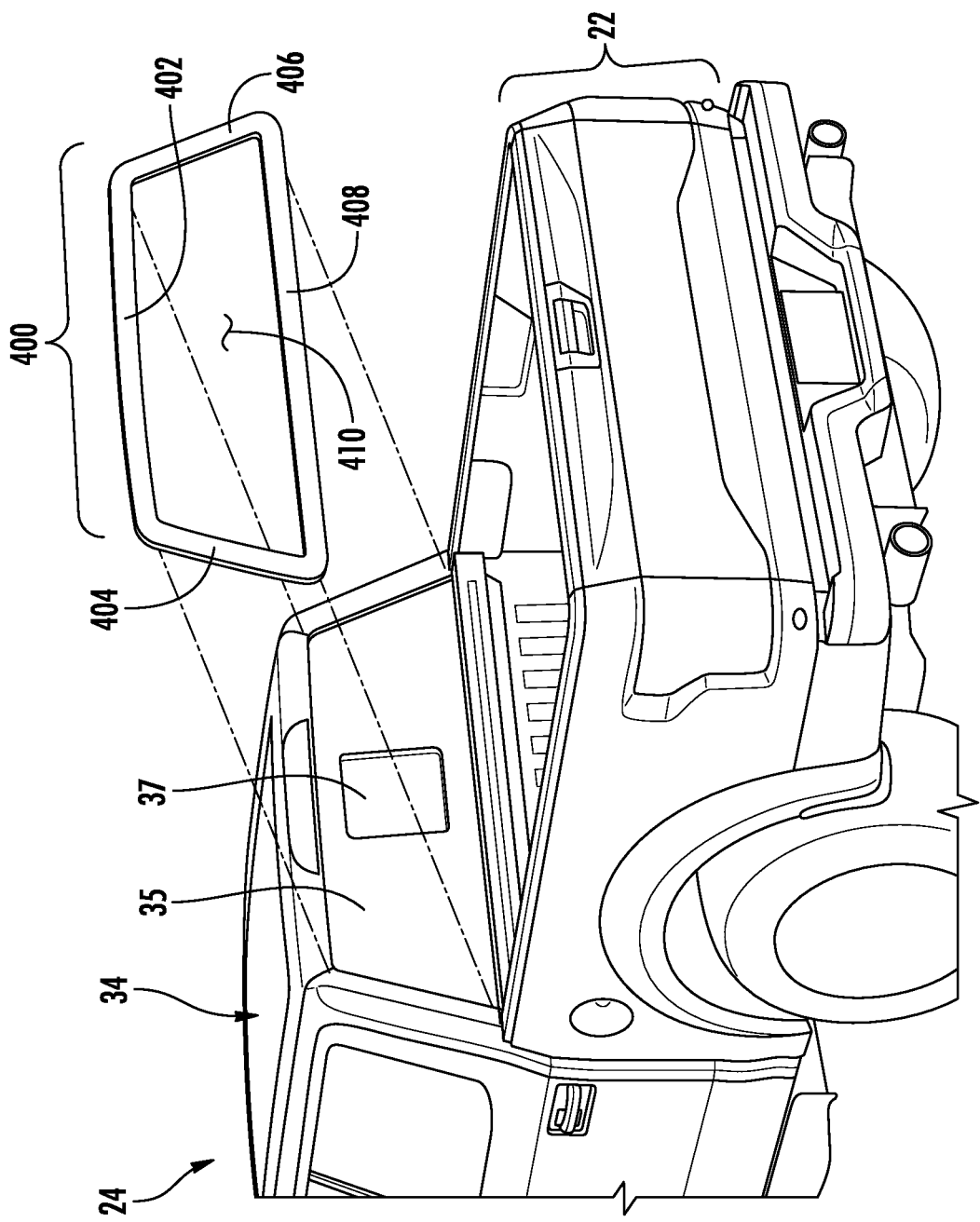
FIG. 35 is an upper perspective view of a weather strip detached from a rear surface of a cab.
Figure 41:
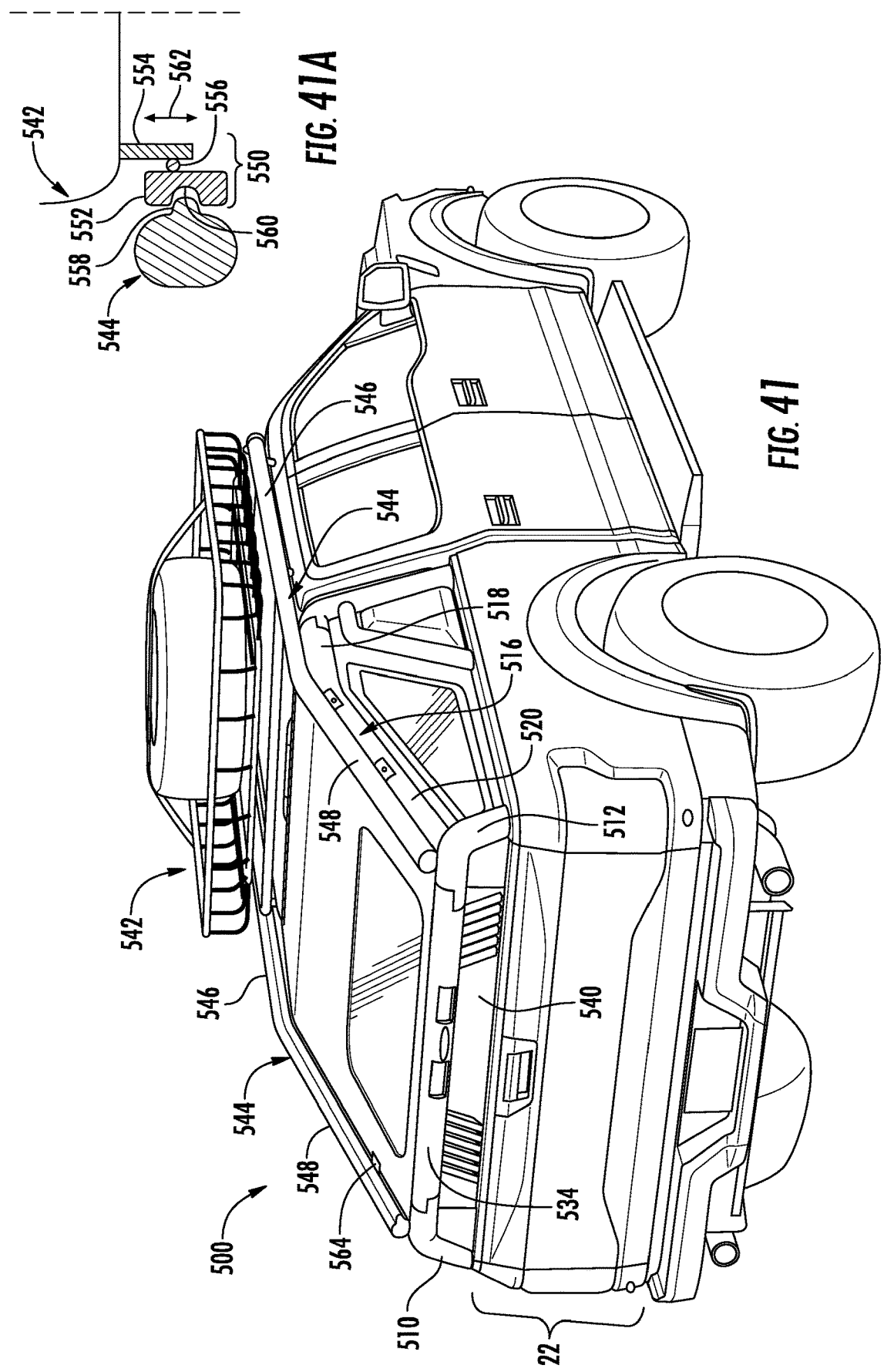
FIG. 41 is an upper perspective view of a roof rack coupled to the external frame, the roof rack being in an over-the-roof position, and the upper panel being in a closed position.

Referring now to FIG. 35, there is depicted a weather strip 400 for creating a weather-resistant barrier between the truck cab 34 and a truck bed cover 500 (see FIG. 41). The weather strip 400 may occupy a gap between the truck cab 34 and the truck bed cover 500 to prevent moisture from rain, sleet, snow, or other sources (e.g., sprinklers or puddle splashes) from flowing into the truck bed enclosure. The weather strip 400 may be configured to provide the weather-resistant functionality without obscuring the driver's line-of-sight through the rear window 37 located in the rear wall 35 of the cab 34.

Figure 36:
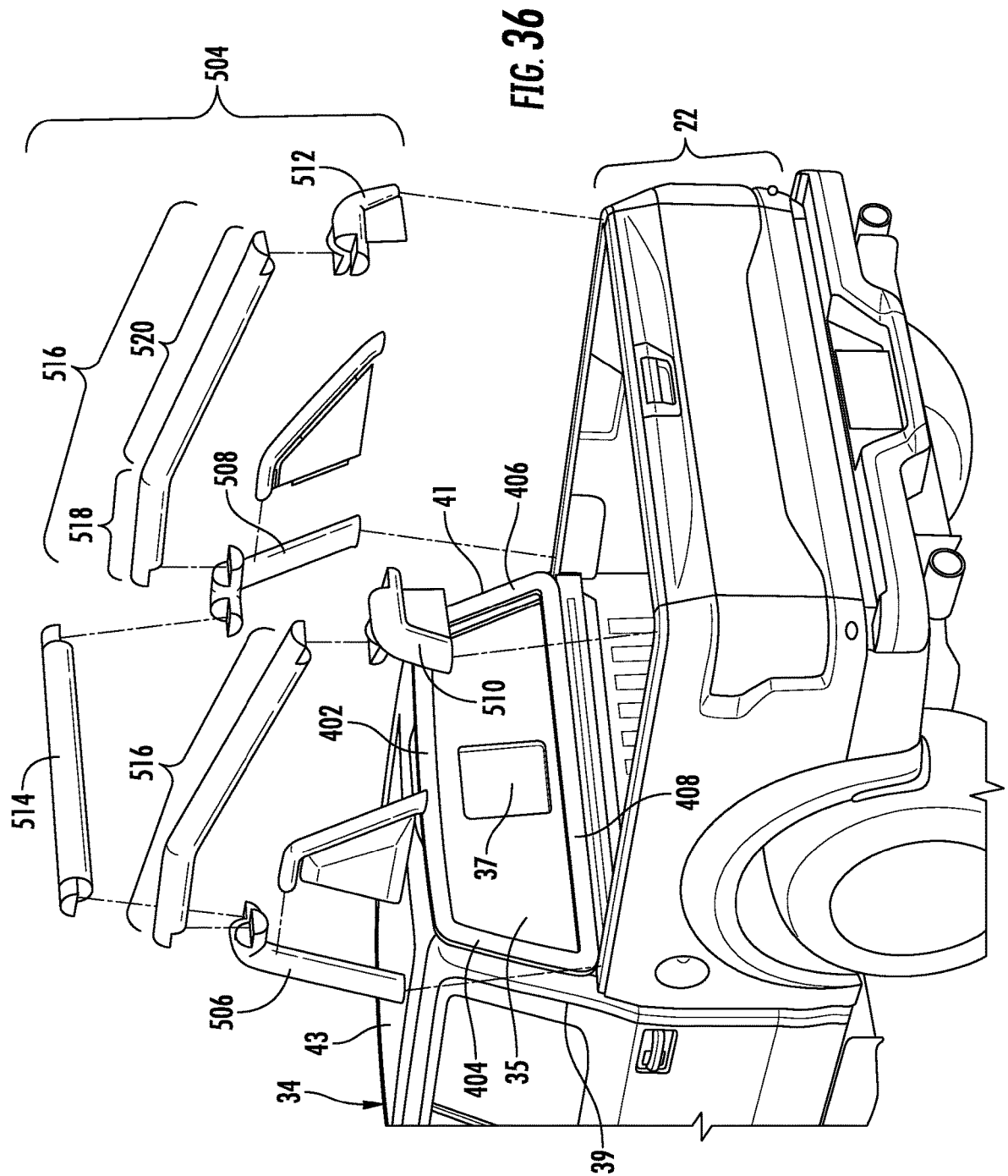
FIG. 36 is an upper perspective view of the weather strip attached to the cab and an external frame in an exploded configuration.

FIG. 35 shows the weather strip 400 removed from the cab 34 for purposes of clarity, while FIG. 36 shows the weather strip 400 attached to the cab 34, with an external frame 504 of truck bed cover 500 being shown in an exploded configuration, also for purposes of clarity. The weather strip 400 may be expandable to occupy the gap between the cab 34 and the truck bed cover 500. In this regard, the weather strip 400 may be compressible and resilient, to allow the weather strip 400 to be compressed between the cab 34 and the truck bed cover 500 during installation, and then once installed, the weather strip 400 may apply a force to the cab 34 and a portion of the truck bed cover 500 to create the weather-resistant seal therebetween. The weather strip 400 may be inflatable, or have natural resiliency to allow for such compressibility. The weather strip 400 may be a tube or gasket, and may be formed from rubber or other weather resistant, resilient materials known in the art. Attachment of the weather strip 400 to the cab 34 may be via glue or other adhesives or by simple pressure and friction. The weather strip 400 may also be attached to the cab 34 via mechanical fasteners, such as rivets, nails, or screws.

The weather strip 400 may include an upper segment 402, a pair of side segments 404, 406, and an optional lower segment 408, which collectively circumnavigate an enclosed area 410 (i.e., space or volume interior to the weather strip 400). When the weather strip 400 is attached to the cab 34 as shown in FIG. 36, the enclosed area 410 of the weather strip 400 may overlap with the window 37 so as not to block the window 37. The configuration of the weather strip 400 may correspond to the size and contour of the truck cab 34. In this regard, one side segment 404 may extend adjacent a first side 39 (see FIG. 36) of the truck cab 34, another side segment 406 may extend adjacent a second side 41 of the truck cab 34, while another portion of the weather strip 400 may extend adjacent the roof 43 of the truck cab 34. The lower segment 408 may be optional, and may provide protection from water which may splash up from the road. Thus, certain implementations of the weather strip 400 may be formed without a lower segment 408.

When the weather strip 400 is installed on a truck 24, the weather strip 400 may create a water tight seal or at least rain resistant seal with the truck cab 34 and the truck bed cover 500 to redirect water away from the truck bed enclosure. For instance, if rain is falling on the truck 24, the rain drops may fall onto the upper segment 402, and may flow down along one of the side segments 404, 406, and then continue down toward the ground. Furthermore, if the truck 24 is wet and moving along a road, water droplets on the truck 24 may flow along the length of the truck 24. As the water droplets approach the end of the truck cab 34, the water droplets may flow across the weather strip 400, and then onto the truck bed cover 500, and thus, the weather strip 400 may prevent the water droplets from entering the truck bed enclosure. For example, an upper surface of the upper segment 402 may be at the same height as the upper surface of the truck bed cover. Therefore, items stored within the truck bed enclosure may remain dry.

The weather strip 400 may be used with a variety of different truck bed covers. Therefore, while weather strip 400 is shown in combination with truck bed cover 500 shown in the figures, it is understood that the scope of the present disclosure is not limited thereto.

Referring now to FIGS. 36-42, truck bed cover 500 is shown, with the truck bed cover 500 having a tapered shape at its rear end to provide a sleek, compact, aerodynamic look. The truck bed cover 500 may include a top 502 (see FIG. 39) that may be moved from a closed position to an open position with ease. As such, the truck bed cover 500 may function similar to a hatchback with a selectively accessible trunk.

The truck bed cover 500 may include a frame 504 securable to the truck bed 22. The frame 504 may be configured such that when the top 502 is attachable to the frame 504, the frame 504 remains visible to a person standing outside of the truck (i.e., externally perceivable). In other words, the top 502 may not cover the frame 504 to a person outside of the truck viewing the truck bed cover 500. As such, the external location of the frame 504 allows the frame 504 to function like an exoskeleton, which may provide the truck bed cover 500 with a strong, robust appearance.

The frame 504 may include a forward driver side post 506 (see FIG. 36), a forward passenger side post 508, a rearward driver side post 510, a rearward passenger side post 512, positioned adjacent respective corners of the truck bed 22. The frame 504 may additionally include a front crossmember 514 securable to the forward driver side post 506 and the forward passenger side posts 508. A pair of side members 516 may extend along the sides of the frame 504.

The configuration of the side members 516 may be such that the side members 516 are angled downwardly toward the rear end of the truck bed 22. In this respect, each side member 516 may include a first segment 518 and a second segment 520 angled relative to the first segment 518. When the side members 516 are attached to the respective forward and rearward posts 506, 508, 510, 512, the second segments 520 extend downwardly from the respective first segments 518 to define the hatchback-like shape.

The frame 504 may be attached to the truck bed 22 such that the weather strip 400 occupies the gap between the frame 504 and the cab 34. In this regard, the upper segment 402 may extend between the cab 34 and the front cross member 514, the side segment 404 may extend between the cab 34 and the forward driver post 506, and the side segment 406 may extend between the cab 34 and the forward passenger post 508. Furthermore, the lower segment 408 may extend between the cab 34 and the forward wall of the truck bed.

Figure 38:
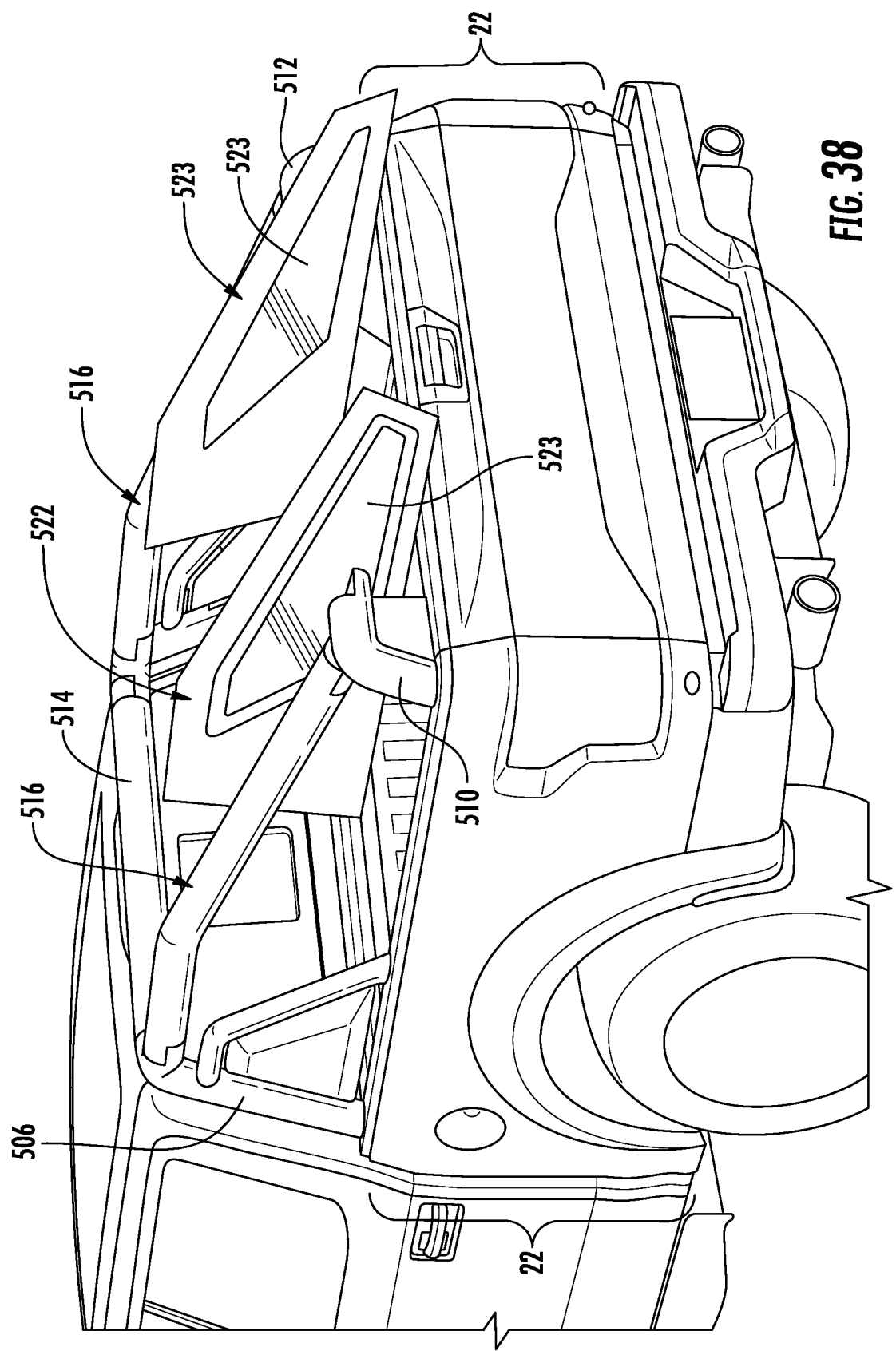
FIG. 38 is an upper perspective view of side panels being attached to the external frame.

After the frame 504 is attached to the truck bed 22, the top 502 and a pair of side panels 522 may be secured to the frame 504. Referring now specifically to FIG. 38, the pair of side panels 522 may extend downwardly from the side members 516 toward the truck bed 22. The side panels 522 may occupy the space between the side members 516 and the top of the truck bed 22 to partially define the enclosure created by the truck bed cover 500. The side panels 522 may include a transparent panel 523 incorporated therein, which may allow an individual to look into the truck bed enclosure to view items therein.

The side panels 522 may be coupled to the side members 516 and the truck bed 22 to mitigate water migration into the enclosure. In this regard, the side members 516 may be coupled to the side members 516 and the truck bed 22 via water-resistant engagement, such as through a zipper. Alternatively, the side panels 522 may be coupled to the truck bed 22 on the outer sides of the truck bed 22, such that any water runoff from the side panels 522 may fall outside of the truck bed 22. In this regard, the positioning of the lower end of the side panels 522 relative to the truck bed 22 may be similar to a roof tile, which overlaps an adjacent roof tile to direct water flow away from an interior location.

The existence of the weather strip 400 between the cab 34 and the frame 504 may eliminate the need for the top 502 to include a front panel (not shown) to extend between the forward driver post 506 and the forward passenger post 508. The absence of a forward panel may leave the window 37 unobstructed by the top 502, to provide the driver with a clear view-path through the window 37. However, it is understood that in other embodiments, the top 502 may include a front panel, particularly when a weather strip 400 is not used. In such cases, the front panel may be transparent, or include a transparent section, so as to allow a user to view through the front panel when looking through the window. The front panel may extend from the front cross member 514 to the truck bed, and between the forward driver post 506 and the forward passenger post 508 in a manner which directs water runoff away from the truck bed.

Figure 37:
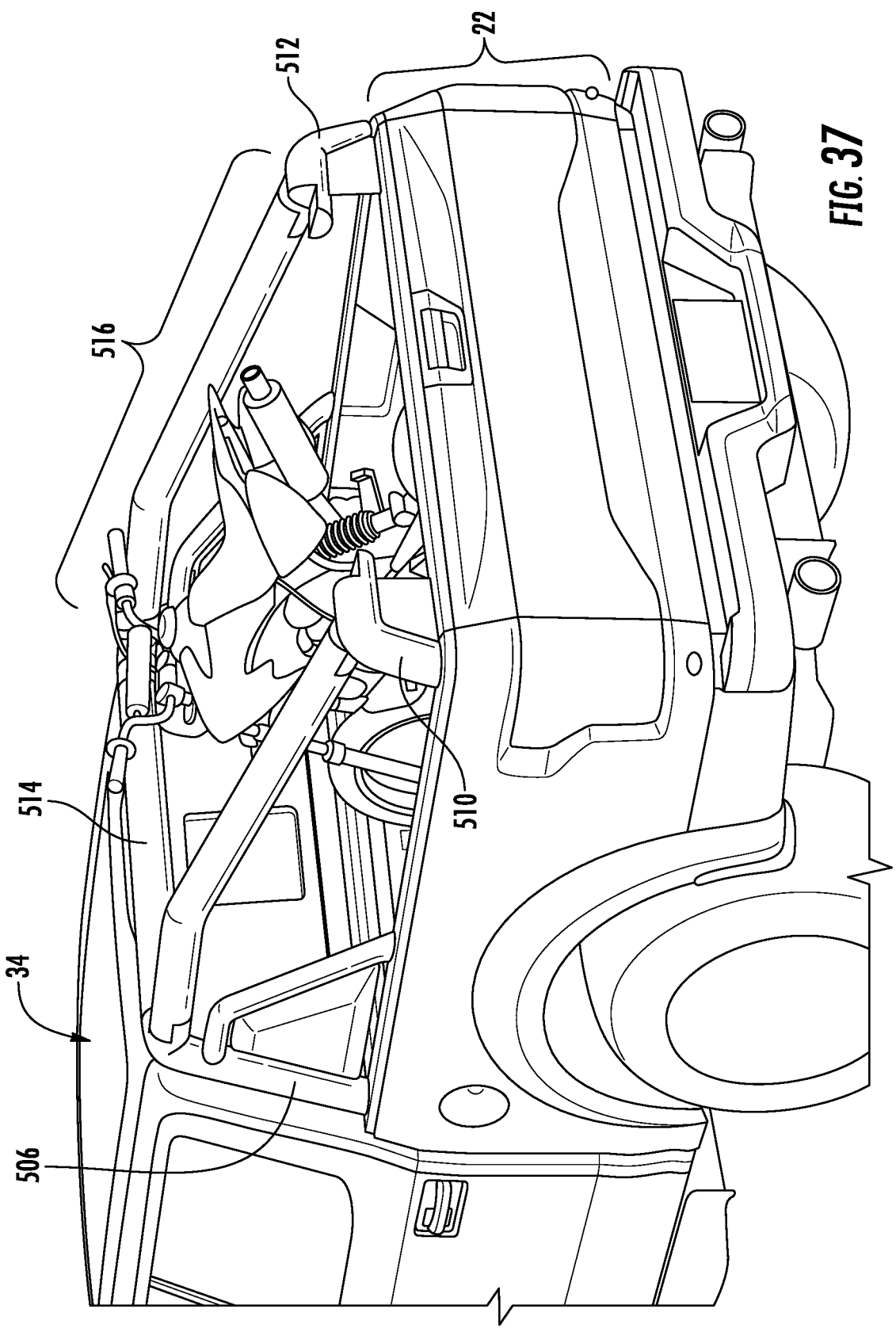
FIG. 37 is an upper perspective view of the weather strip attached to the cab and the external frame mounted on the truck bed.
Figure 42:
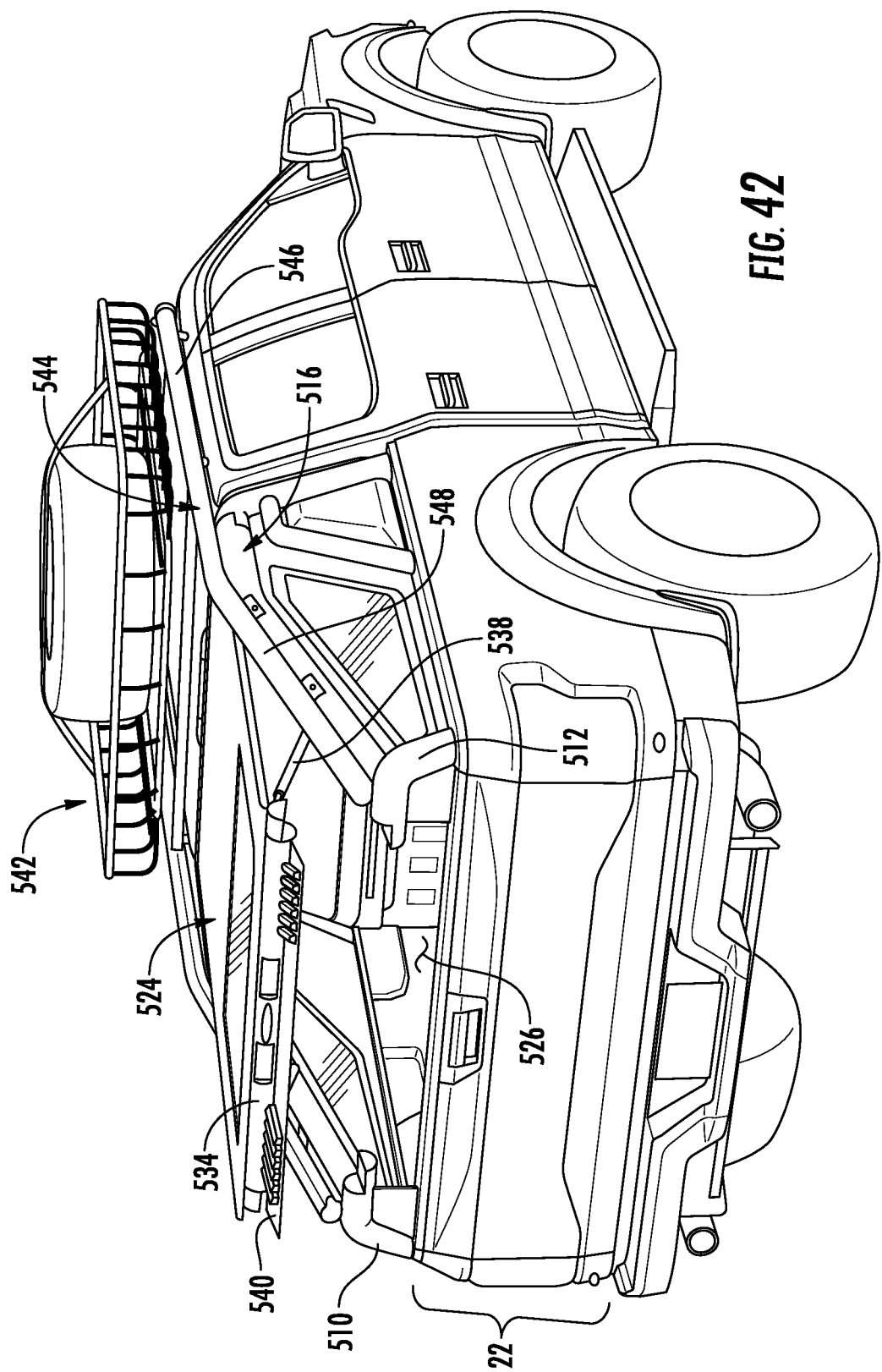
FIG. 42 is an upper perspective view of the roof rack and upper panel, the roof rack being in the over-the-roof position, and the upper panel being in an open position.

Referring now to FIGS. 39-42, the top 502 may include an upper panel 524 positionable over the truck bed enclosure 526 (see FIG. 42). The upper panel 524 may be detachably connected to the front cross member 514 to facilitate removable of the upper panel 524 when a higher clearance may be needed for storing large items in the truck bed 22. For instance, FIG. 37 shows a motorcycle placed in the truck bed 22, with the upper panel 524 having been removed to accommodate the motorcycle. The upper panel 524 may be detachably engageable to the front cross member 514 through the use of snaps, buttons, zippers, or a removable pin that may extend through an aligned pair of pivot housings, wherein one pivot housing may be coupled to the upper panel 524, and the other pivot housing may be coupled to the front cross member 514.

Figure 39:
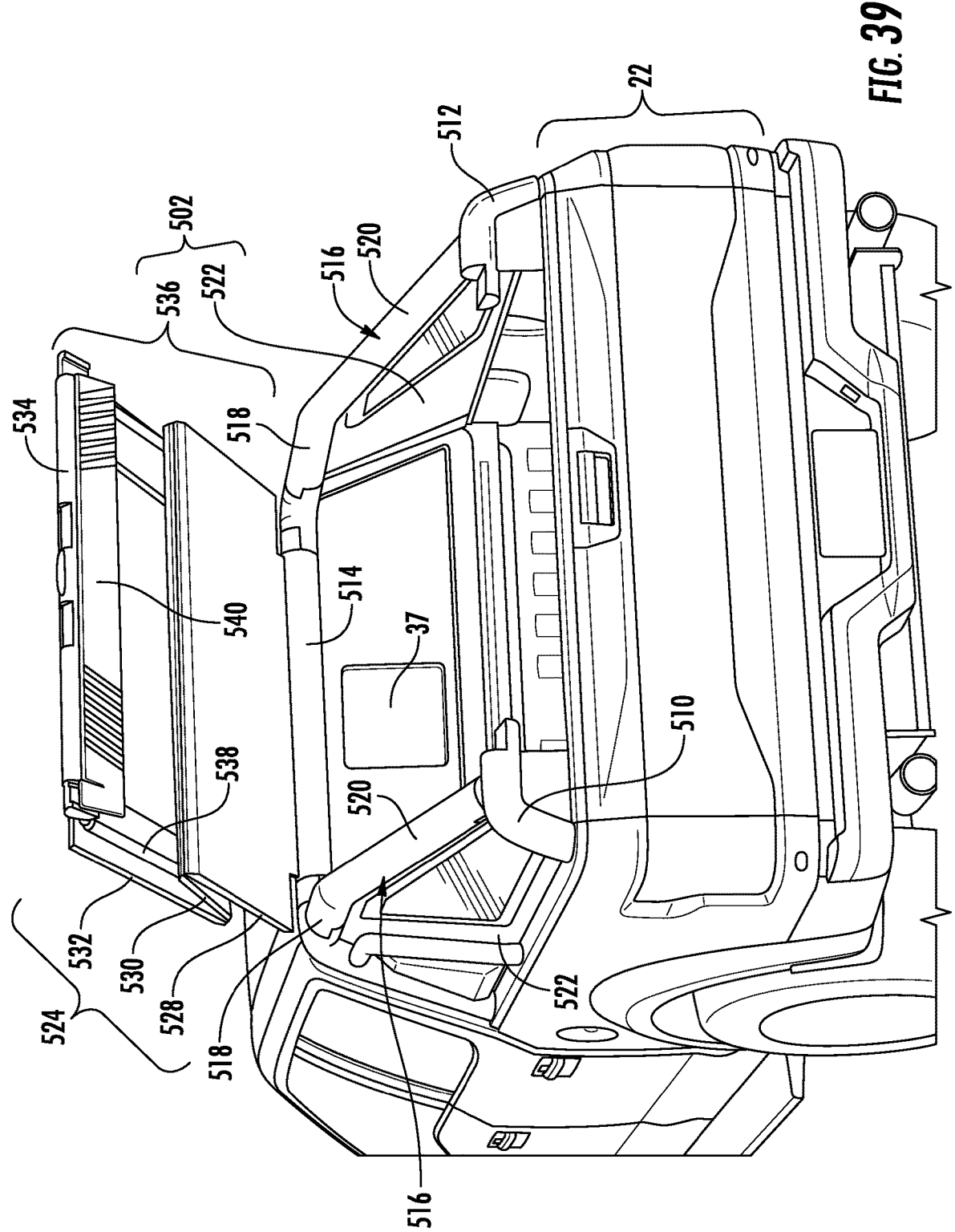
FIG. 39 is an upper perspective view of an upper panel hinged to the external frame in a first intermediate configuration.
Figure 40:
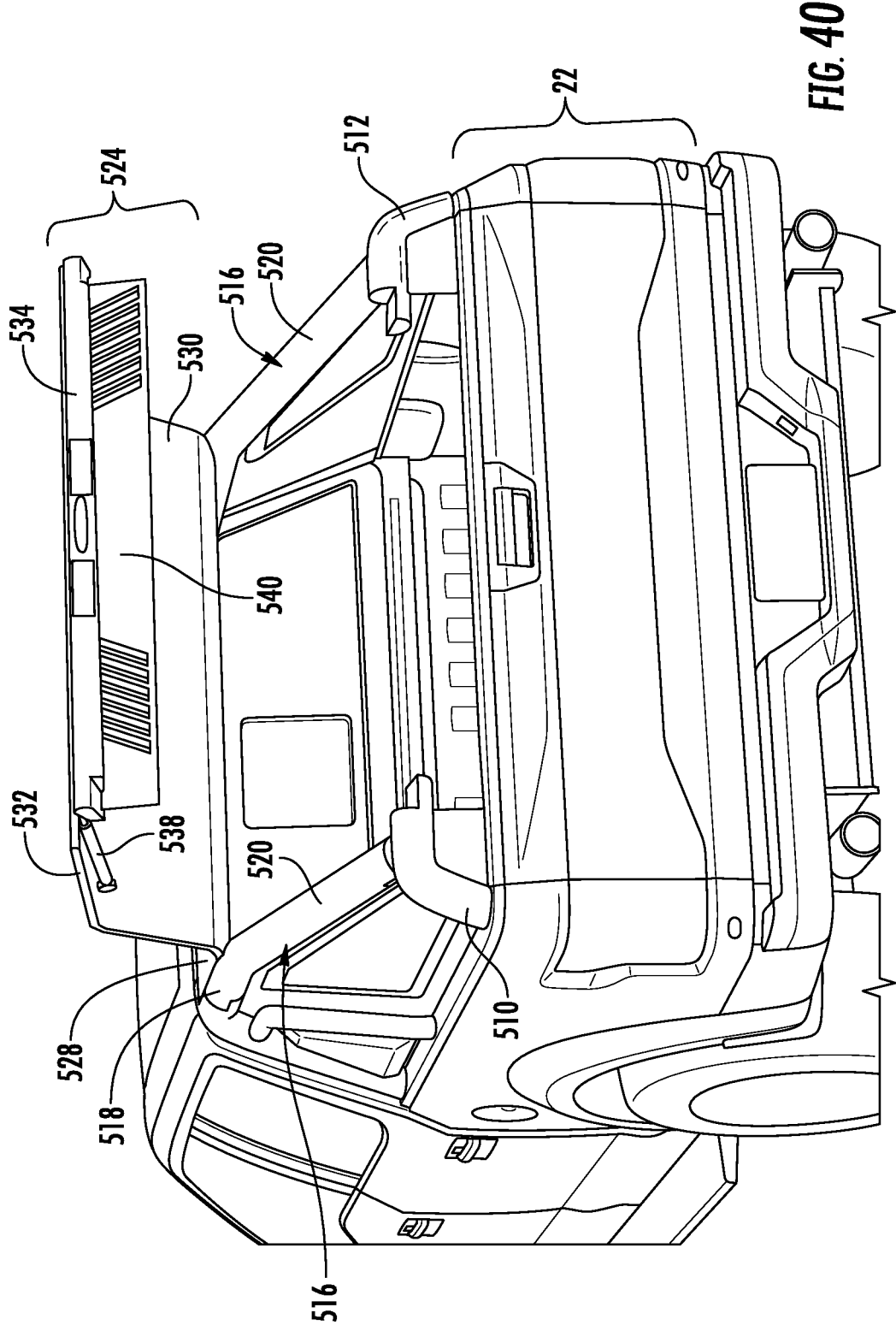
FIG. 40 is an upper perspective view of the upper panel in a second intermediate configuration.

The upper panel 524 shown in FIG. 39 is shown in a folded configuration, as may be the case during installation or removal of the upper panel 524 from the front cross member 514. As shown in FIGS. 39 and 40, the upper panel 524 may include three subpanels 528, 530, 532 separated by hinges to allow for folding of adjacent ones of the subpanels 528, 530, 532 relative to each other. As the upper panel 524 is installed on the frame 504, the upper panel 524 may assume an unfolded configuration, wherein the three subpanels 528, 530, 532 do not overlap each other.

FIG. 40 shows the upper panel 524 being placed on top of the first segment 518 of side members 516, and FIG. 41 shows the upper panel 524 completely installed and in its closed position, with the upper panel 524 resting on top of the first and second segments 518, 520 of the side members 516. The upper panel 524 may include several magnets (not shown) coupled thereto to facilitate engagement between the upper panel 524 and the side members 516. The magnets may be exposed or embedded within the upper panel 524.

The top 502 may include a rear cross member 534 coupled to the upper panel 524 to define a trunk assembly 536 (see FIG. 39). The rear cross member 534 may be securable to the rearward driver and passenger posts 510, 512 via a latch or other locking mechanism which may allow the rear cross member to remain locked to the rearward driver and passenger posts 510, 512, unless unlatched by a user, similar to a vehicle trunk locking mechanism.

One or more hydraulic pistons 538 (see FIGS. 39, 40, and 42) or other lift assisting mechanisms 538 may extend between the frame 504 and the rear cross member 534 to assist in lifting the trunk assembly 536 from its closed position toward its open position. The hydraulic pistons 538 may apply a force to the rear cross member 534 that at least partially counteracts the weight of the trunk assembly 536 to reduce the burden on the user for lifting the trunk assembly 536. Furthermore, the hydraulic pistons 538 may be configured to maintain the trunk assembly 536 in the open position so that a user is not required to hold the trunk assembly 536 in the open position to access the truck bed enclosure 526. As such, the trunk assembly 536 may remain in the open position independent of any assistance by the user because of the assistance provided by the hydraulic pistons 538. In fact, the hydraulic pistons 538 may urge the trunk assembly 536 toward the open position, such that when the user unlatches the rear cross member 534 from the rearward driver and passenger posts 510, 512, the hydraulic pistons 538 may automatically raise the trunk assembly 536 to the open position. Thus, to close the trunk assembly 536, the user would pull down on the trunk assembly 536 to overcome the biasing force applied by the hydraulic pistons 538.

When the trunk assembly 536 is in the closed position, the trunk assembly 536 may engage with the external frame 504 so as to provide a weather resistant barrier (or rainfall resistant seal) over the trunk bed enclosure 526. For example, a gasket may be disposed between the external frame and the truck assembly 536. Additionally or alternatively, the upper panel 524 may rest on a top portion of the side members 516, such that water runoff from the upper panel 524 falls away from the truck bed enclosure 526.

Furthermore, a flap 540 may be coupled to the rear cross member 534 to cover any gap between the rear cross member 534 and the tailgate 22 to mitigate water entry into the truck bed enclosure 526.

Referring now specifically to FIGS. 41-44, a roof rack 542 may be included as part of the truck bed enclosure 500. The roof rack 542 may be sized to store items therein, such as a spare tire, lifting jack, or storage of luggage or other items. The roof rack 542 may be moveable along rails 544 coupled to the external frame 504 to allow an individual to easily load/unload the roof rack 542 from a lower, more accessible position, and then move the roof rack 542 over the truck cab 34 when not loading or unloading the roof rack 542, to facilitate access to the truck bed enclosure 526.

The rails 544 may extend over a respective side of the truck 24. More specifically, each rail 544 may extend over a respective side member 516, and over at least a portion of the roof of the cab 34. Thus, given the angled configuration of the side members 516, each rail 544 may also be angled and include a first segment 546 extending over the roof of the cab 34 and the first segment 518 of the respective side member 516, and a second segment 548 extending over the second segment 520 of the respective side member 516. The first segment 546 of each rail 544 may be mounted to the roof of the cab 34, as well as to the first segment 518 of the respective side member. The second segment 548 of each rail 544 may be mounted to the second segment of the respective side member 516. The coupling the rails 544 to the cab 34 and the side members 516 may be by brackets, clamps or other mounting hardware.

Figure 43:
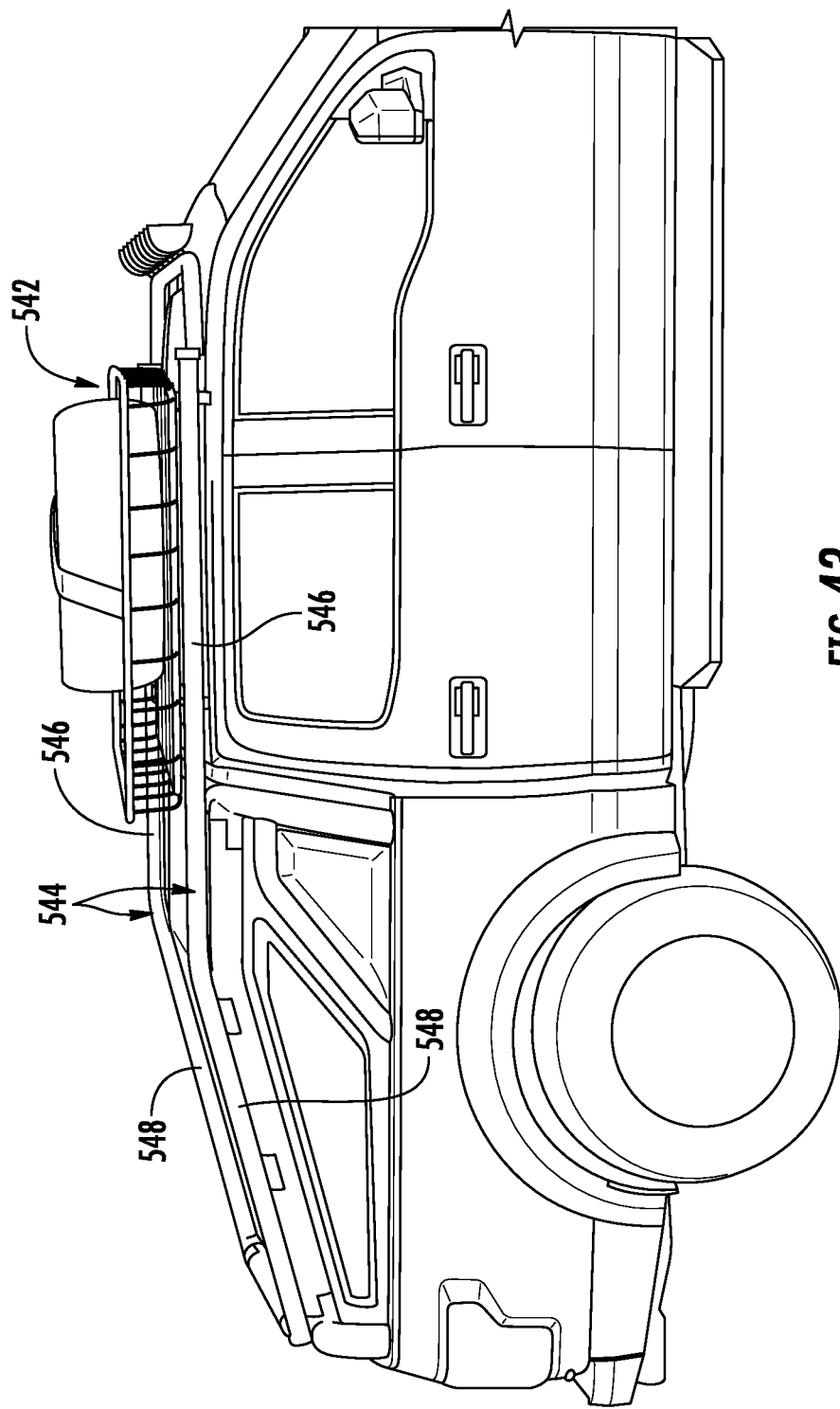
FIGS. 43 and 44 are side, upper perspective views showing the roof rack sliding along rails between an over-the-roof position, and an over-the-bed position, respectively.
Figure 44:
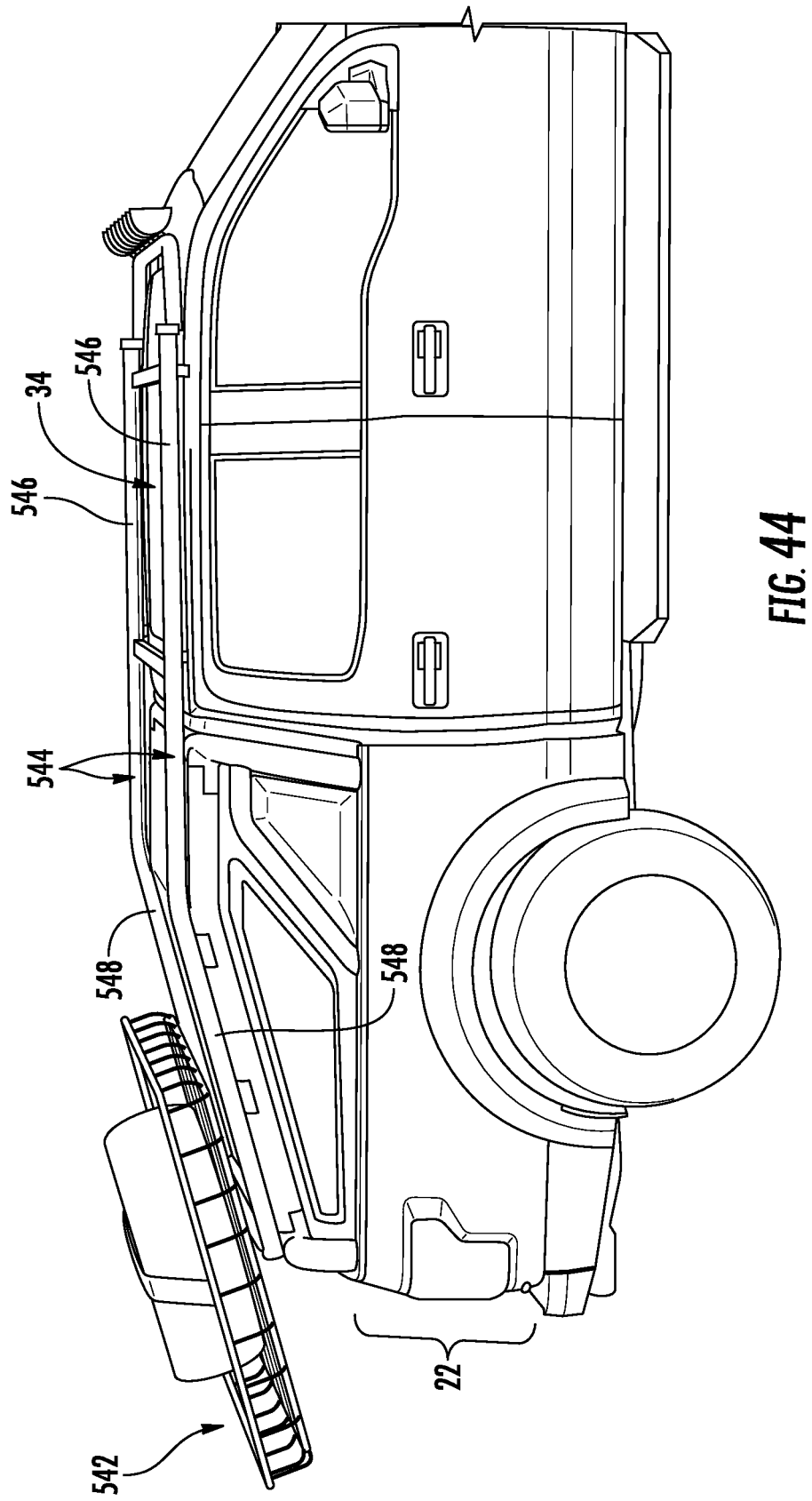

The roof rack 542 may be moveable along the rails 544 between an over-the-roof position, as shown in FIGS. 41-43, and an over-the-bed position, as shown in FIG. 44. Since the frame 504 may include an angled rear portion that is lower than the roof of the cab 34, the roof rack 542 may pivot relative to the rails 544 as the roof rack 542 moves between the over-the-roof position and the over-the-bed position.

Referring now to FIG. 41A, the roof rack 542 may be coupled to the rails 544 via a pivot mechanism 550 which allows the roof rack 542 to pivot relative to the rails 544. The pivot mechanism 550 may include a first member 552 that interfaces with the rail 544, and a second member 554 which is coupled to the roof rack 542, and a bearing 556 between the first and second members 552, 554 to allow for pivotal movement of the first and second members 552, 554 relative to each other. The first member 552 may be shaped to be complimentary to the rail 544 to allow for sliding motion of the first member 552 along the rail 544. As shown in FIG. 41A, the rail 544 may include a protrusion 558 that is received within a corresponding cavity 560 formed on the first member 552. The sizing and interface between the first member 552 and the rail 544 may allow the first member 552 to travel across the intersection between the first and second segments 546, 548 of the rail 544. Furthermore, the bearing 556 may be moveable in a direction represented by arrows 562, to accommodate the pitching movement of the roof rack 542 as it moves along the rails 544. The roof rack 542 may be coupled to the rails 544 via at least one pivot mechanism 550 on each rail 544, although it is understood that more than one pivot mechanism 550 (e.g., two, three, or more) may be coupled to each rail 544 for supporting the roof rack 542 thereon.

When the roof rack 542 is in the over-the-roof position, the trunk assembly 536 may not be impeded by the roof rack 542 to allow the trunk assembly 536 to be raised and lowered as needed by the user. FIG. 42 is an example of the roof rack 542 in the over-the-roof position, and the trunk assembly 536 in a raised position, with the trunk assembly 536 supported in the raised position by the hydraulic pistons 538.

When the roof rack 542 is in the over-the-bed position, the roof rack 542 is in a lowered position to make it easier to load and unload items from the roof rack 542. FIG. 44 shows the roof rack 542 in the over-the-bed position, with a portion of the roof rack 542 extending rearwardly beyond the rear cross member 534. The degree by which the roof rack 542 overhangs the rear cross member 534 may vary, with some embodiments allowing for a majority of the roof rack 542 to overhang the rear cross member 534, while other embodiments, may allow for a minority of the roof rack 542 to overhang the rear cross member 534, and still other embodiments, wherein the roof rack 542 does not overhang the rear cross member 534. A stop member 564 may be coupled to one or both of the rails 544 to engage with the roof rack 542 or the pivot mechanism 550 to limit movement of the roof rack 542 beyond the over-the-bed position and to support the weight of the roof rack 542 so a user is not required to hold the roof rack 542 in the over-the-bed position. It is contemplated that the stop member 564 may be removed from the rails 544 so as to allow for removal of the roof rack 542 from the truck 24, when desired.

Figure 45:
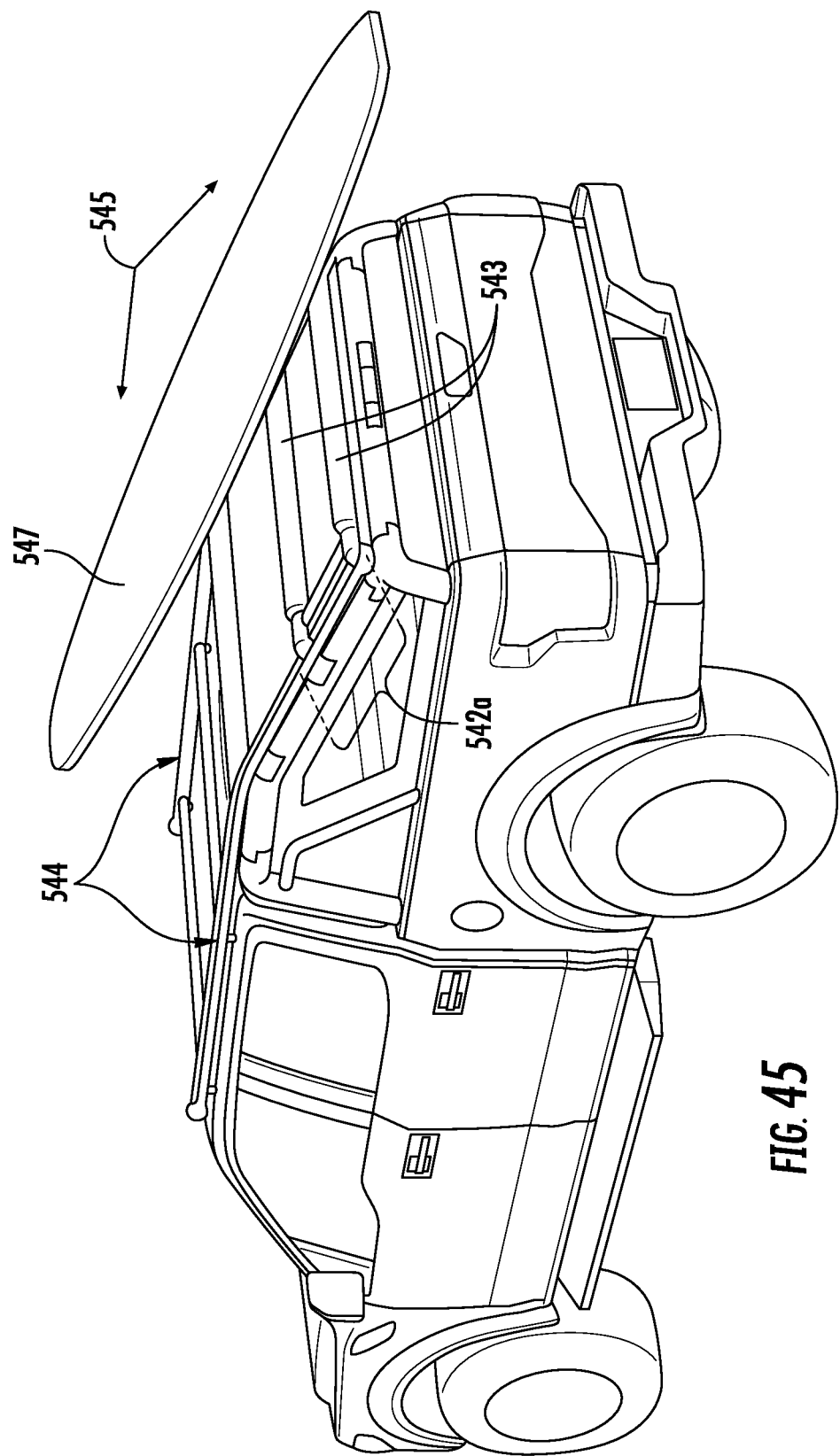
FIG. 45 is an upper perspective view of another embodiment of a slidable roof rack for transporting a surfboard.

Referring now to FIG. 45, roof rack 542a is shown in the form of a mounting carriage, with the roof rack 542a including mounting beams 543 extending between rails 544. The roof rack 542a may be transitional along the rails 544 in the direction of arrows 545 between the over-the-bed position and the over-the-roof position. In this regard, the roof rack 542a may interface with the rails 544 in the same manner as the roof rack 542, with the roof rack 542a both translating and pivoting relative to the rails 544 as the roof rack 542a transitions between the over-the-bed position and the over-the-roof position. However, the roof rack 542a provides a different structure, namely mounting beams 543, which may be used to mount items, such as surfboard 547 thereto. In this regard, tie-downs may be used to secure the surfboard 547 to the mounting beams 543 when the roof rack 542a is in the over-the-bed position. Once the surfboard 547 is secured to the mounting beams 543, the roof rack 542a may be transitioned from the over-the-bed position to the over-the-roof position. Therefore, items that are commonly stored on the roof of a vehicle, such a water sport equipment (e.g., kayak, wakeboard, stand up paddle board, surfboard, etc.), snow skis, snowboard, bikes, etc., may be mounted to the mounting carriage 542a for transport.

It is contemplated that the mounting beams 543 may be integrally connected to each other, and thus, the mounting beams 543 may articulate relative to the rails 544 as a single unit. Alternatively, each mounting beam 543 may be pivotally coupled to each rail 544 via a respective pivot mechanism, which may allow the mounting beams 543 to pivot relative to the rails 544 independent of one another. In this regard, the forward mounting beam 543 may pivot relative to the rails 544 independent of the rearward mounting beam 543, and vice versa.

The roof rack 542, 542a may be transitional between the over-the-bed position and the over-the-roof position via manual operation e.g., pushing/pulling the roof rack 542, 542a along the rails 544, or through a manually operated system which may include a crank, cable, and pulley. It is also contemplated that the roof rack 542, 542a may be moved along the rails 544 via an automated system, such as a hydraulic control system, or an electric control system.

Figure 46:
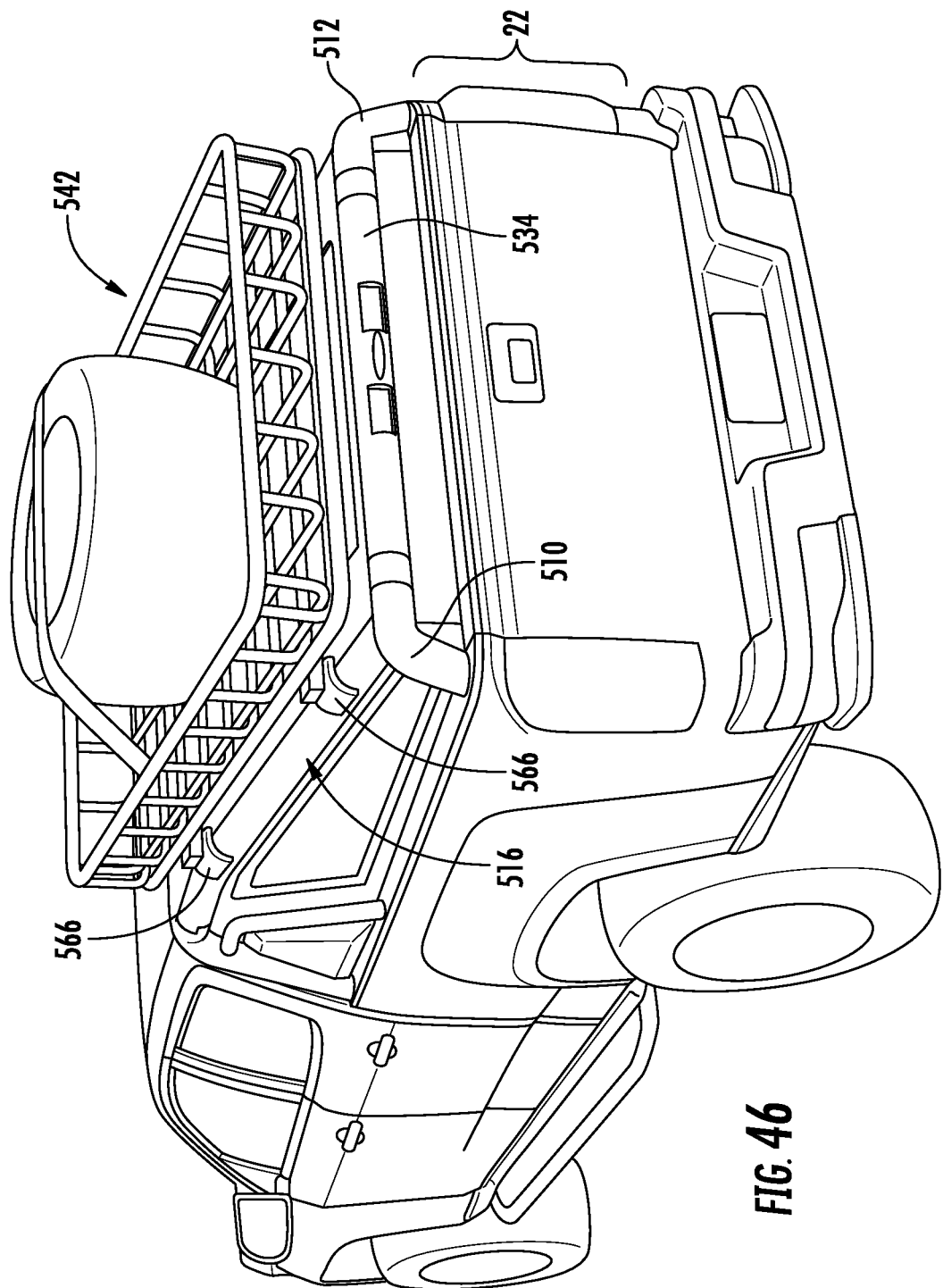
FIG. 46 is an upper perspective view of the roof rack mounted to the external frame over the truck bed.
Figure 47:
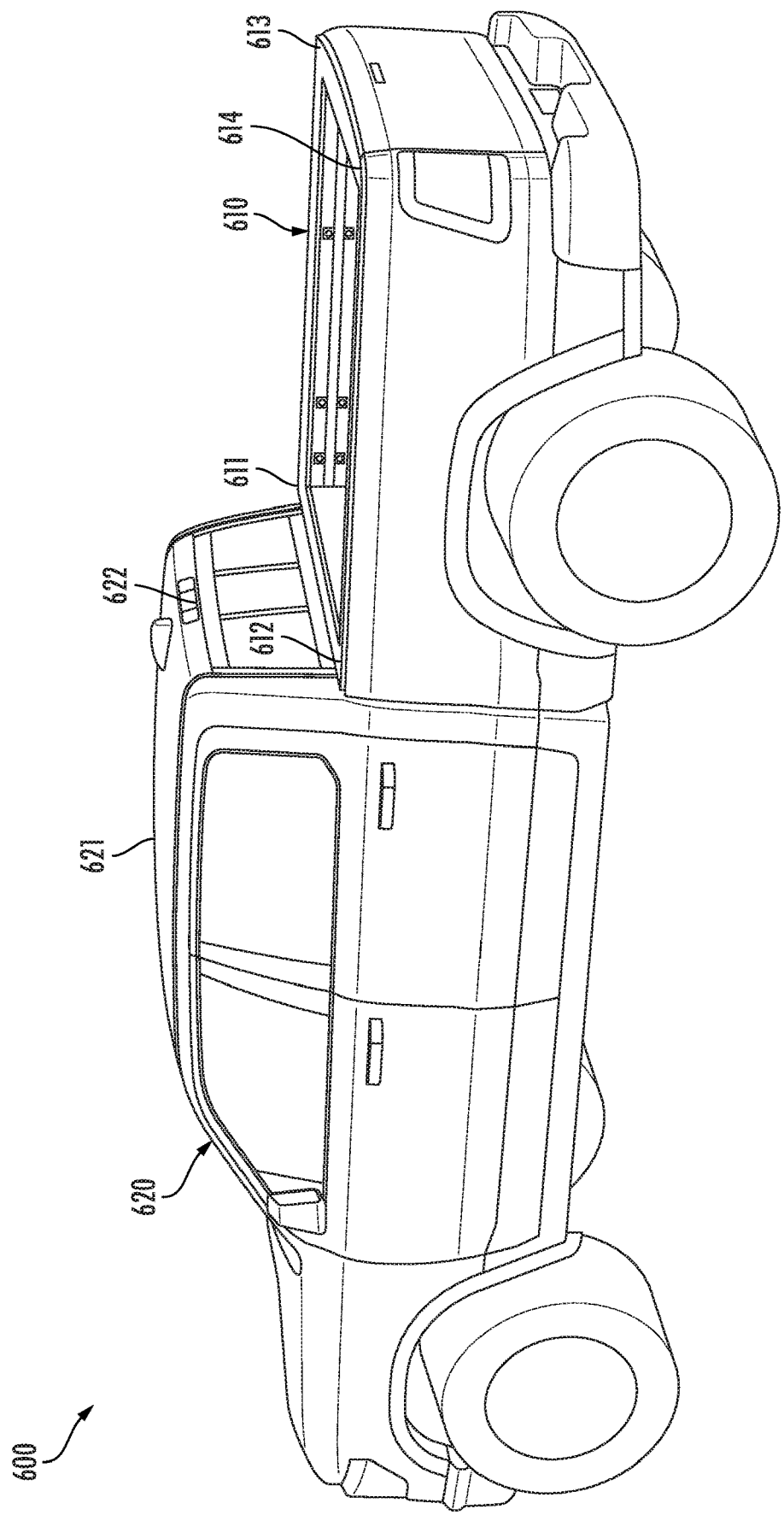
FIG. 47 is a perspective view of another truck.
Figure 48:
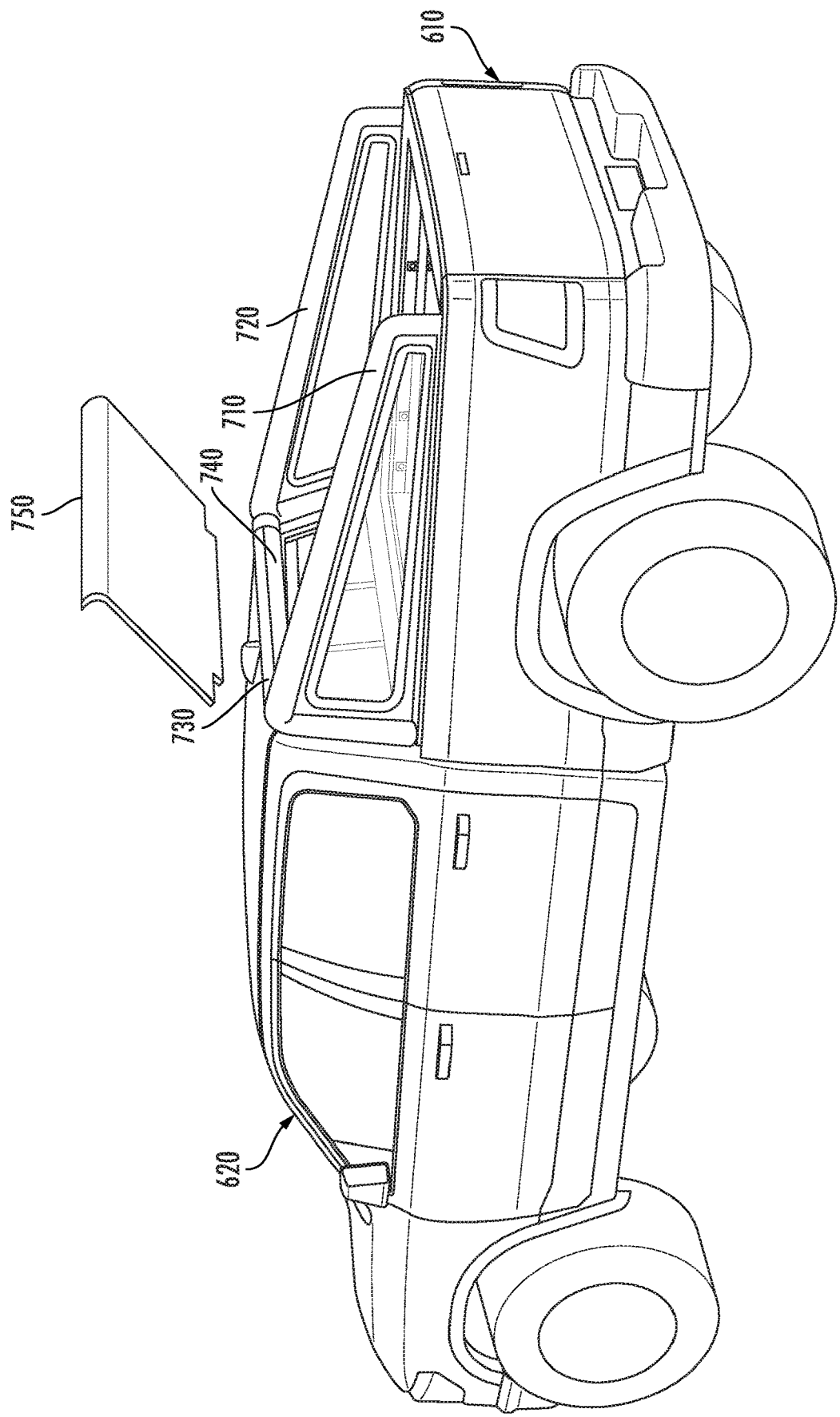
FIG. 48 is a perspective view of a truck bed with another exemplary frame being assembled on the truck bed of FIG. 47.
Figure 49:
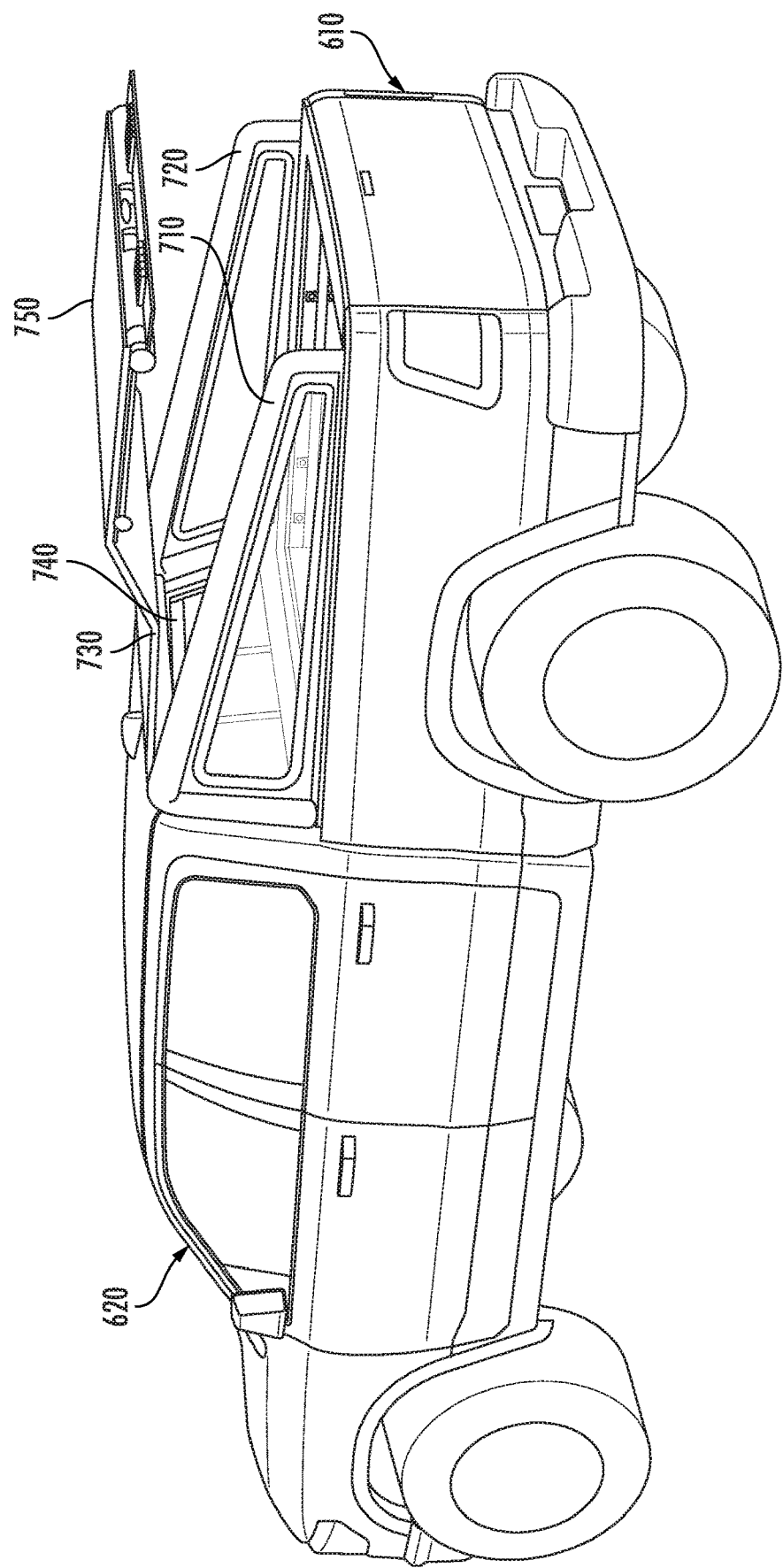
FIG. 49 is a perspective view of the frame of FIG. 48 with a top extended over an upper frame cavity.
Figure 50:
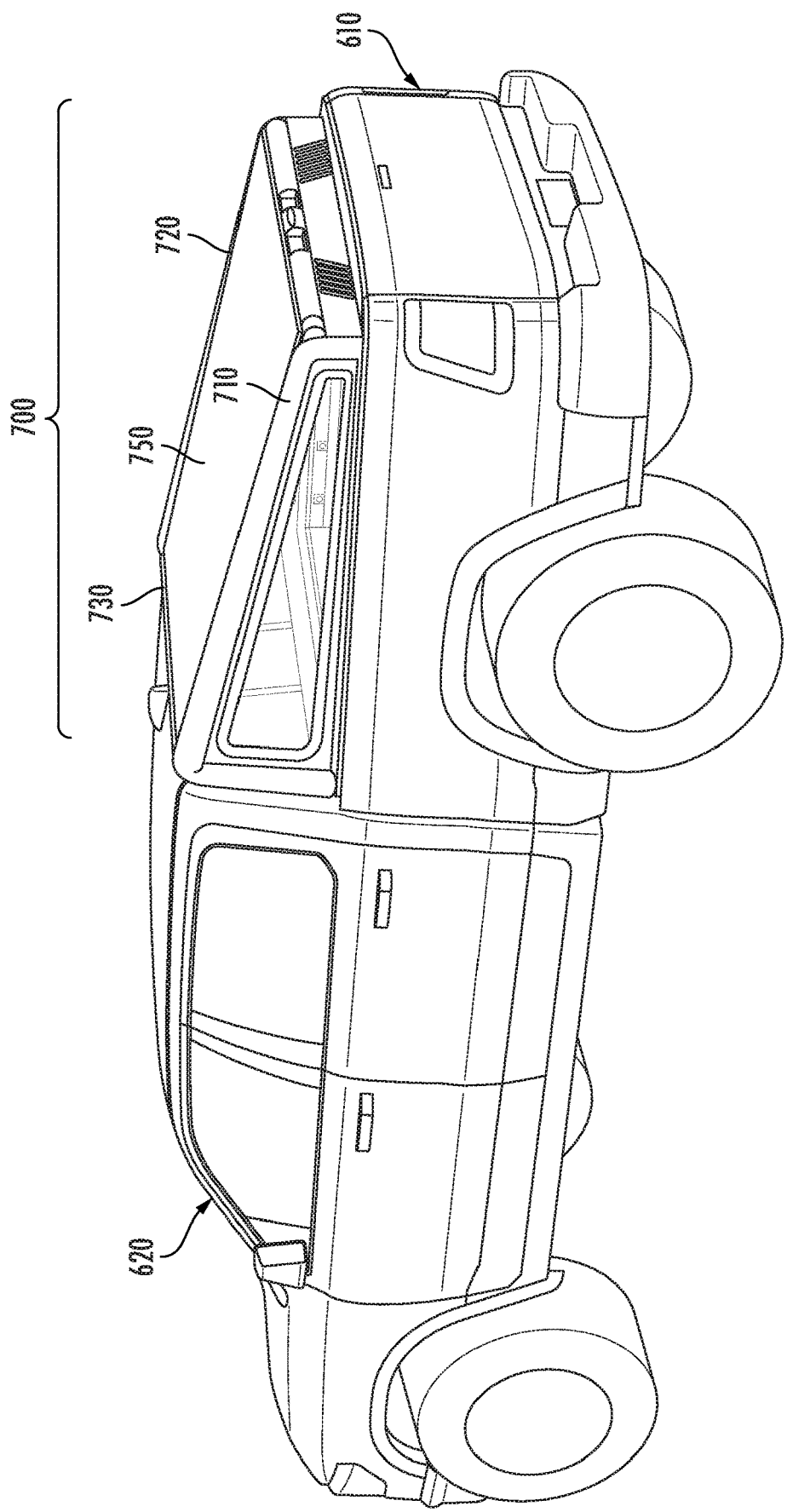
FIG. 50 is a perspective view of the frame of FIG. 48 with a top folded over the upper frame cavity.
Figure 51:
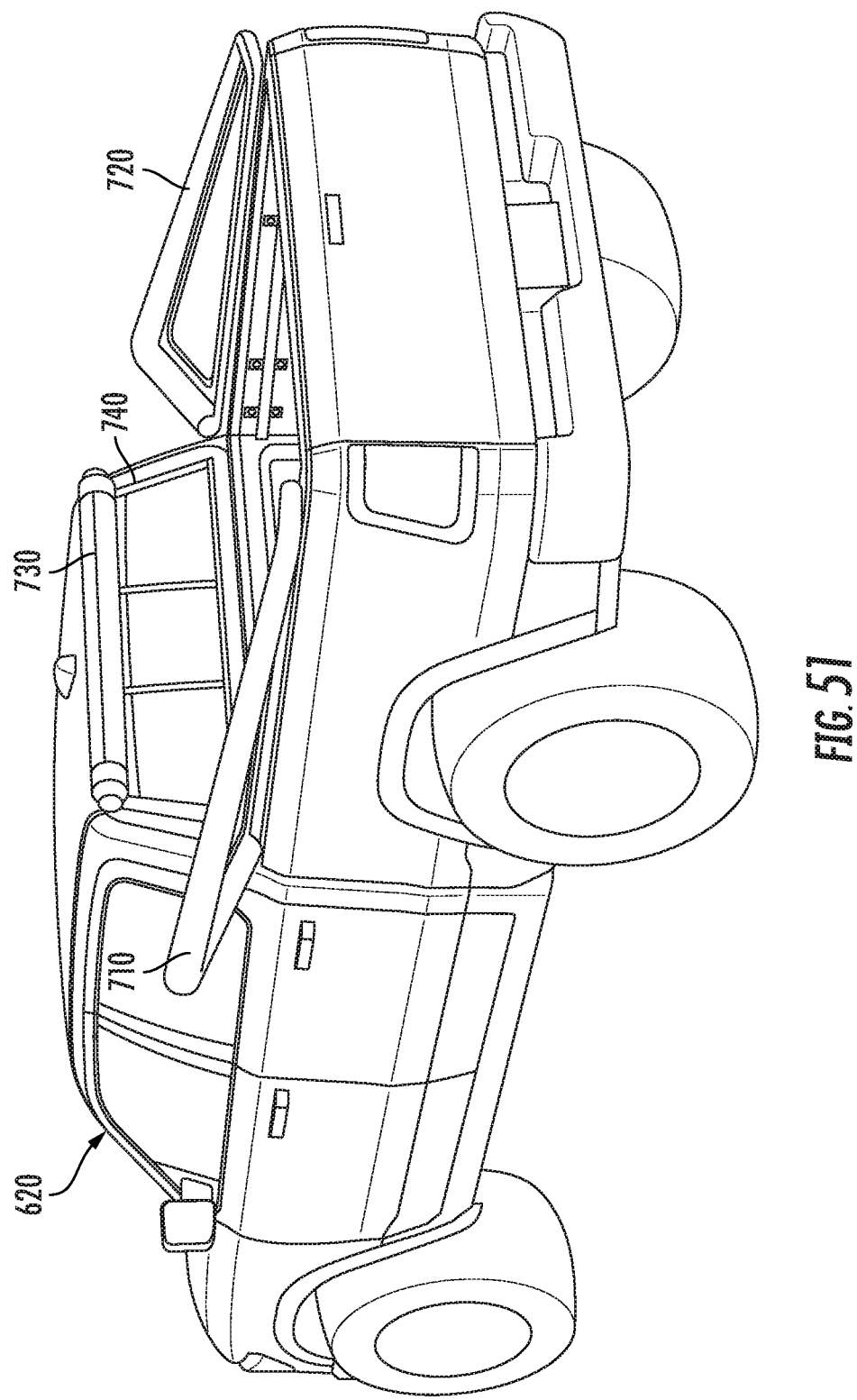
FIG. 51 is a perspective view of the frame of FIG. 48 having side panels folded away from a center of the cab.

FIG. 46 is an upper perspective view of the roof rack 542 immovably mounted to the external frame 504 over the truck bed 22. In this regard, the roof rack 542 shown in FIG. 45 is not mounted on rails 544 and is thus, not moveable to an over-the-roof position. Rather, the roof rack 542 in FIG. 45 is mounted onto the side member 516 via clamps 566 or other mounting hardware known in the art. The roof rack 542 may be detachable from the side members 516 to allow for removal of the roof rack 542 when not needed. It is also contemplated that the roof rack 542 may be mounted to the rear cross member 534 and/or the front cross member 514 in addition to, or as an alternative to mounting on the side members 516.

Although the foregoing describes the roof rack 542 as being used for storage, the term roof rack is used broadly herein to refer to any structure that may be stored or placed on the roof of a vehicle. In this regard, the term roof rack may refer to a roof-top tent, a roof-mounted bike rack, camping equipment, storage equipment, etc.

Referring now to FIGS. 47-55, there is depicted yet another embodiment of a truck bed cover 700 adapted to fit over portions of truck 600. Truck 600 has a cab/cabin 620 having a top surface 621 and a rear surface 622, and a bed 610 having a front right corner 611, front left corner 612, rear right corner 613, and a rear left corner 614. Truck bed cover 700 may also be adaptable to allow for variation in the size of the enclosure defined by truck bed 600 and/or truck bed cover 700. Here, truck bed cover 700 has a left panel 710 coupled to a left side of bed 610 and a right panel 720 coupled to a right side of bed 610. Preferably, left panel 710 is hingedly coupled to bed 610 between front left corner 612 and rear left corner 614, while right panel 720 is hingedly coupled to bed 610 between front right corner 613 and rear right corner 613. Any suitable hinged connection could be used, such as mounting a hinge to a top edge of bed 610. In some embodiments, the hinges have a locking mechanism that, when engaged, prevents the panel from rotating about the hinge and, when disengaged, allow the panel to rotate about the hinge. In preferred embodiments, the hinges comprise an inertial mechanism, such as a spring, that is coupled to the hinge to increase the friction force of the hinge such that pressure placed on the panel above a threshold moves the panel and pressure placed on the panel below the threshold is not enough to move the panel, allowing the panel to stay in place in a person is not applying pressure to the panel and the panel is subjected to normal driving vibrational forces (e.g. vibrational forces below 130 mph).

Figure 52:
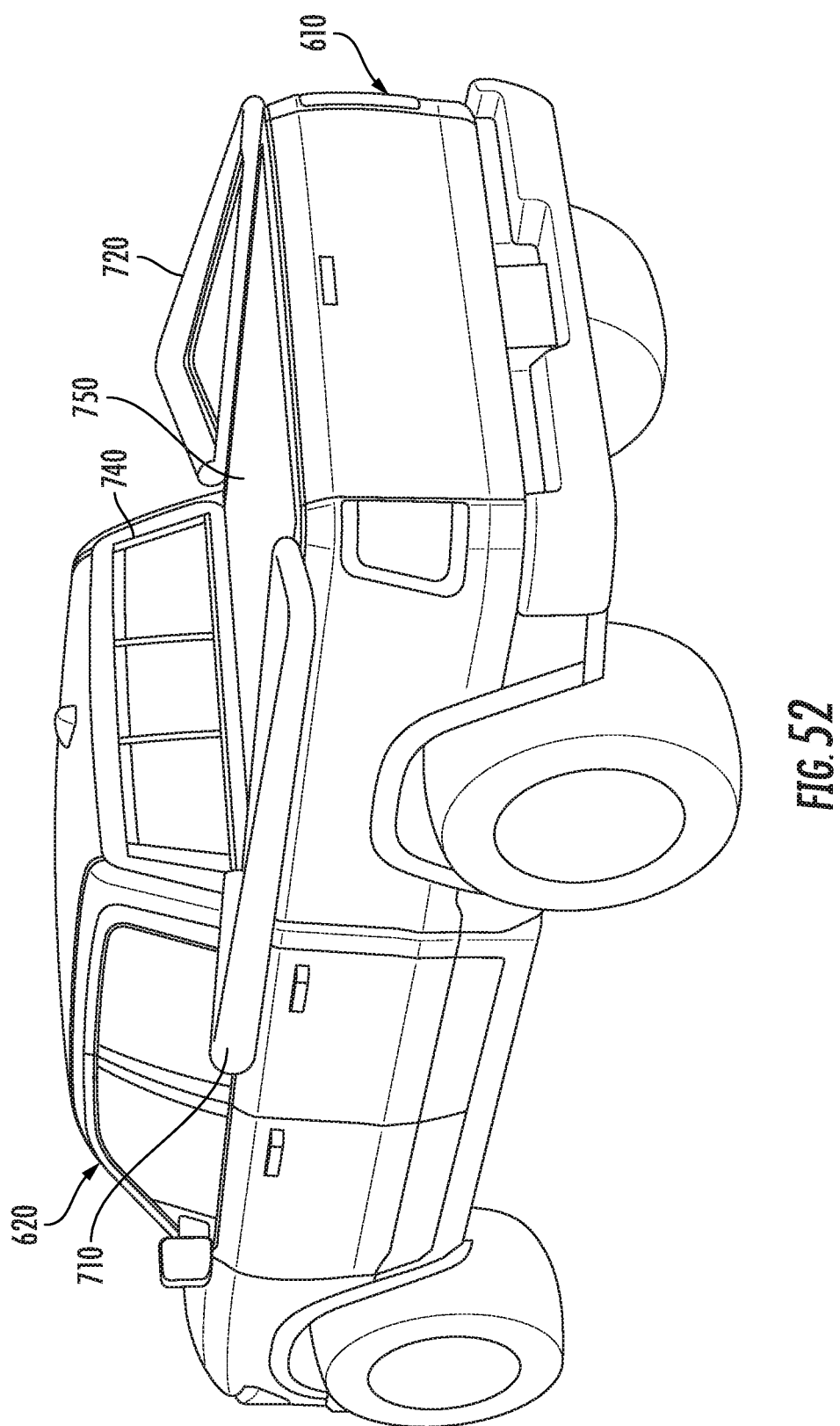
FIG. 52 is a perspective view of the frame of FIG. 48 with a top folded over the bed of the truck.
Figure 53:
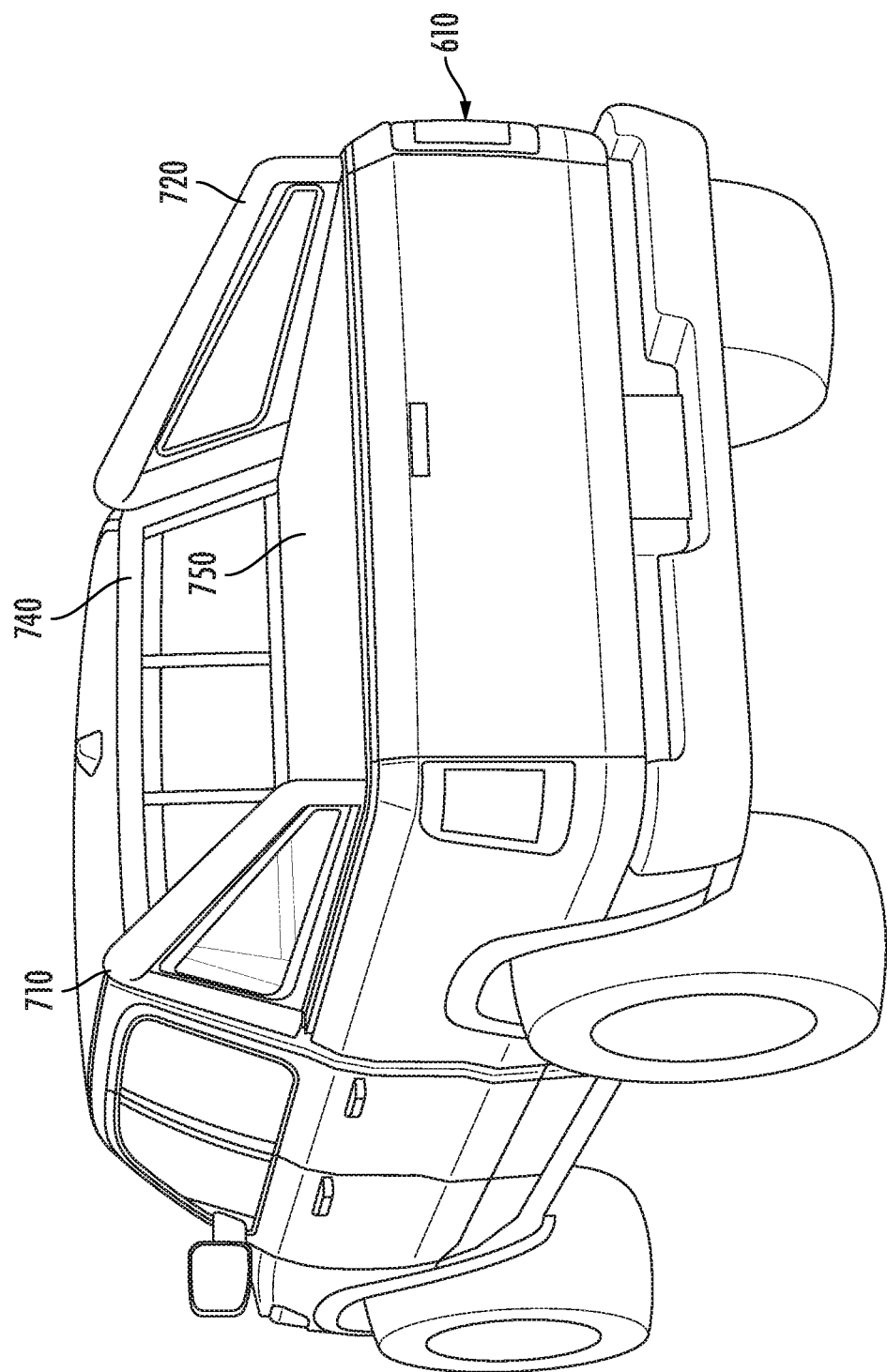
FIG. 53 is a perspective view of the frame of FIG. 48, having side panels folded over the top that is folded over the bed of the truck.
Figure 54:
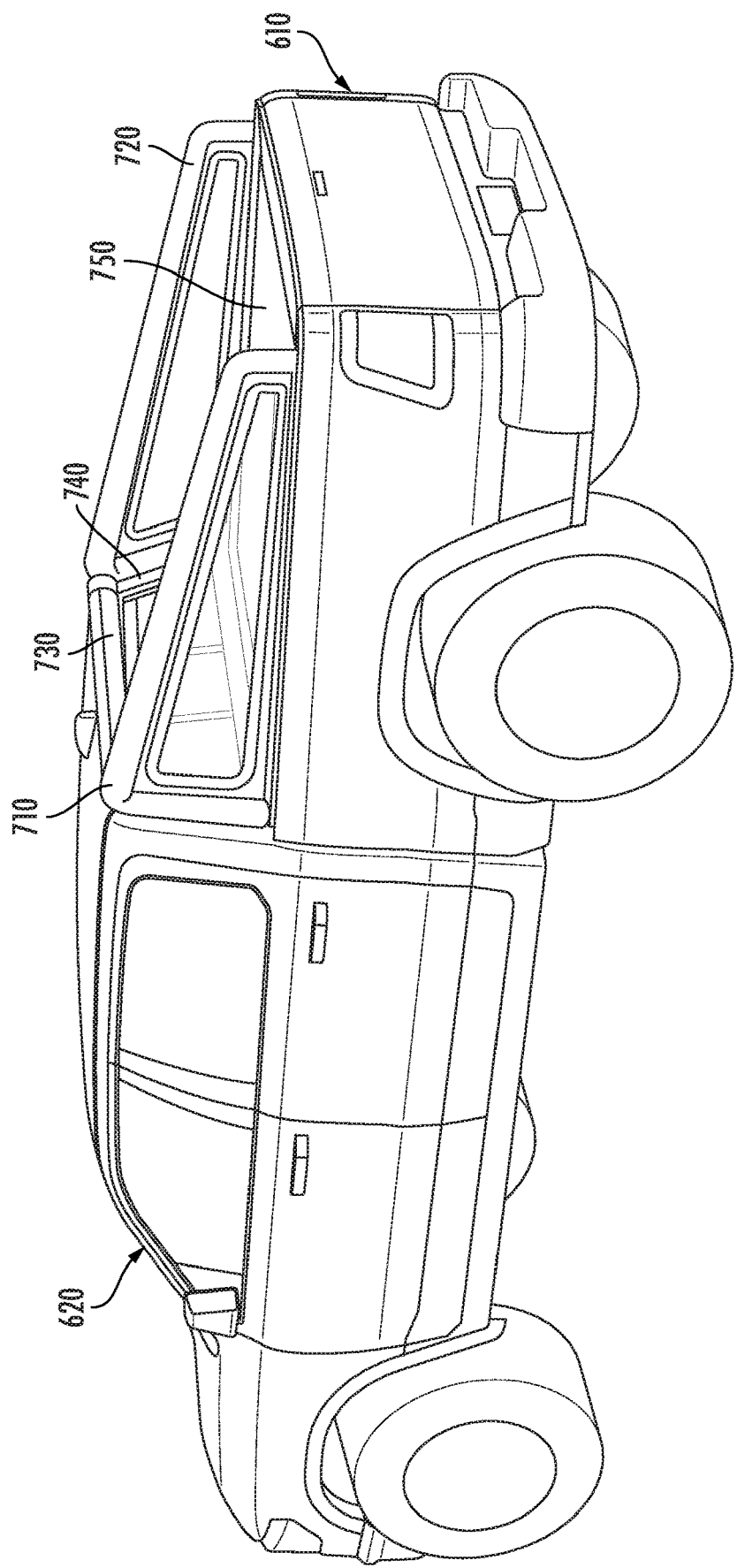
FIG. 54 is a perspective view of the frame of FIG. 48, having a crossmember coupled to the side panels that have been folded over the top that is folded over the bed of the truck.
Figure 55:
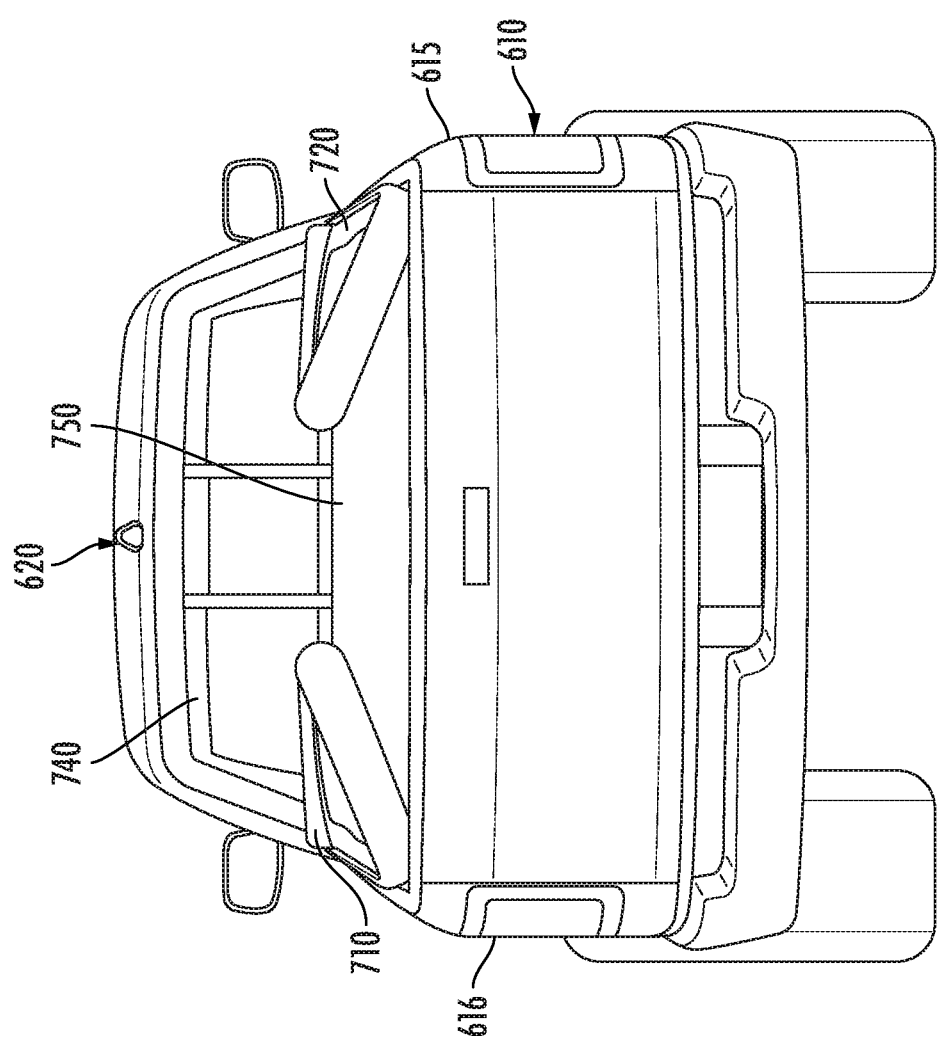
FIG. 55 is a perspective view of the frame of FIG. 48, having side panels folded over the top at another angle.
Figure 56:
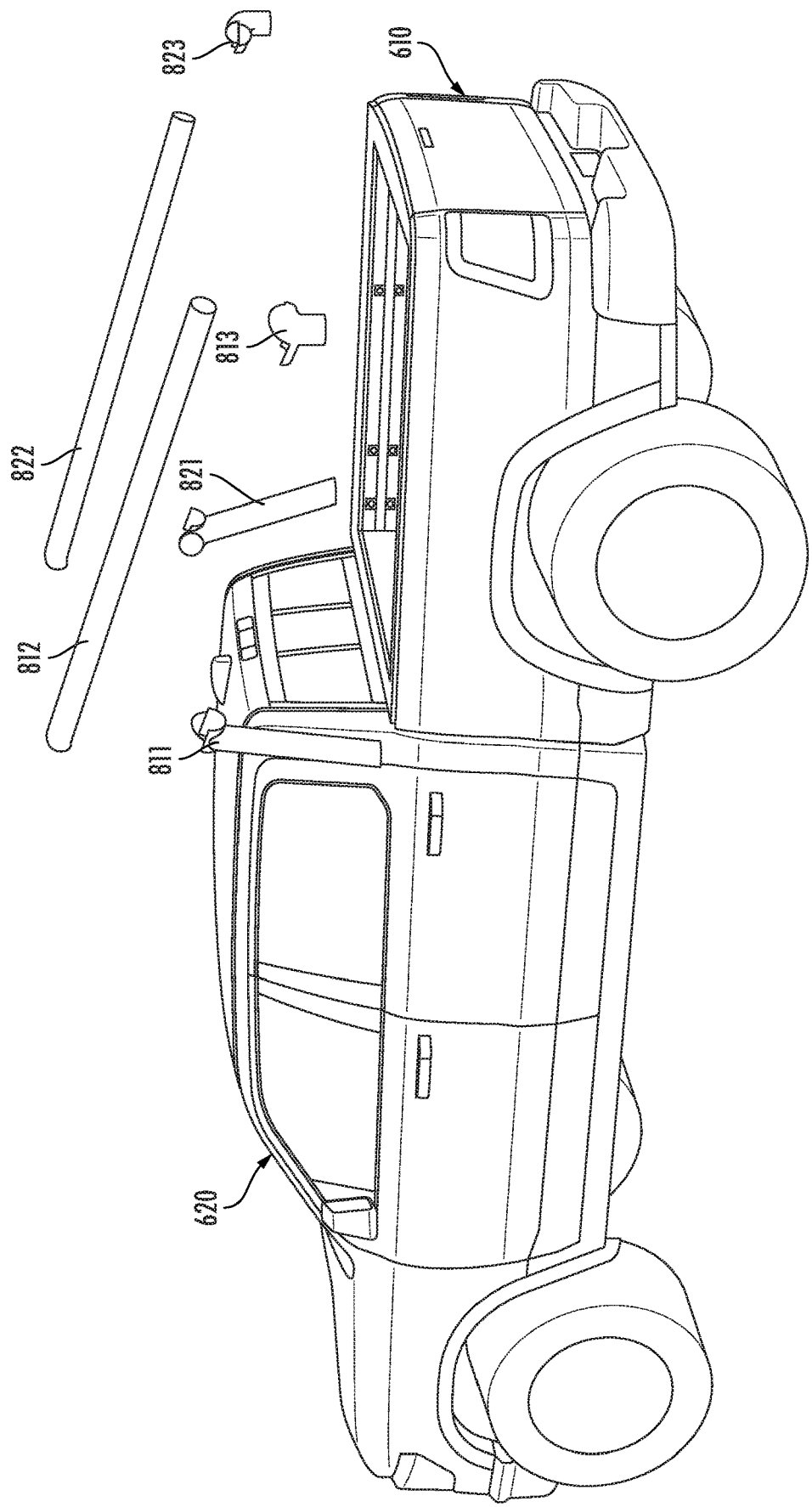
FIG. 56 is a perspective view of an alternative frame embodiment being assembled on the truck bed of FIG. 47.
Figure 57:
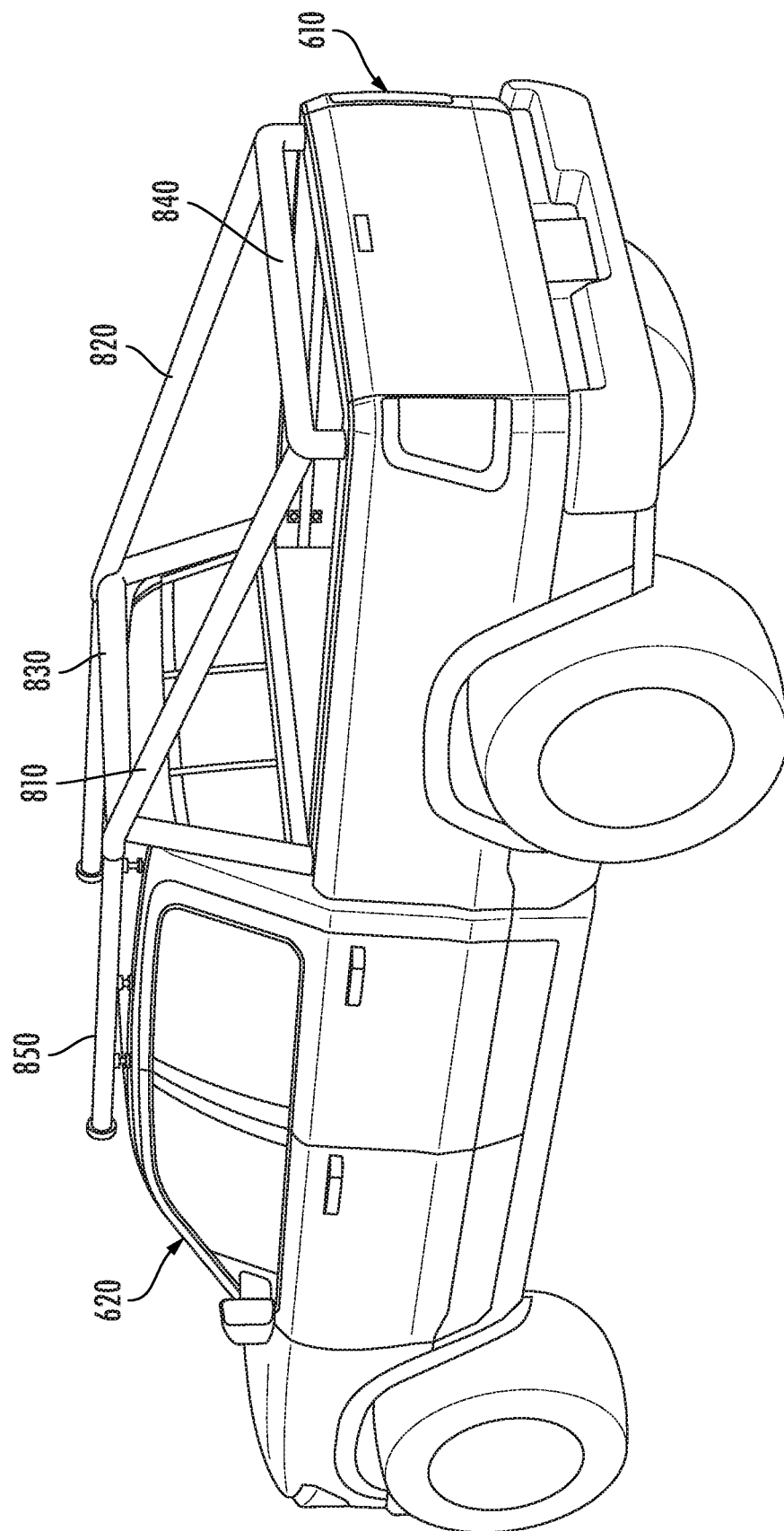
FIG. 57 is a perspective view of the frame of FIG. 56 having a pair of rooftop mounts disposed on a cab rooftop.

As shown in FIGS. 52 and 55, preferably the panels are disposed to rotate about at least a 90, 120, 150, or even 180 degree of flexibility. This allows the sides of the panel to rotate inwards and outwards of bed 610, effectively increasing the width of the entryway into the cavity of bed 610 and decreasing the width of the upper cavity entryway into the cavity of bed 610. In FIG. 52, left panel 710 and right panel 720 are rotated outwards to increase the width of the entryway, allowing top cover panels 750 to sit below the widest portion of the panels. In contrast, in FIG. 53, left panel 710 and right panel 720 are rotated to a substantially vertical position to reduce the width of the entryway into the cavity of bed 610 to prevent top cover panel from being moved upwards out of bed 610. Further, in FIG. 55 left panel 710 and right panel 720 are rotated inwards over bed 610 to not only reduce the width of the upper cavity entryway further, but also to apply weight to top cover panels 750 to help further lock it in place.

Top cover panels 750 preferably hingedly couple to cross member 730, allowing a portion of top cover panels 750 to rotate at least 30, 60, 90, 120, 150, or even 180 degrees with respect to the hinge. In the disclosed embodiment, top cover panels 750 have a projection that is configured to mate with a recess of cross member 730, although other hinged connections could be utilized. Both cross member 730 and top cover panels 750 are preferably attached and detached using matching indent/detent connections such that a user can easily attach and detach the members easily, for example by using a flexible bracket that holds either cross member 730 or top cover panels 750. However, any suitable coupling mechanism could be used, for example hand or Philips screws, nuts and bolts, or even magnetic couplings. By providing embodiments where top cover panels 750 and cross member 730 can be easily attached and detached from their couplings, a user could easily transform top cover 700 between the high-covered embodiment shown in FIG. 50, the low-covered embodiment shown in FIG. 55, and the uncovered embodiment shown in FIG. 51. In the uncovered embodiment, one or both of cross member 730 and top cover panels 750 could be placed in the bed of the truck for storage temporarily.

Referring now to FIGS. 56-62, there is there is depicted yet another embodiment of a truck bed cover 800 adapted to fit over portions of truck 600, having a left panel 810 comprising three coupled parts (front left post 811, rear left post 813, and longitudinal member 812) and having a right panel 820 comprising another three coupled parts (front right post 821, rear right post 823, and longitudinal member 822). The parts of the panels could be coupled together using any suitable attachment means, such as screws, bolts, adhesives, or tension couplers. Panels 810 and 820 are preferably not hingedly coupled to bed 610, ensuring that the panel 810 and 820 do not rotate about an axis while attached to bed 610. Crossmember 830 and 840 are coupled to left and right panels 810 and 820, respectively, to improve the stability of frame 800.

Figure 58:
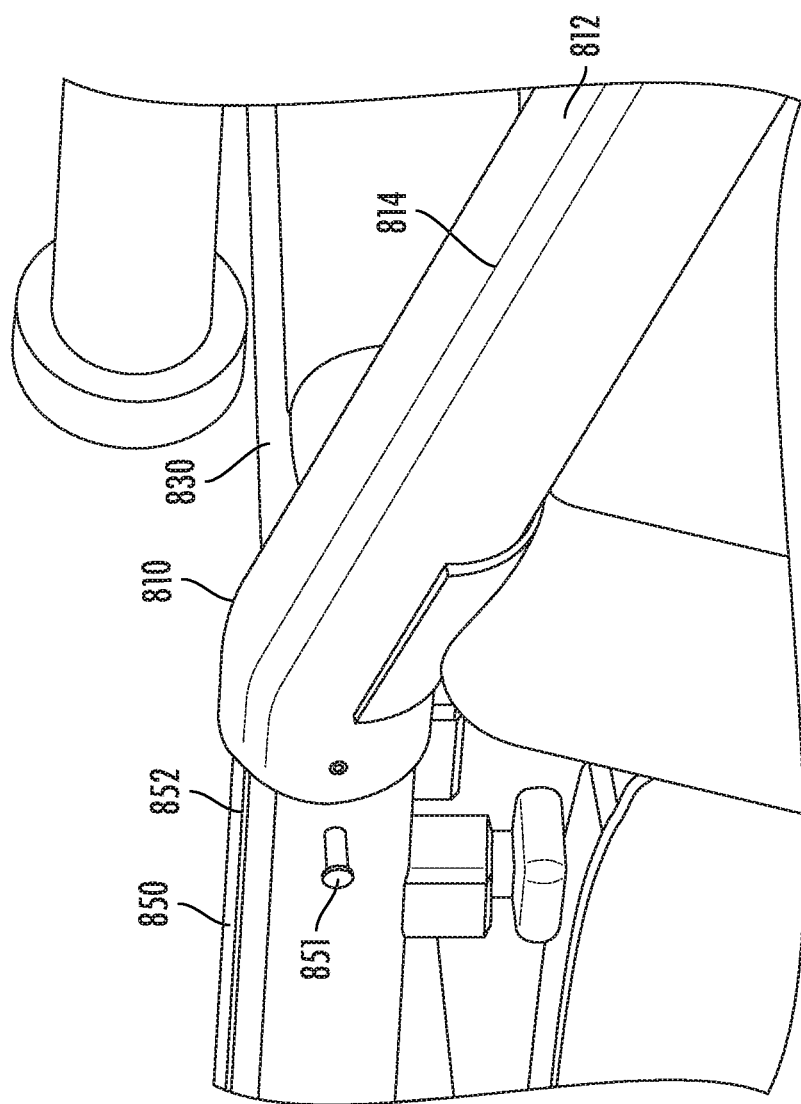
FIG. 58 is a zoomed-in view of the rooftop mounts of FIG. 57, showing a coupling mechanism.
Figure 59:
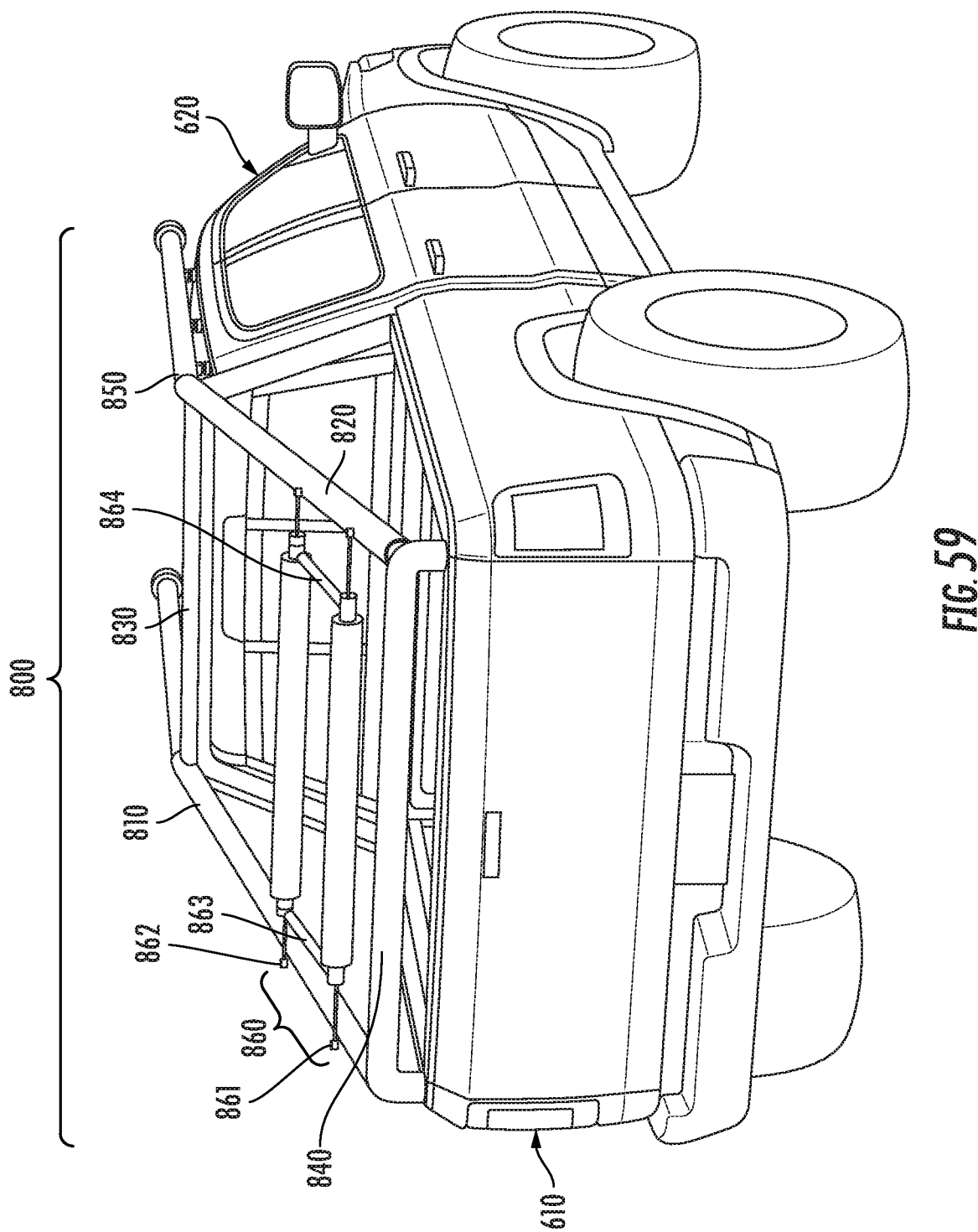
FIG. 59 shows a perspective view of the frame of FIG. 57 having a rack coupled to railings of the frame.

As shown in FIG. 58, rooftop mount 850 is coupled to left panel 810 and right panel 820, respectively, via a threaded screw 851 that threads through threaded hole 814, although any suitable coupling means could be used. Rooftop mount 850 has a recess 852 and left panel 810 has a recess 814 that acts as a slideable rail to allow a rack, such as rack 860 or rack 870, to slide along the recess. These recesses are preferably molded into the longitudinal members, eliminating the need to attach a separate sliding rail to the longitudinal member to allow a rack to slide from the front to the rear of the truck bed. The recesses of rooftop mount 850 and left panel 810 are disposed to feed into one another, allowing a rack to slide from one recess to the other seamlessly. Preferably, a front end of recess 852 and a rear end of recess 814 are tapered inward, or are closed, to prevent a rack from sliding off of the rails. In preferred embodiments, the ends are closed with a hand-controlled lock, such as a screw-on cap or a hand lever, allowing a user to slide a rack into a rail, and lock the rack within the recess of the rail by locking the hand-controlled lock. In addition, the rack preferably further comprises a lock that locks the rack in place along the rail, for example a hole through both the rail and the rack through which a pinion can be inserted, a wheel that locks in place and cannot spin when a brake is applied, or rubber lockouts such as lockouts 74. While rooftop mount 850 is shown here to be bolted into the top of truck cab 620, rooftop mount 850 could simply have pads underneath, such that the only coupling attaching rooftop mount 850 to truck 600 is the coupling between rooftop mount 850 and the left and right panels 810 and 820.

Figure 60:
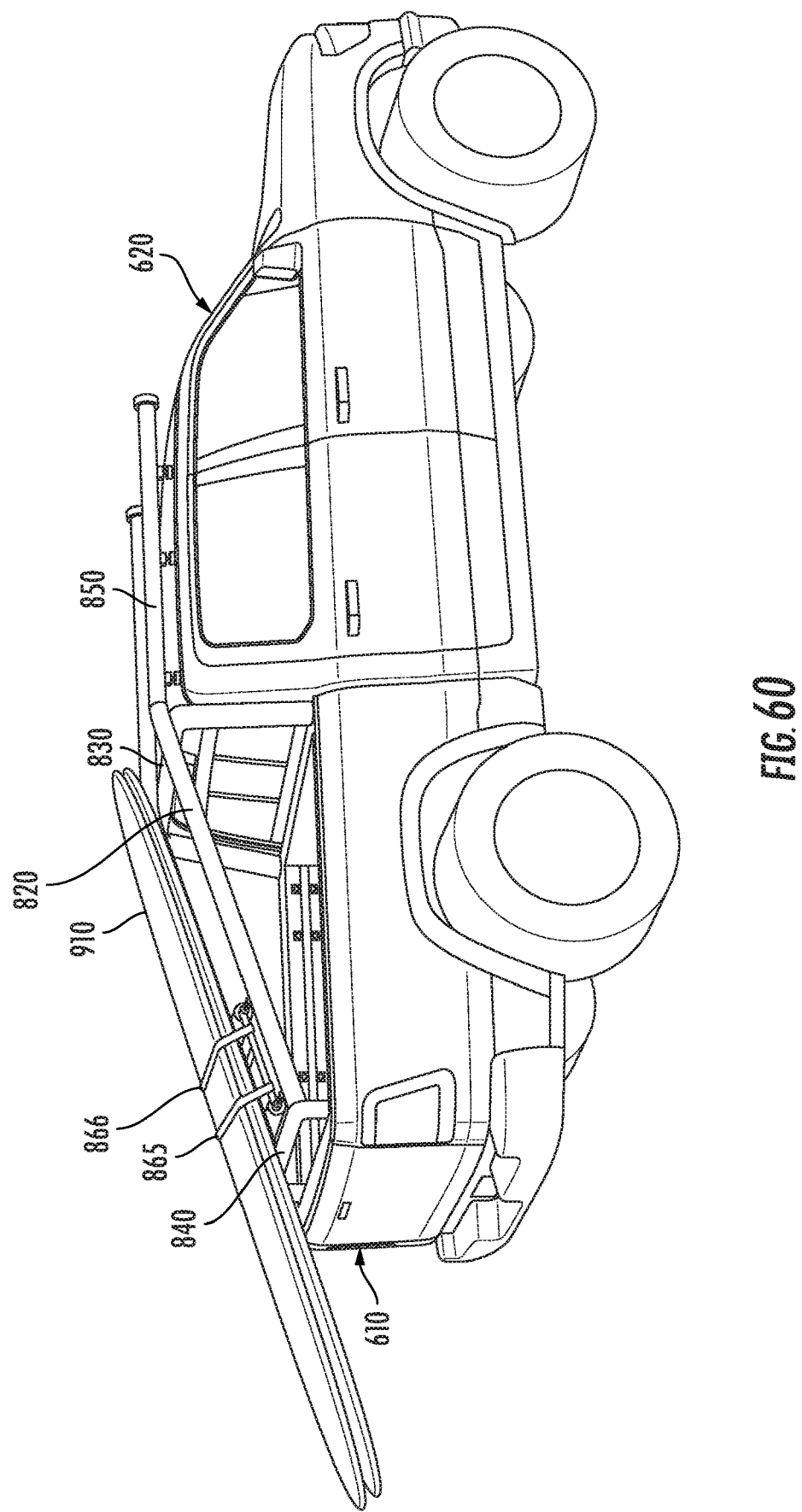
FIG. 60 shows a perspective view of the frame of FIG. 59, showing the rack moved to a new position to load rack items.
Figure 61:
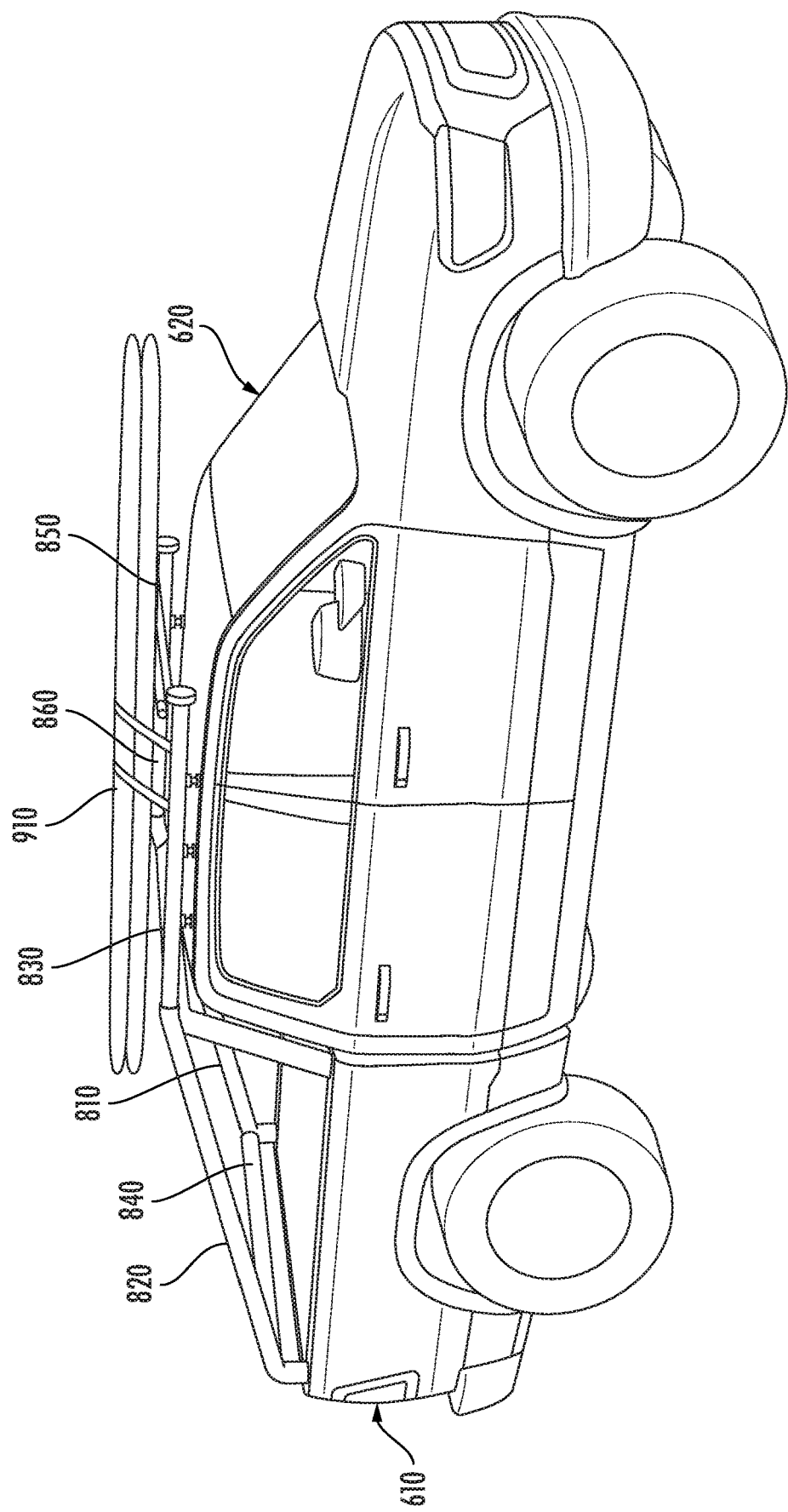
FIG. 61 shows a perspective view of the frame of FIG. 60, showing the rack moved to yet another position.
Figure 62:
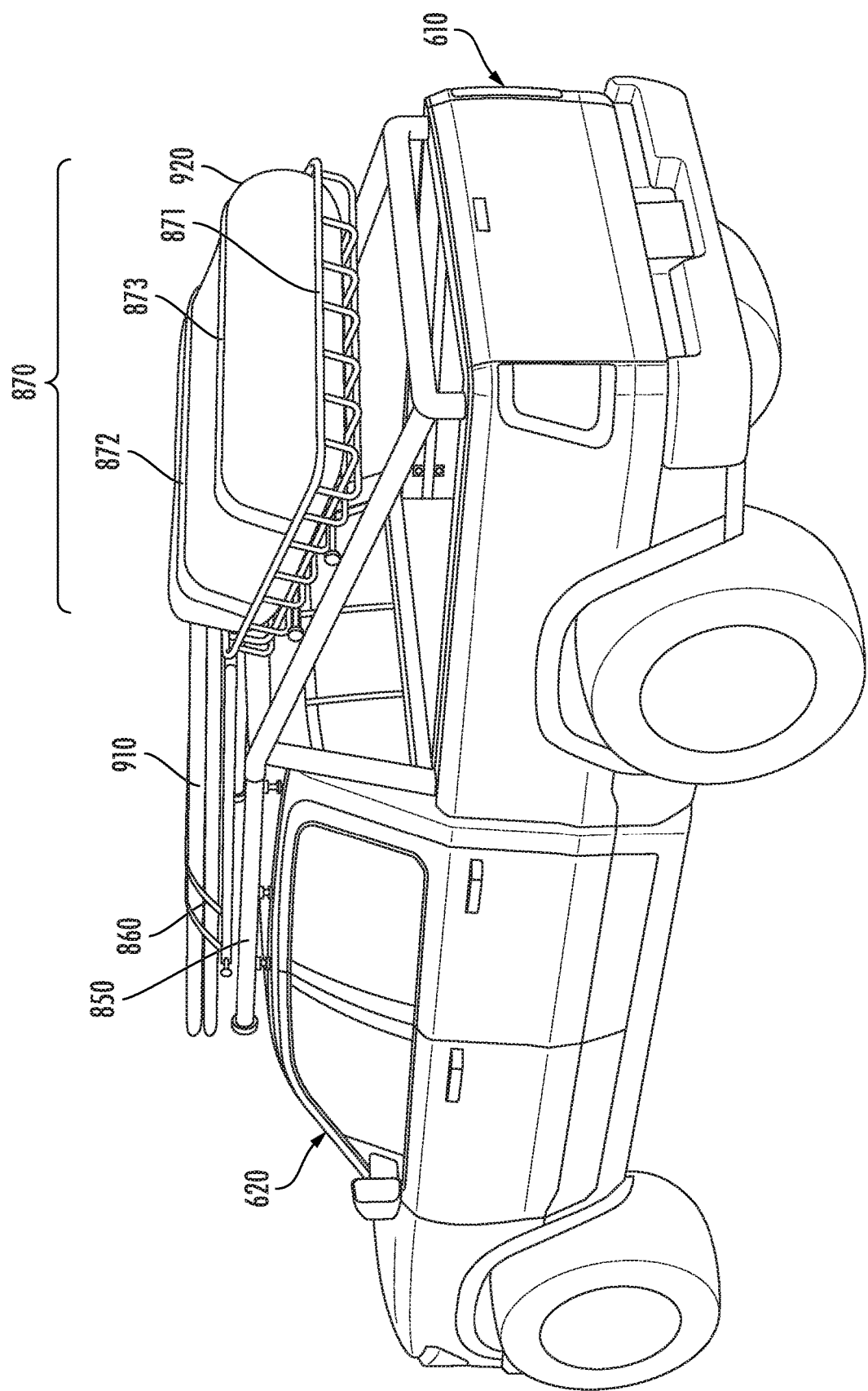
FIG. 62 shows a perspective view of the frame of FIG. 60, showing another rack mounted to the railings of the frame.
Figure 63:
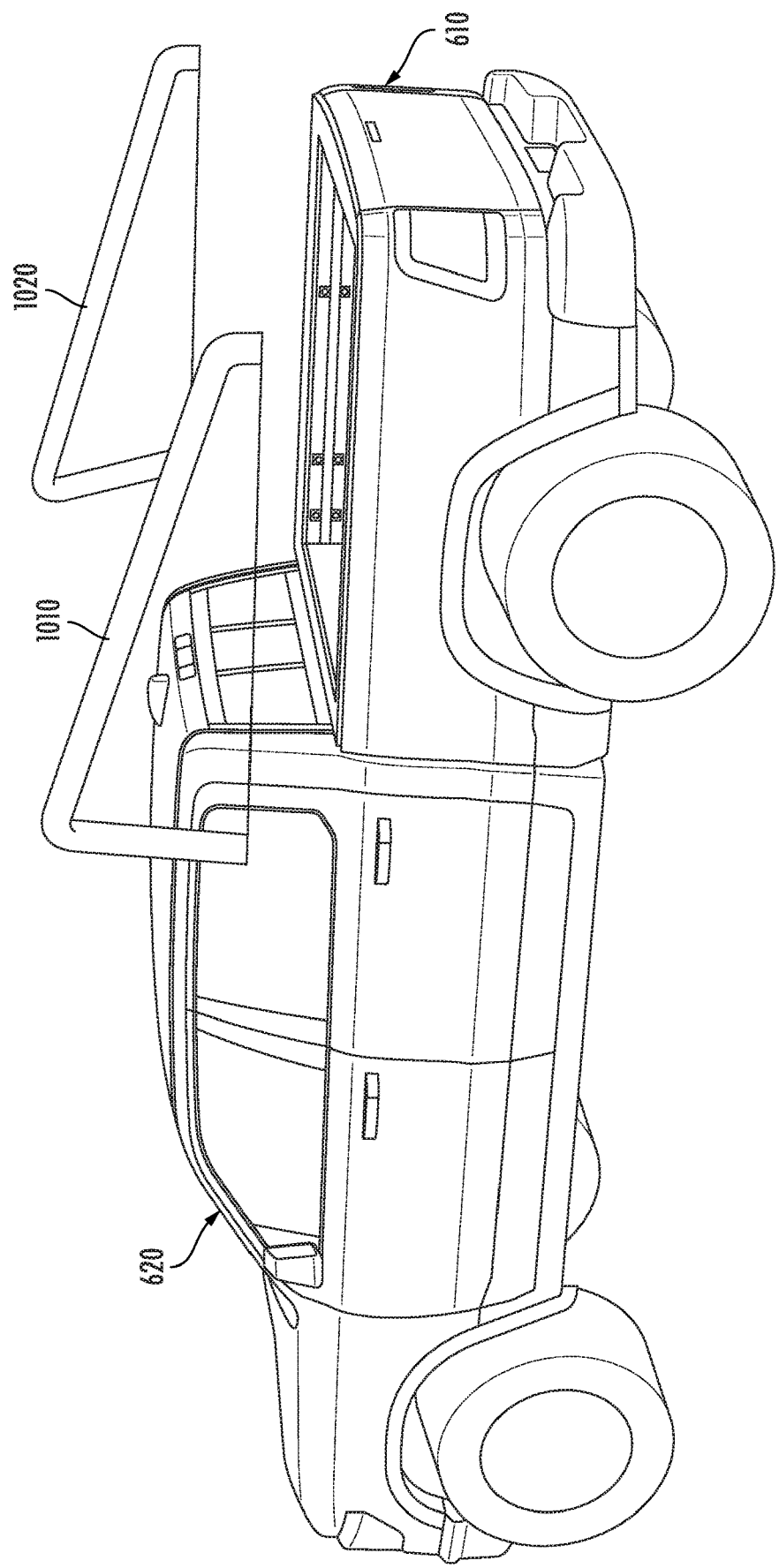
FIG. 63 shows a perspective view of yet another alternative frame embodiment being assembled on the truck bed of FIG. 47.
Figure 64:
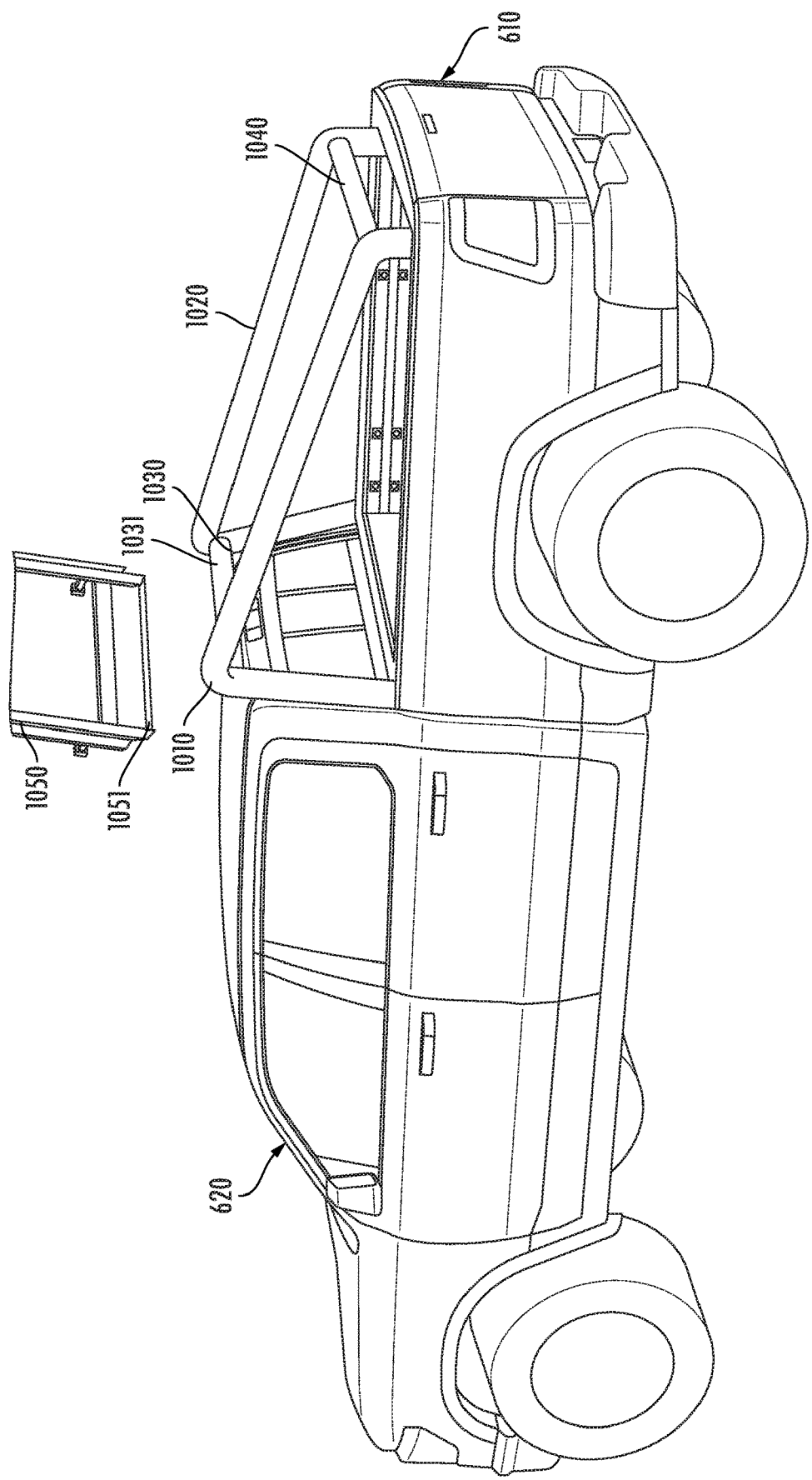
FIG. 64 shows a perspective view of the frame of FIG. 63 in a further state of assembly.
Figure 65:
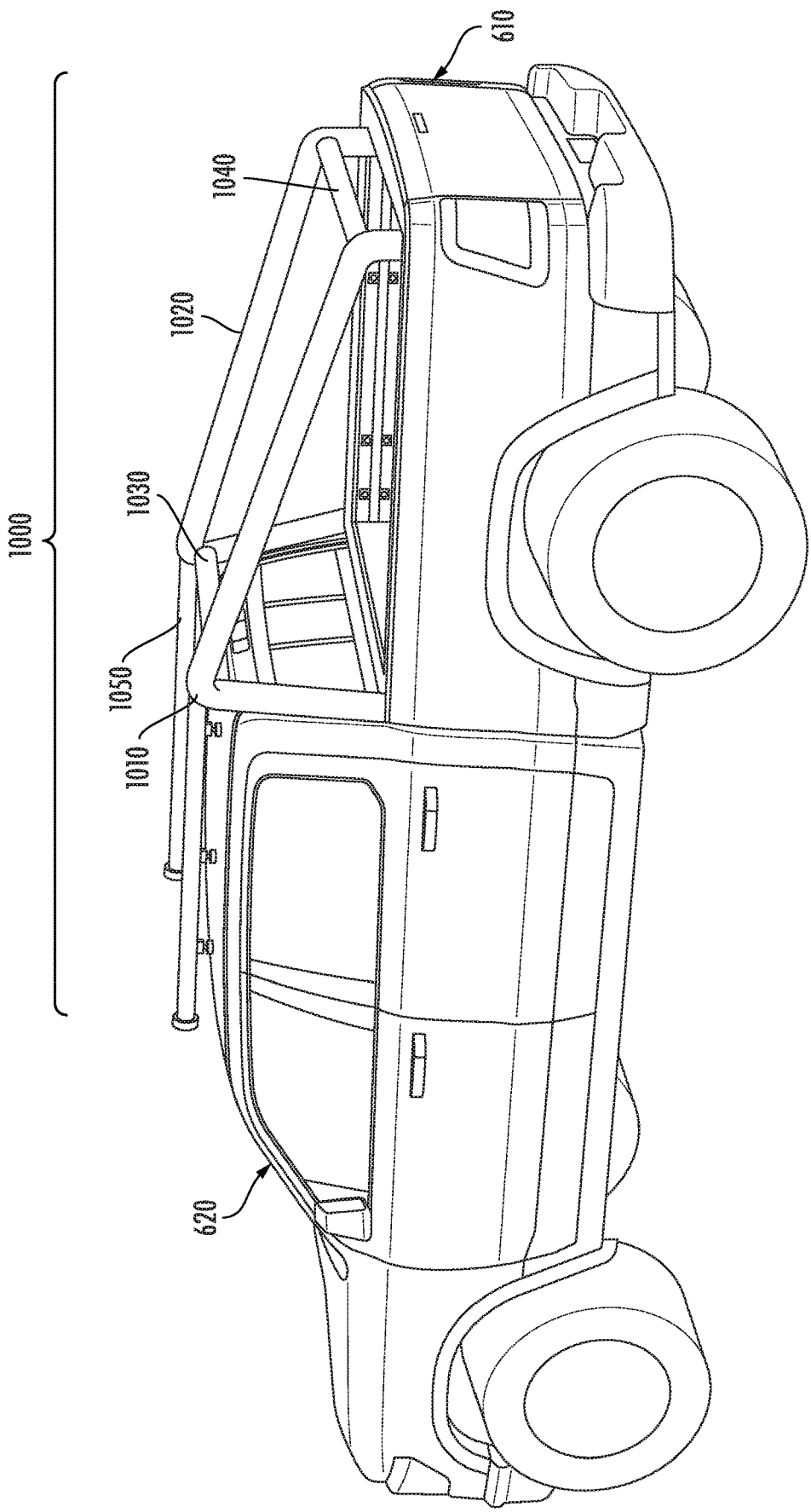
FIG. 65 shows a perspective view of the frame of FIG. 63 in a further state of assembly with an alternative rooftop mount.

Both racks 860 and 870 are configured to slide along the slideable rail of truck bed cover 800 to allow for easy loading and unloading of the racks. In FIG. 60, rack 860 slides towards the rear of truck bed cover 800 to allow a user to load rack load 910, and lock it in place using locking mechanisms 865 and 866, shown here euphemistically as hook and loop ties that wrap around cross members 863 and 864 that bridge upper rod 862 with lower rod 861. The ends of upper rod 862 and lower rod 861 are wheels that are configured to rotate within the recesses of truck bed cover 800, and lock in place when a brake is applied. Rack 860 could then be pushed up to upper mount 850 as shown in FIG. 61. This allows rack 870 to engage the railing, such that rack load 920 could be loaded and locked in place using locking mechanisms 872 and 873. Preferably, rack 870 could slide towards the rear of truck 600 for loading, and then could slide forward and be locked in place for when truck 600 is in movement.

Figure 66:
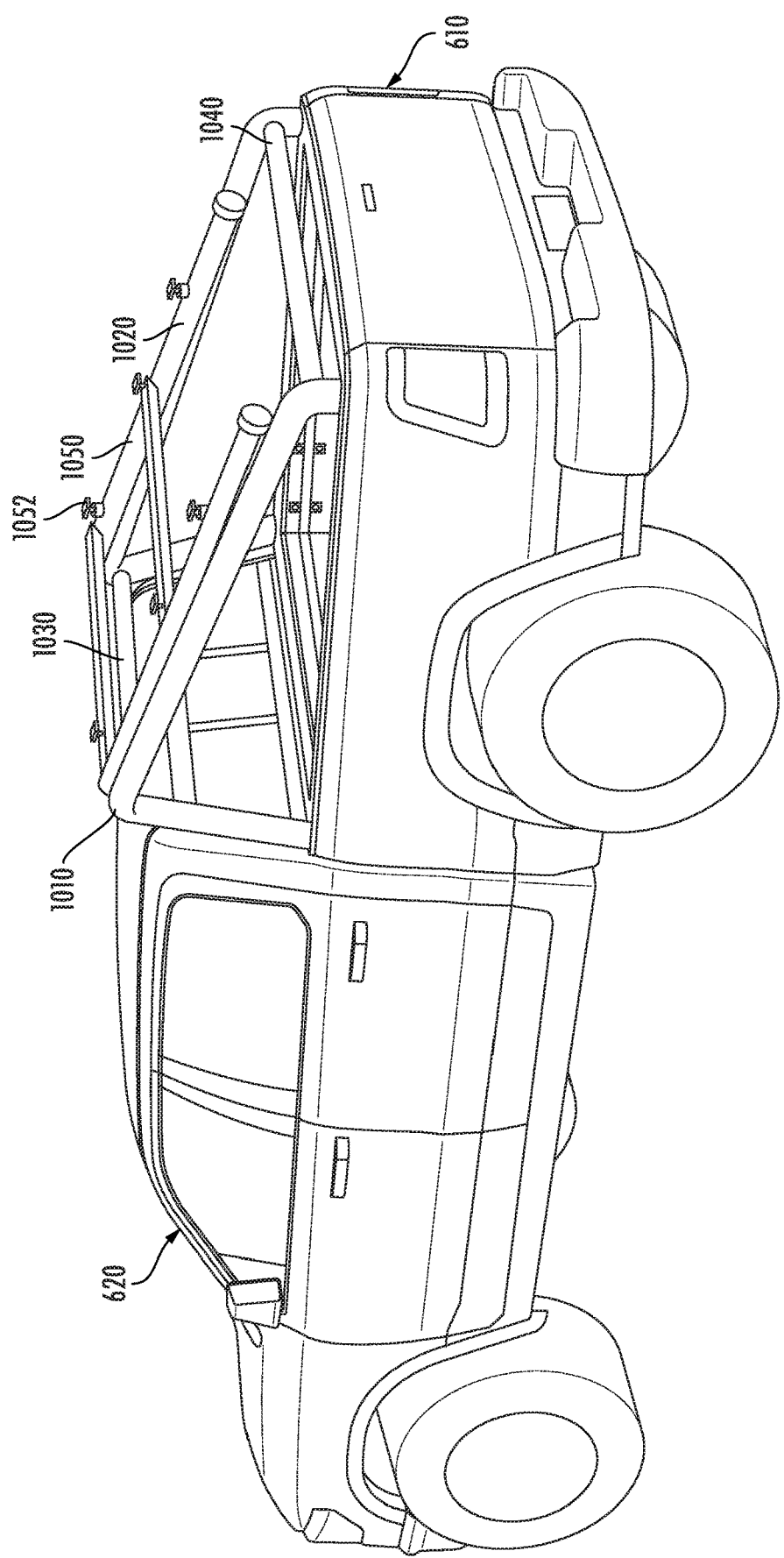
FIG. 66 shows a perspective view of the frame of FIG. 65 having the rooftop mount integrally coupled to a crossmember of the frame over the cab of the truck.
Figure 67:
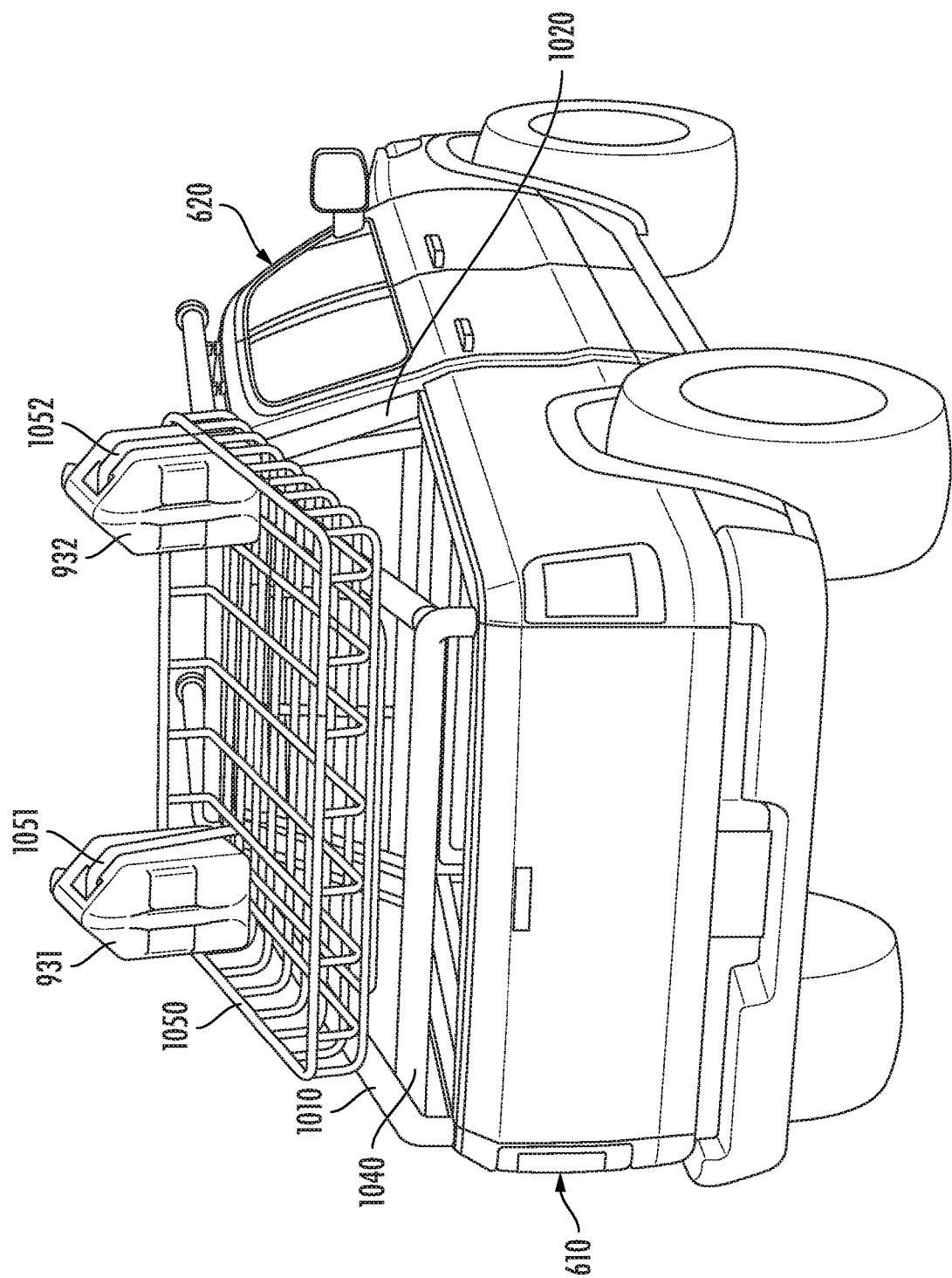
FIG. 67 shows a perspective view of the frame of FIG. 66 having the rooftop mount folded to a new position over the bed of the truck.
Figure 68:
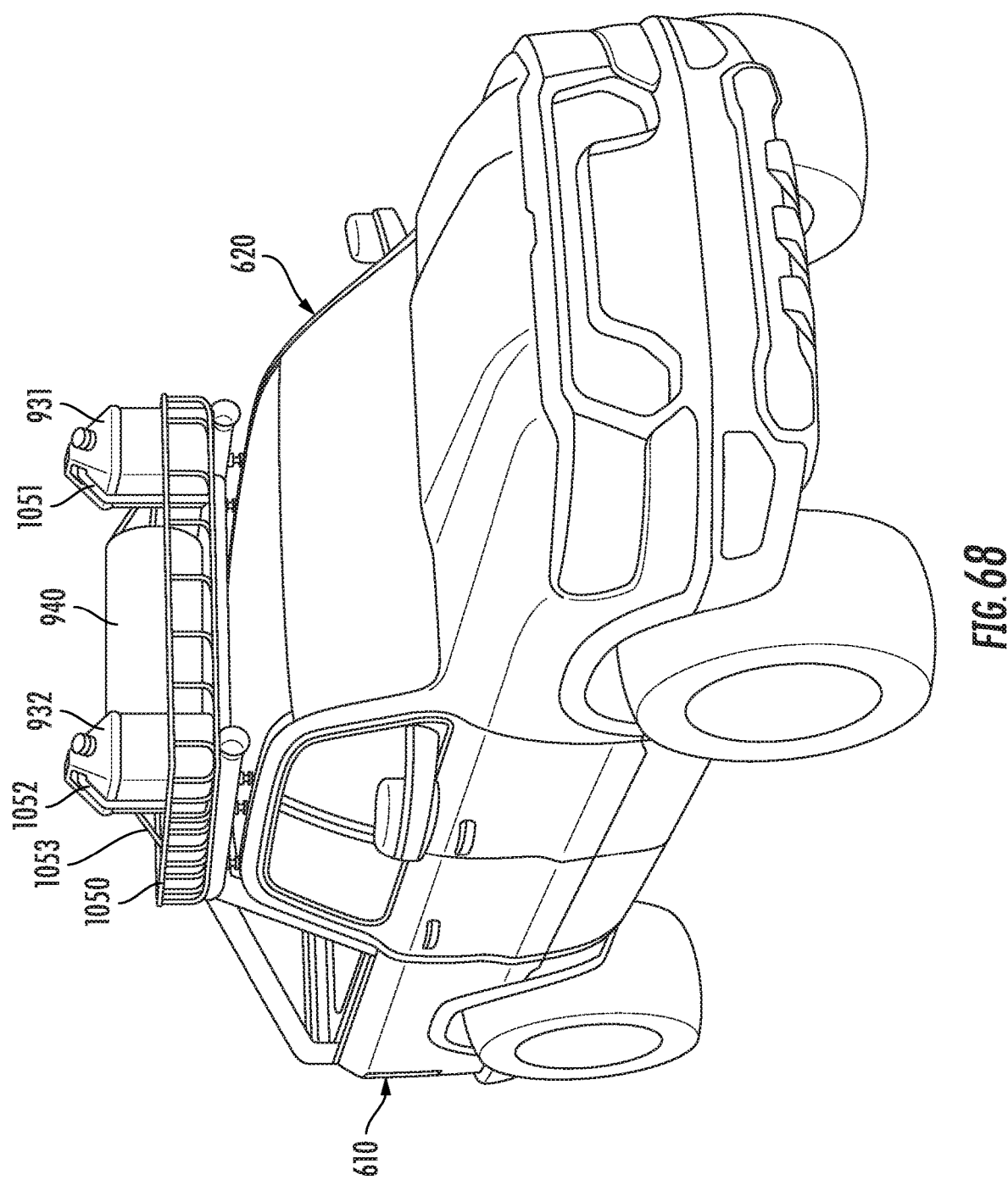
FIG. 68 shows a perspective view of the frame of FIG. 66 having a rack coupled to the railings of the frame.

Referring now to FIGS. 63-69 there is there is depicted yet another embodiment of a truck bed cover 1000 adapted to fit over portions of truck 600, having a left panel 1010 and a right panel 1020. Left panel 1010 is coupled to right panel 1020 via cross members 1030 and 1040. Cross member 1030 has a recess 1031 which is sized and disposed to allow a mating protrusion 1051 to hingedly couple to recess 1030, allowing rooftop mount 1050 to rotate relative to the hinge located at recess 1030. This allows rooftop mount 1050 to rotate between a position above truck cab 620 shown in FIG. 65, and a position above truck bed 610 as shown in FIG. 66. The bottom of rooftop mount 1050 has pads 1052 which act as posts to hold rooftop mount at a height above truck bed 610. In preferred embodiments, posts 1052 could comprise a synthetic polymer or rubber that is configured to have a high friction coefficient with metallic objects without scratching the surface. Here, the hinged connection between rooftop mount 1050 and cross member 1030 allows the mount to rotate over 180 degrees, although other angles could be used, such as over 90 degrees, over 120 degrees, over 150 degrees, or over 210 degrees. In some embodiments, a locking mechanism could be employed to lock the rooftop mount between the two positions. For example, a pin and hole, similar to screw 851 and hole 814 of fame 800, could be used to lock the rooftop mount in its position over cab 620, and a hook and loop tie could be used to lock the rooftop mount in its position over bed 610.

Similar to frame 800, frame 1000 preferably also has a railing, such as the embedded railing of frame 800 or the coupled rails 76, to allow racks 1050 and 1060 to slide along the rails for ease of loading and unloading of rack loads, such as rack loads 931, 932, and 940 held in place by locking mechanisms 1051, 1052, and 1053.

The above description is given by way of example, and not limitation. For example, while the longitudinal members above truck bed 610 are shown as slanted and non-parallel to the top edge of truck bed 610, longitudinal members having any suitable angled slant relative to the top edge of truck bed 610 could be used. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A truck bed cover for a truck having a cab and a truck bed, the truck bed cover comprising:
an external frame connectable to the truck bed, the external frame comprising:
a pair of forward side posts disposable adjacent a forward portion of the truck bed so as to extend upward from the truck bed;
a pair of rearward side posts disposable adjacent a rearward portion of the truck bed so as to extend upward from the truck bed; and
a pair of longitudinal extension members, each longitudinal extension member extending between a respective one of the pair of forward side posts and a respective one of the pair of rearward side posts;
a rack slidably connected to the external frame;
a pair of rails coupled to respective ones of the pair of longitudinal extension members, the rack being slidable along the pair of rails.

2. The truck bed cover recited in claim 1, wherein each of the pair of rails includes a first section positionable over the cab, and a second section extendable along a respective one of the pair of longitudinal extension members, the first section being angled relative to the second section.

3. The truck bed cover recited in claim 2, wherein the rack is pivotable relative to the pair of rails.

4. The truck bed cover recited in claim 1, further comprising a weather strip engageable with the external frame and positionable between the external frame and the cab to form a water tight seal between the external frame and the cab.

5. The truck bed cover recited in claim 4, wherein the weather strip defines an opening that is alignable with a window on the cab when the weather strip is positioned between the external frame and the cab.

6. The truck bed cover recited in claim 4, further comprising a top engageable with the external frame, wherein the top includes an upper panel and a pair of opposed side panels.

7. The truck bed cover recited in claim 6, further comprising a biasing element coupled to the upper panel and at least one of the pair of longitudinal extension members.

8. The truck bed cover of claim 1 wherein the pair of longitudinal extension members, each have a segment that slopes downwardly toward a tailgate in a direction from the pair of forward side posts toward the pair of rearward side posts.

9. The truck bed cover recited in claim 1, wherein the pair of forward side posts extend vertically upward from the truck bed by a first height and the pair of rearward side posts extend vertically upward from the truck bed by a second height less than the first height.

10. The truck bed cover recited in claim 1, further comprising:
a crossbar extending between the pair of forward side posts; and
a hinge pivotally connecting the a to the cross bar.

* * * * *